US012548090B1

(12) United States Patent
Woldenberg

(10) Patent No.: US 12,548,090 B1
(45) Date of Patent: Feb. 10, 2026

(54) COMPUTER-BASED PLATFORMS FOR EXCHANGING DATA OBJECTS

(71) Applicant: Titeg LLC, San Antonio, TX (US)

(72) Inventor: Moises Woldenberg, San Antonio, TX (US)

(73) Assignee: Titeg LLC, San Antonio, TX (US)

( * ) Notice: Subject to any disclaimer, the term of this patent is extended or adjusted under 35 U.S.C. 154(b) by 96 days.

(21) Appl. No.: 18/435,650

(22) Filed: Feb. 7, 2024

Related U.S. Application Data

(60) Provisional application No. 63/483,884, filed on Feb. 8, 2023.

(51) Int. Cl.
*G06Q 50/04* (2012.01)
*G06F 9/54* (2006.01)
*G06Q 10/083* (2024.01)

(52) U.S. Cl.
CPC ............ *G06Q 50/04* (2013.01); *G06F 9/547* (2013.01); *G06Q 10/083* (2013.01)

(58) Field of Classification Search
CPC ....... G06Q 50/04; G06Q 10/083; G06F 9/547
USPC ........................................................ 705/330
See application file for complete search history.

(56) References Cited

U.S. PATENT DOCUMENTS

2019/0066041 A1* 2/2019 Hance ................. B65G 1/1373
2020/0039747 A1* 2/2020 Ahmann .............. B65G 1/1375

OTHER PUBLICATIONS

"Ship-unloading scheduling optimization for a steel plant" Published by Elsevier (Year: 2020).*

* cited by examiner

*Primary Examiner* — Zeina Elchanti
(74) *Attorney, Agent, or Firm* — GREENBERG TRAURIG, LLP

(57) ABSTRACT

A computer-based system and method for exchanging data objects includes a memory and processor of a server communicating with entity servers and computing devices. The processor receives a first request via a computing device from a user including a data type and a data unit of the data type based on a data vehicle type. The first request is transmitted to first servers which initiates an application programming interface (API) call to program a database in each server to identify data elements matching requested data elements in the first request. The user transmits a second request based on a displayed list of the identified data elements.

20 Claims, 54 Drawing Sheets

Results / Buy

FIG. 5

- Quotes are made using a proprietary and trade secret pricing engine
- We use a custom pagination technology to sort and search the results
- Quotes are specific to a buyers location, from a specific sellers location
- Freight price is customized
- Certain sellers can be invisible to certain buyers
- Suggested Products and Alternative Products show similar items to the search query that could work for the buyer.

FIG. 11

- Selection of which products the seller offers. This affects their filters elsewhere in the application

- Price groups allow editing of the price and some other properties of many items at the same time, allowing for ease of changing in a quickly-moving marketplace

FIG. 18

* same custom pagination technology is used here

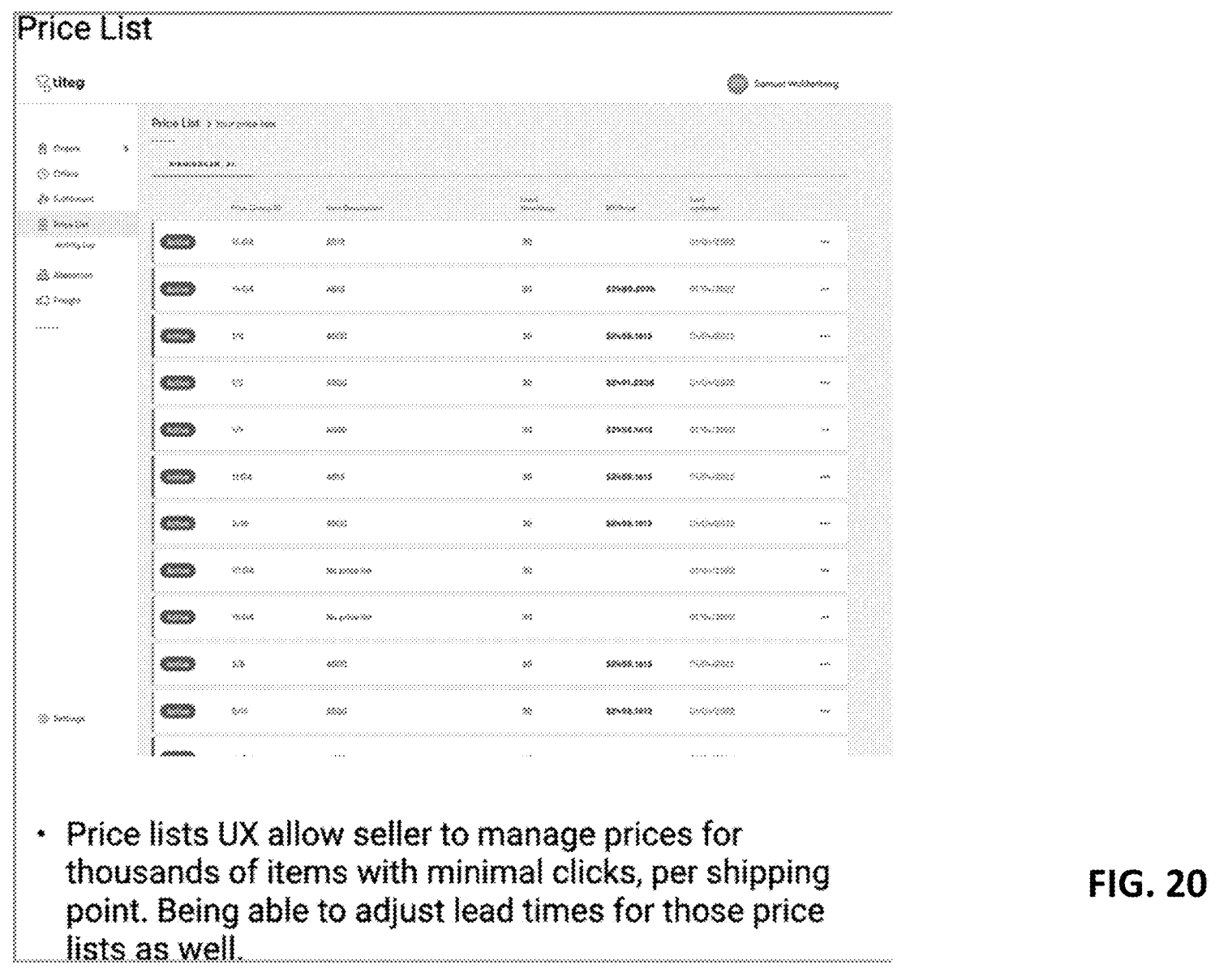

- Price lists UX allow seller to manage prices for thousands of items with minimal clicks, per shipping point. Being able to adjust lead times for those price lists as well.

FIG. 20

Offering: Markets, Lead times, Block Buyers, Anonymity

- Sellers can choose to be anonymous to buyers

- Sellers can use their own freight prices, or we can have titeg-level freight that makes shipping easier

- Sellers go through an order review and approval process

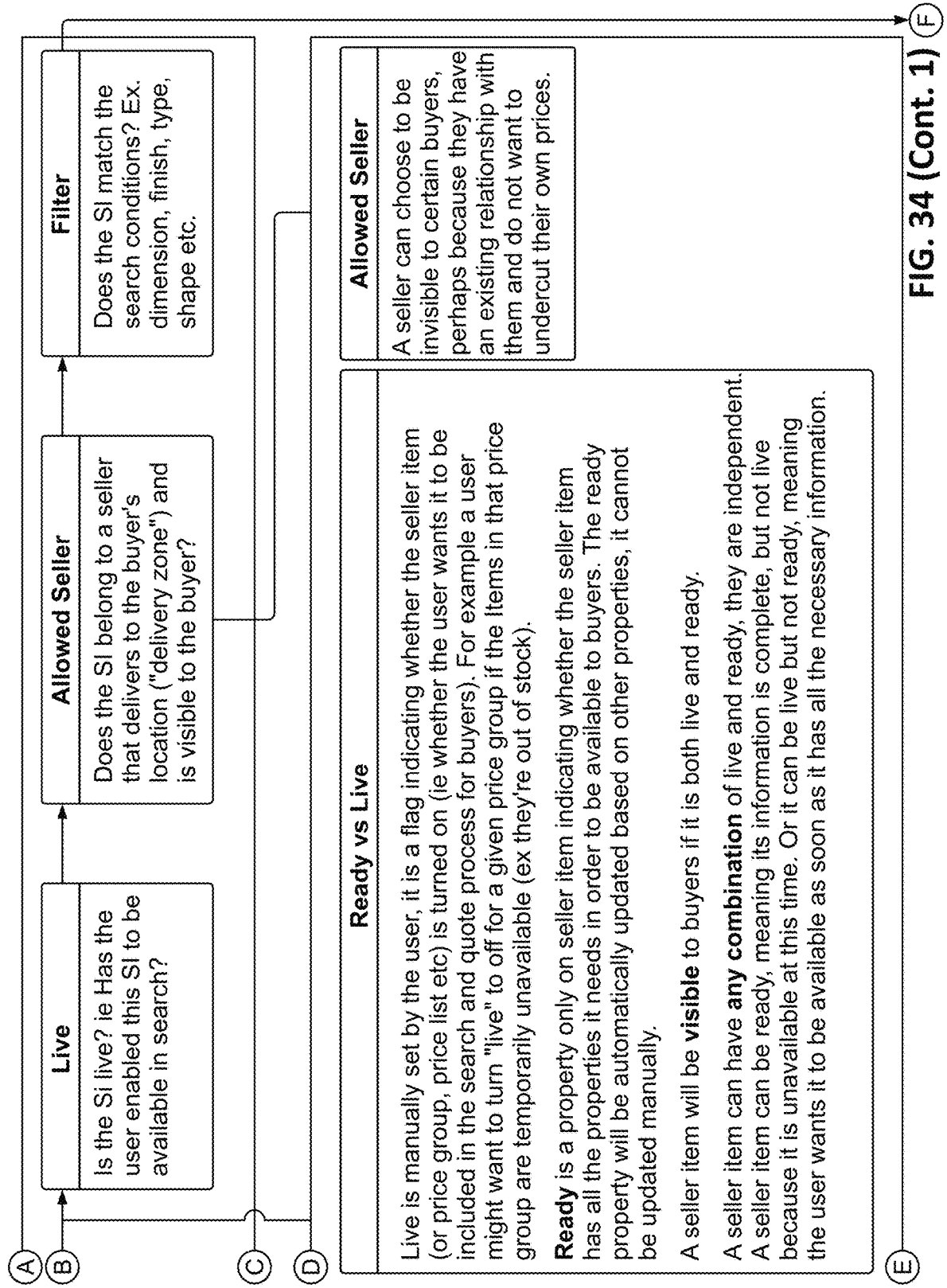

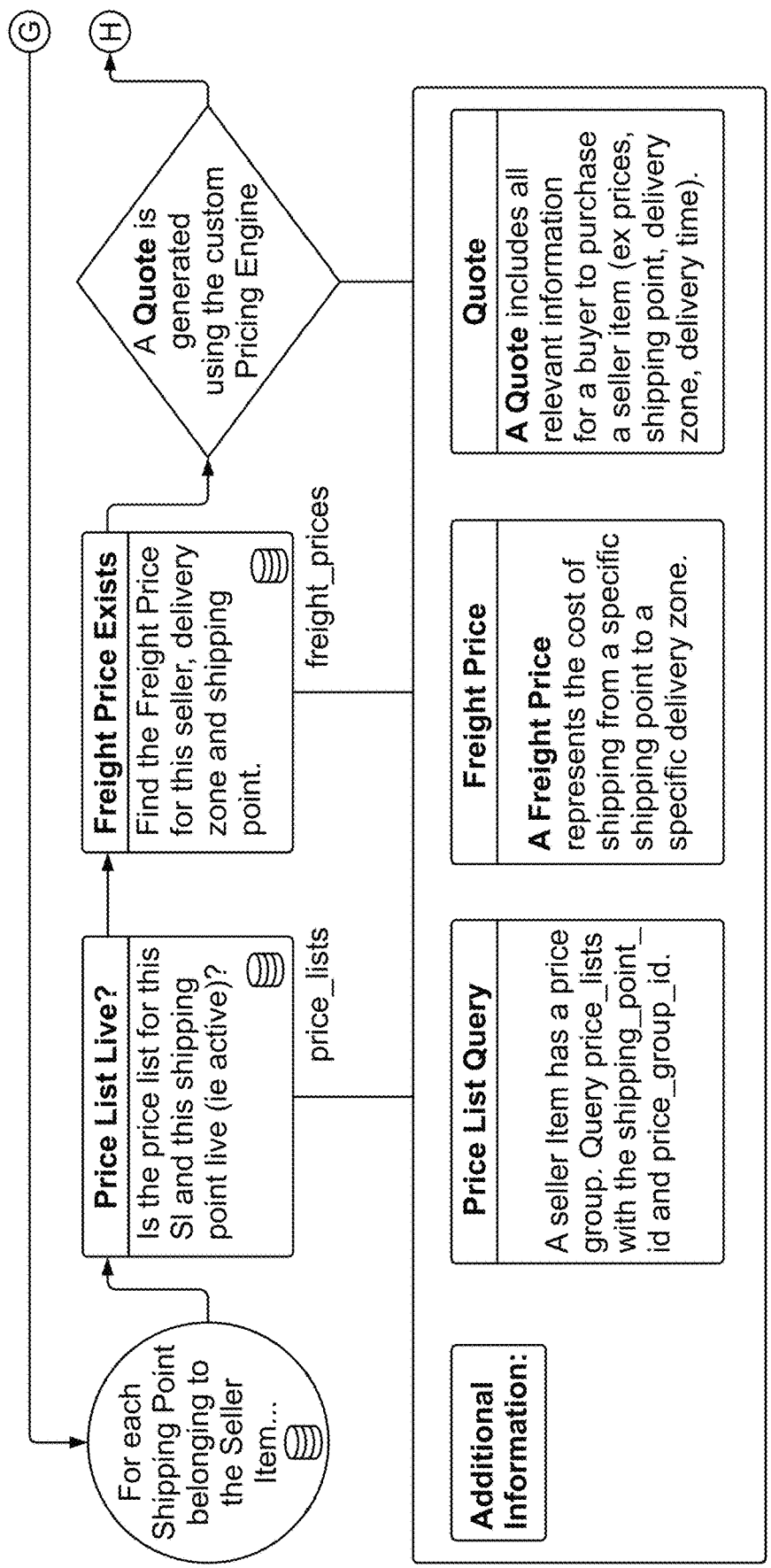
FIG. 34 (Cont. 2)

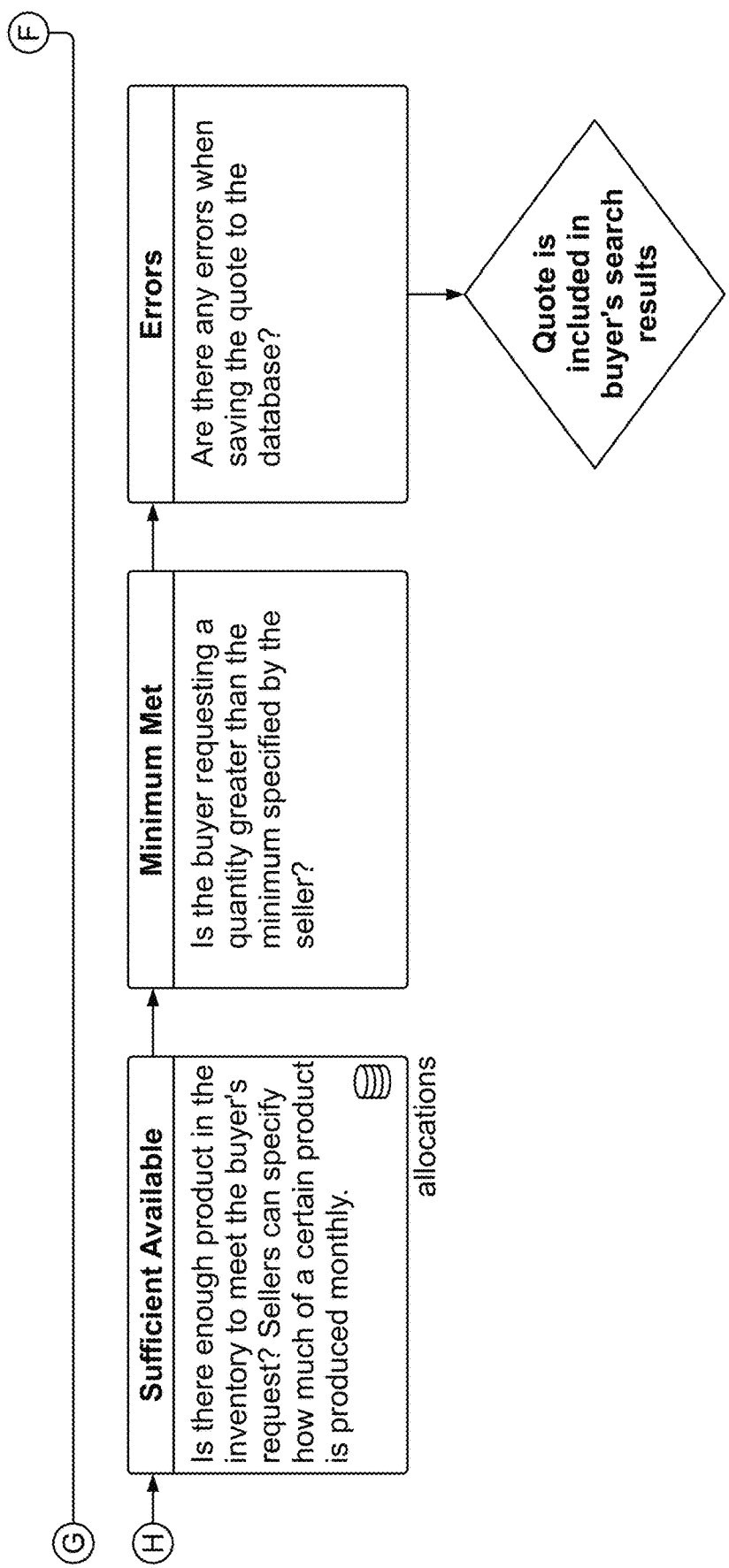
FIG. 34 (Cont. 3)

COMPUTER-BASED PLATFORMS FOR EXCHANGING DATA OBJECTS

FIELD OF TECHNOLOGY

The present disclosure generally relates to improved computer-based platforms for exchanging data objects.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 5 is a search result/buy GUI screenshot that displays quotes to the buyer based on the buyer's search criteria in accordance with one or more embodiments of the present disclosure;

FIG. 11 is a GUI screenshot summarizing all of the buyer's orders that are pending approval by seller(s) in accordance with one or more embodiments of the present disclosure;

FIG. 18 is a GUI screenshot showing price group items with customization pagination technology in accordance with one or more embodiments of the present disclosure;

FIG. 20 is a GUI screenshot of a price list page which allows the seller to manage prices for a plurality of items in accordance with one or more embodiments of the present disclosure;

BACKGROUND OF TECHNOLOGY

Figure 1A:
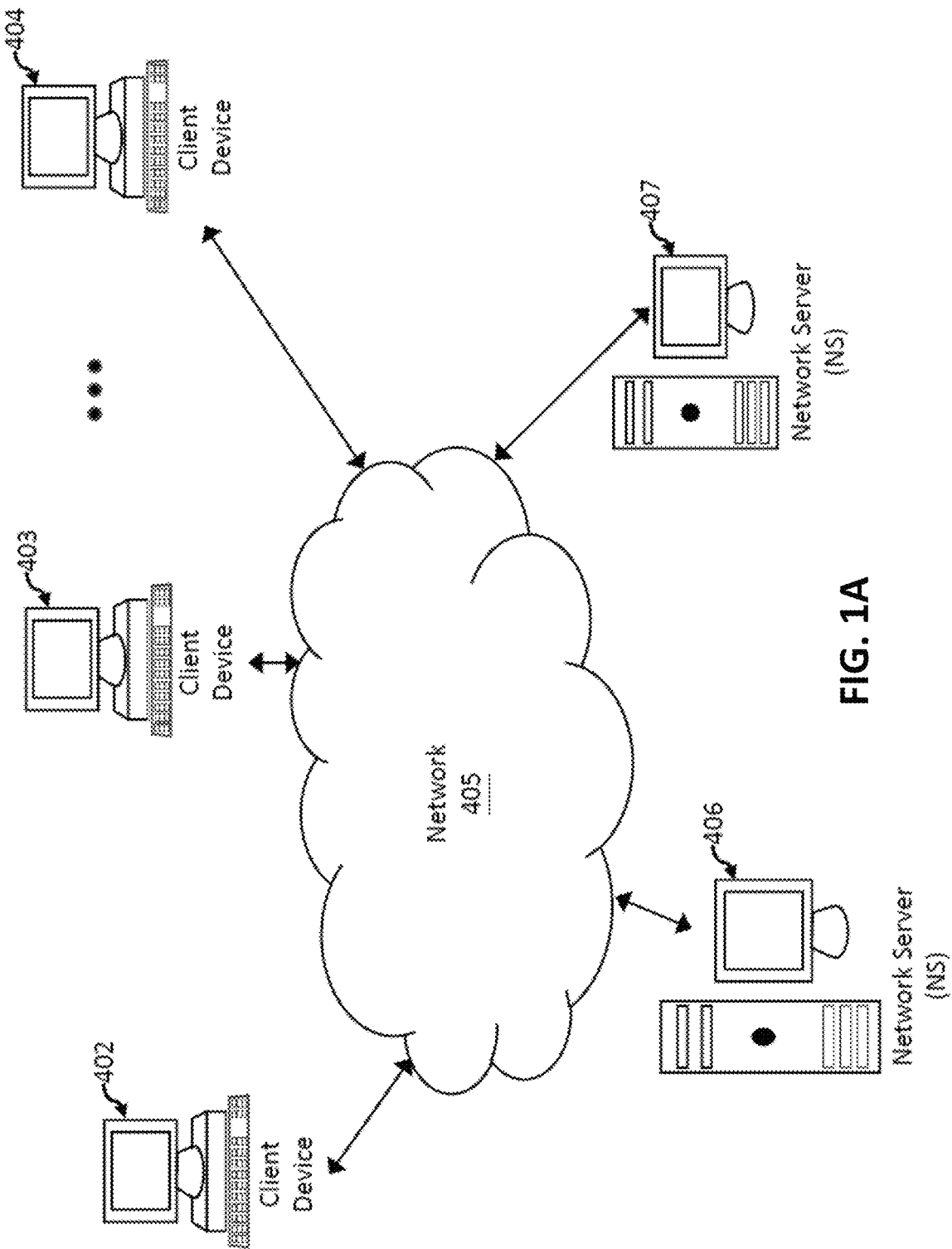
FIG. 1A depicts a block diagram of an exemplary computer-based system/platform in accordance with one or more embodiments of the present disclosure.

A computer network platform/system may include a group of computers (e.g., clients, servers, smart routers (e.g., exchange smart routers)) and other computing hardware devices that are linked together through one or more communication channels to facilitate communication and/or resource-sharing, via one or more specifically programmed graphical user interfaces (GUIs) of the present disclosure, among a wide range of users.

SUMMARY

In some embodiments, the present disclosure provides an exemplary technically improved computer-based system that may include at least one non-transitory memory storing computer code, and at least one processor which, when executing the computer code, is configured to receive a first request from a user comprising a request for data elements; where the request for data elements may include at least one data type, and at least one data unit based on a data vehicle type for exchanging the at least one data type to the user; transmit the first request over a communication network to a plurality of first servers; where the first request may initiate an application programming (API) call to remotely program a database in each of the plurality of first servers to identify at least one data element stored in the database matching data elements in the first request, and transmit, in response to the first request, at least one data object including the at least one identified data element from the plurality of first servers and an availability date; receive over the communication network, the at least one data object from the plurality of first servers; display on a graphic user interface (GUI) on a display, a list of the at least one identified data element for each of the at least one data object; receive from the user via the GUI, a chosen data element from any of the at least one identified data element displayed in the list; where the chosen data element may be associated with a particular first server from the plurality of first servers; and transmit a second request over the communication network to the particular first server; where the second request may include the at least one data type, and a number of data units of the at least data type to exchange based on the data vehicle type.

In some embodiments, the present disclosure provides an exemplary technically improved computer-based method that includes at least the following steps of receiving, by at least one processor, a first request from a user comprising a request for data elements. The request for data elements may include at least one data type, and at least one data unit based on a data vehicle type for exchanging the at least one data type to the user. The first request may be transmitted over a communication network to a plurality of first servers. The first request may initiate an application programming (API) call to remotely program a database in each of the plurality of first servers to identify at least one data element stored in the database matching data elements in the first request by the user, and transmit, in response to the first request, at least one data object including the at least one identified data element from the plurality of first servers and an availability date. The at least one data object from the plurality of first servers may be received over the communication network. A list of the at least one identified data element for each of the at least one data object may be displayed on a graphic user interface (GUI) on a display. A chosen data element from any of the at least one identified data element displayed in the list may be received from the user via the GUI. The chosen data element may be associated with a particular first server from the plurality of first servers. A second request may be transmitted over the communication network to the particular first server. The second request may include the at least one data type, and a number of data units of the at least data type to exchange based on the data vehicle type.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein describe improved computer-based platforms for exchange physical commodities such as steel. A server (e.g., at least one processor of the server) may execute computer code that implements a closed exchange platform application (known hereinafter as the "application") for the pricing and trading of steel. The closed exchange platform application may be managed by an entity and the server may be alternately referred to as an entity server. The server may be communicatively coupled to a plurality of computing devices associated with buyers and a plurality of computing devices associated with sellers of steel. The exchange platforms may be used in a closed marketplace for pricing and trading steel such that certain buyer computing devices and certain seller computing devices may be enabled to access the exchange platform running on the server to trade steel.

In some embodiments, the server may provide pricing that is geographically-based such that the application automatically adds the cost of freight in a particular location into the pricing engine. Furthermore, from a user's perspective (e.g., the buyer), the application allows the buyer to search through hundreds of thousands of different steel products at different companies and in different locations in seconds. Furthermore, the quantity of steel may be sold in a unit of measure of a truckload. A truckload as a unit of measure in the U.S. may legally fit 46,500 pounds in a truck on the street. However, a truckload, for example, depending on the jurisdiction may weigh 25,000 to 120,000 pounds. Even though the application in principle may be configured to search for steel inventories and future rollings in smaller quantities such as by pounds, pieces, metric tons, and/or feet, the application is configured to provide the cheapest and most competitive pricing to the buyer by selling steel in units of a truckload.

In some embodiments, selling by the truckload may also maximize the weight to freight for the order, which allows for more competitive pricing. This may also allow for steel mills to prepare customer orders more efficiently in selling by the truckload instead of by individual pieces.

In some embodiments, suppose that a plurality of different factories or steel mills that may roll out products of interest to the buyer. The application may allow the buyer to search for steel from the plurality of different steel mills, on future rollings, and custom material, and then to obtain instant, real-time pricings on these items. The pricing shown in the search results may be displayed to the buyer and the pricing generated by the price engine may automatically account for seller markup, packaging and shipping costs, location, delivery time and/or general availability for a particular seller.

In some embodiments, the instant pricings for delivery at later dates may be indicative of a future rollout in a month, for example, of steel manufacturing runs at a particular location that may be priced lower than a truckload of steel that is ready for shipping in a week. Nevertheless, the instant pricings for delivery at later dates may be indicative of a future rollout in days, weeks, months, or any suitable later date depending on the particular seller.

In some embodiments, the exchange platform application may assess the actual size of the truckload, but the steel comes in bundles. The steel may be bundled in a certain quantity and the exchange platform may assess as to how many bundles that may fit on a truck without the truck being over the weight limit. The exchange platform application may assess how much to offer a buyer in terms of a specific price per any suitable unit of measure such as, for example, pounds, pieces, metric tons, and/or feet. The exchange platform application may then calculate how many bundles that may fit on the truck to set the price.

In some embodiments, the exchange platform application may be configured to suggest to the seller how to load the steel on the truck in the most optimal configuration for configuring the truckload (e.g., providing steel bundle and truck dimensions, and weight specifications). In other embodiments, the exchange platform application may be configured to physically remotely control or program the packaging system equipment at the steel mill and packing facility of the seller to load the steel on the truck in the most optimal configuration for configuring the truckload.

In some embodiments, the graphic user interface on the buyer's client device may allow the buyer, upon identifying a seller from the search, to enter an order with the prospective seller. Upon entering the order, the exchange platform application generates an order number with a message that the order is in progress. The server then relays the order to the seller's computing device, for example, at a steel mill or other suitable location, so as to allow the seller to accept or reject the order.

In some embodiments, with regard to the seller flow, the seller via the seller's computing device accesses the add products page of the exchange platform application to enter the details of the product offer. This may include for example, manufacturing capabilities, the shape of steel tubing round, square, a type of finish, the weight for each item, price per metric ton of steel, how many pieces are compartmentalized into a bundle, lead times to manufacture, what is their truckload minimum for this product, freight availability, and/or delivery times. Once an item data entry is completed and enabled to displayed in the seller interface, the exchange platform application may categorize it into a price group, so all steel items for a particular seller may be linked to a particular seller's profile. A seller may have, for example, 50,000 items that they may be viewable by a buyer on the exchange platform application. The seller's items are not limited to 50,000 items but may include 10, 100, 1000, 10,000, 100,000, or 1,000,000 items. The seller may then add the lead times, and/or the number of days to manufacture per group so as to be able to manage the rolling manufacturing schedules at a particular steel mill. The lead time and/or the number of days to manufacture per group is not limited to a number of days but may also be a number of weeks or months, for example.

In some embodiments, the buyer may make an offer, thus requesting a lower price and presenting the seller with an offer lower than the official seller's quote. On the seller side, the seller may either reject or accept the offer. In other embodiments, once the shipment is ready and the steel is ready to be shipped to the buyer, the seller may enter into the seller's GUI, the shipping number, the invoice number, bill of lading, and the quantity shipped, which may be then relayed to the buyer (e.g., the buyer's computing device).

The buyer and seller process flows used in the commodity exchange platform application that are executed by the processor of the server are further defined hereinbelow. The exemplary embodiments shown herein use a exchange platform application for the purchase of steel, however this is not by way of limitation of the embodiments disclosed herein. The exchange platform application may be used for the purchase of any suitable commodity in a closed network of buyers and sellers.

FIG. 1A depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1A, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like.

In some embodiments, the system 400 may be used for executing computer code for implementing the exchange platform application on one or both of the servers 406 and/or 407 for exchanging commodities such as steel as described herein so as to implement the buyer and seller trading flows as will be shown hereinbelow. Any number of N client devices, where N is an integer, shown as client devices 402, 403, and 404 may represented the client devices used by a buyer or seller.

In some embodiments, the client devices 402-404 may be personal computers, multiprocessor systems, microprocessor-based or programmable consumer electronics, network PCs, and the like. In some embodiments, one or more client devices within client devices 402-404 may include computing devices that typically connect using a wireless communications medium such as cell phones, smart phones, radio frequency (RF) devices, infrared (IR) devices, CBs, integrated devices combining one or more of the preceding devices, or virtually any mobile computing device, and the like.

In some embodiments, one or more client devices within client devices 402-404 may be devices that are capable of connecting using a wired or wireless communication medium such as a laptop, tablet, desktop computer, a netbook, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more client devices within client devices 402-404 may include may run one or more applications, such as Internet browsers and/or mobile applications, for example, that may provide graphical user interfaces (GUI) to a buyer and/or a seller for accessing the exchange platform.

In some embodiments, one or more client devices within client devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like.

In some embodiments, the exemplary network 405 may provide network access, data transport and/or other services to any computing device coupled to it. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one or more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users (e.g., buyers and/or sellers) that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Smartphone, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

In some embodiments, all of the information and/or implementations described hereinabove for FIG. 1A may be equally applied to the embodiments shown in FIGS. 1B-1C hereinbelow.

Figure 1B:
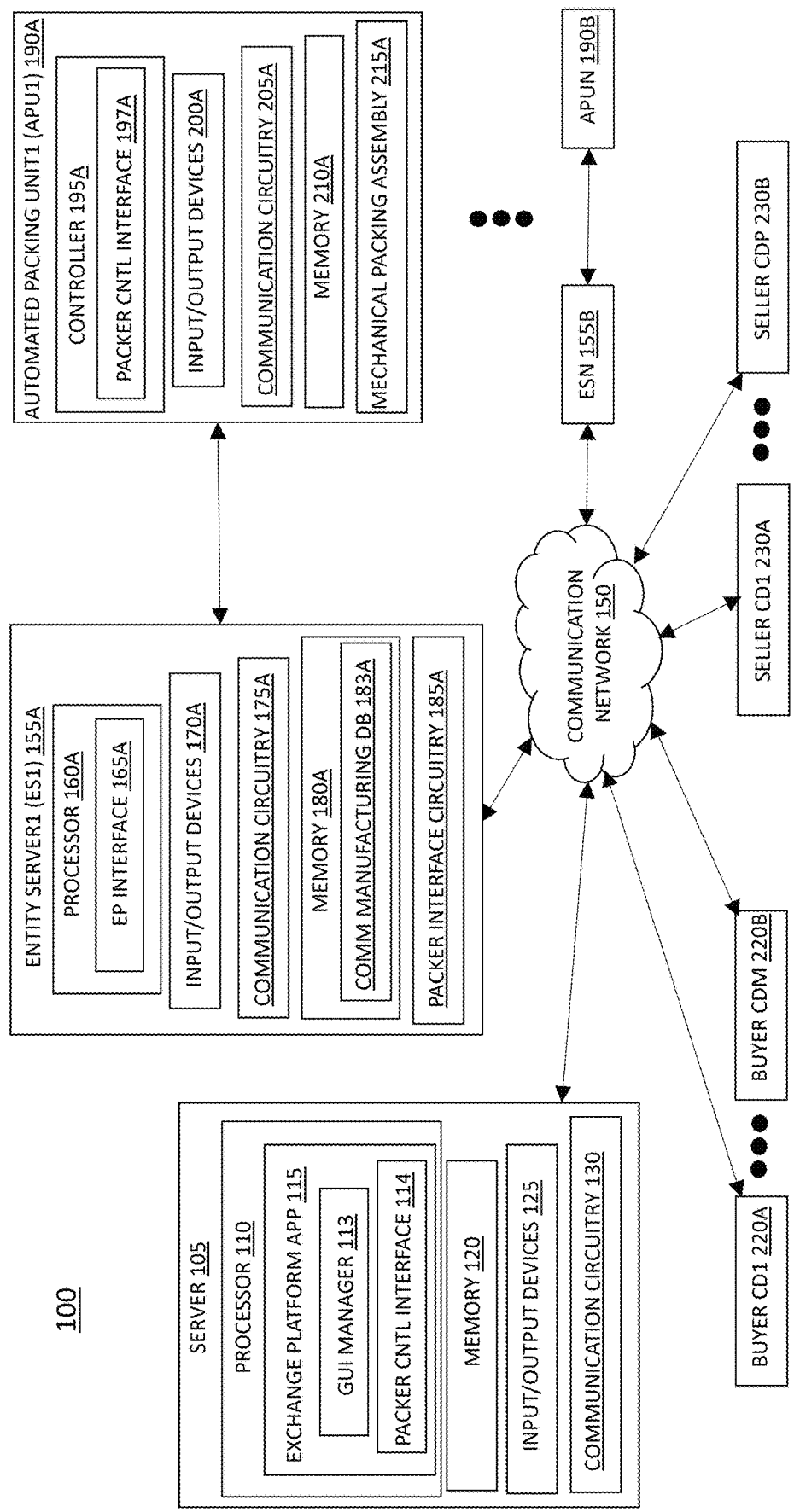
FIGS. 1B and 1C depicts different views of a computer-based platform for exchanging data objects in accordance with one or more embodiments of the present disclosure.
Figure 1C:
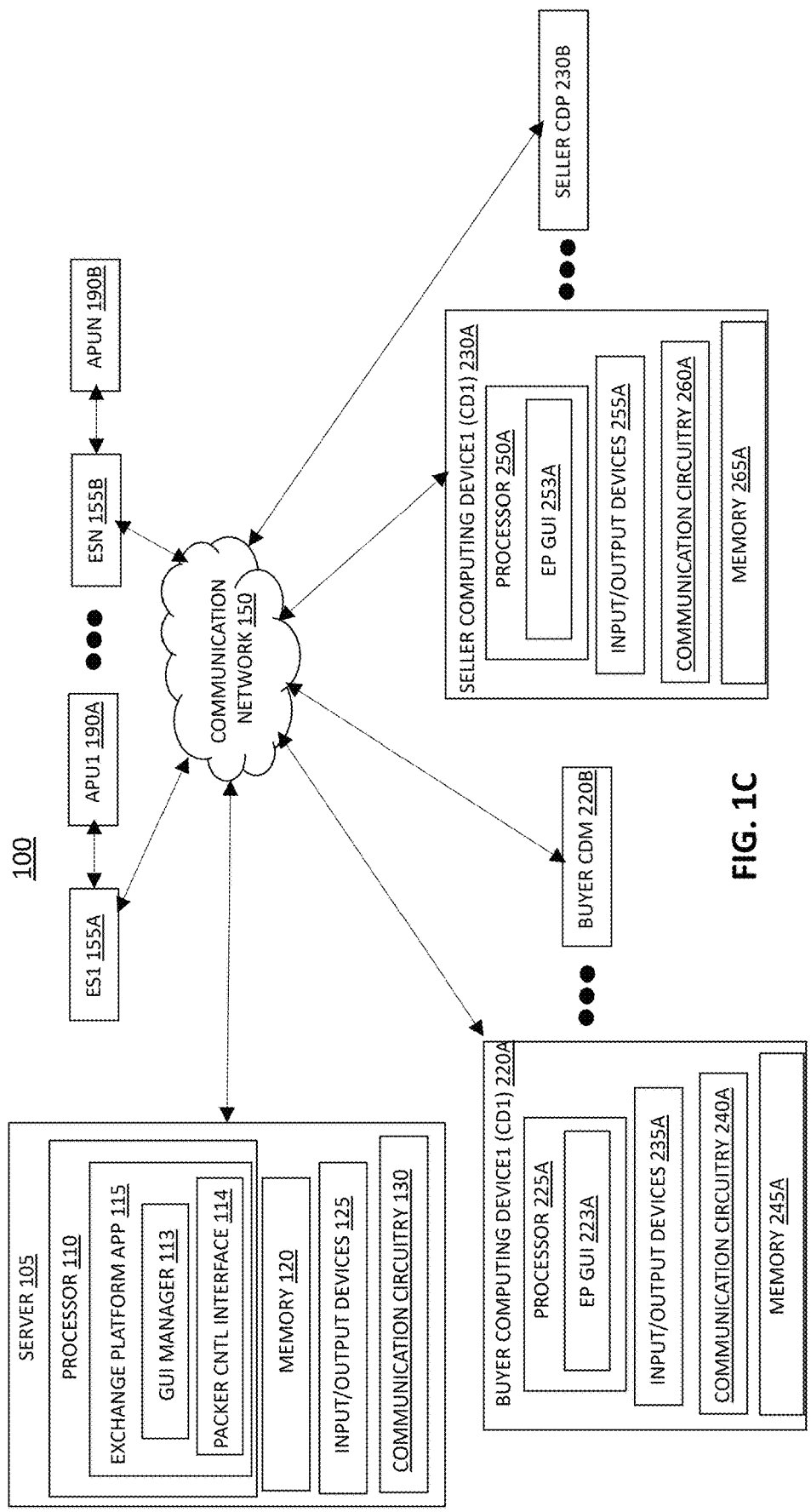

FIGS. 1B and 1C depicts different views of a computer-based platform 100 for exchanging data objects in accordance with one or more embodiments of the present disclosure. The platform 100 may include a server 105, a plurality of N entity servers denoted ES1 155A . . . ESN 155B coupled to respective plurality of N automated packing units denoted APU1 190A . . . APUN 190B, a plurality of M buyer computing devices denoted CD1 220A . . . CDM 220B, and a plurality of P seller computing devices denoted CD1 230A . . . CDP 230B, all communicating over a communication network 150 where M, N, and P are integers.

Note that the terms exchange platform and trading platform may be used interchangeably herein. The term data objects may refer to data objects referring to physical commodities for exchange.

In some embodiments, the server 105 associated with a company managing a closed exchange platform may include a processor 110, a non-transitory memory 120, input/output devices 125, and communication circuitry 130 for communicating with other devices over the communication network 150 as shown both FIGS. 1B and 1C. The processor 110 may execute a exchange platform application 115 that may further include a graphic user interface (GUI) manager 113 for controlling the exchange platform GUIs on each of the buyer and seller computing devices, and a packer control interface 114 for sending control commands to any of the plurality of N automated packing units APU1 190A . . . APUN 190B.

In some embodiments, the plurality of N entity servers 155A . . . 155B may be associated with a commodity manufacturing company, such as but not limited to a steel mill, for example. Each of the N plurality of entity servers 155 may be coupled to a respective plurality of N automated packing units denoted APU1 190A . . . APUN 190B. Each entity server may include the same components as shown in an enlarged view of ES1 155A: a processor 160A, input/output devices 170A, and communication circuitry 175A, a non-transitory memory 180A, and a packer interface circuitry 185A for sending control commands to the automated packing unit APU1 190A such as received from the packer control interface 114, for example. The processor 160A may be configured to execute a exchange platform interface 165A relaying data over the communication network 150 with the exchange platform application 115. The non-transitory memory 180A may store a commodity manufacturing database (DB) 183A with data such as for example, but not limited to commodity type, commodity inventories, commodity fabrication/milling schedules, available shipping dates, and/or trucking size/weight limit specifications for transport.

In some embodiments, as shown in FIG. 1B, each automated packing unit may include the same components as shown in an enlarged view of APU1 190A: a controller 195A, input/output devices 200A, a communication circuitry 205A, a non-transitory memory 210A, and a computer-controlled mechanical packing assembly 215A such as a computer-controlled forklifts and/or cranes and/or load restraint equipment for loading trucks for the transport of the commodities such as for example, but not limited to steel. The processor 195A may receive commands in the packer control interface 197A from the packer control interface of the server 105 based on the operations of the exchange platform application 115 so as to control the computer-controlled forklifts and/or cranes and/or load restraint equipment. In other embodiments, an operator may receive manual instructions from the packer control interface of the server 105 for a team for operating forklifts and/or cranes and/or load restraint equipment for loading trucks for the transport of the commodities such as for example, but not limited to steel.

In some embodiments, as shown in FIG. 1C, each buyer computing device from the plurality of M buyer computing device may include the same components as shown in an enlarged view of CD1 220A: a processor 225A, input/output devices 235A, a communication circuitry 240A, and a non-transitory memory 245A. The processor 225A may receive instructions from the GUI Manager 113 to display on an interactive display (e.g., one of the input/output devices 235A), a exchange platform GUI 223A to a potential buyer. The exemplary screen snapshots that may be displayed to a buyer is disclosed hereinbelow.

In some embodiments, as shown in FIG. 1C, each seller computing device from the plurality of P seller computing device 230A . . . 230B may include the same components as shown in an enlarged view of CD1 230A: a processor 250A, input/output devices 255A, a communication circuitry 260A, and a non-transitory memory 265A. The processor 250A may receive instructions from the GUI Manager 113 to display on an interactive display (e.g., one of the input/output devices 255A), a exchange platform GUI 253A to a potential seller. The exemplary screen snapshots that may be displayed to the seller is disclosed hereinbelow.

In some embodiments, a seller may be a user of the exchange platform associated with an entity such as a commodity manufacturing company, such as but not limited to a steel mill, for example. In this case, as not shown in FIGS. 1B and 1C, any of the P seller computing device associated with a commodity manufacturing company user may be coupled to an entity server 155A . . . 155B. In other embodiments, a seller may work for or be associated with one or more entities and may provide information to potential buyers via any of the P seller computing device, e.g., not directly coupled to the entity servers 155A . . . 155B as shown in FIGS. 1B and 1C.

FIGS. 2-11 are graphic user interface (GUI) screenshots on EP GUI 223A of a buyer's platform flow displayed on a buyer's computing device 220A . . . 220B in accordance with one or more embodiments of the present disclosure. In other embodiments, the GUI may be displayed on any of the N client devices 402-404, for example.

Figure 2:
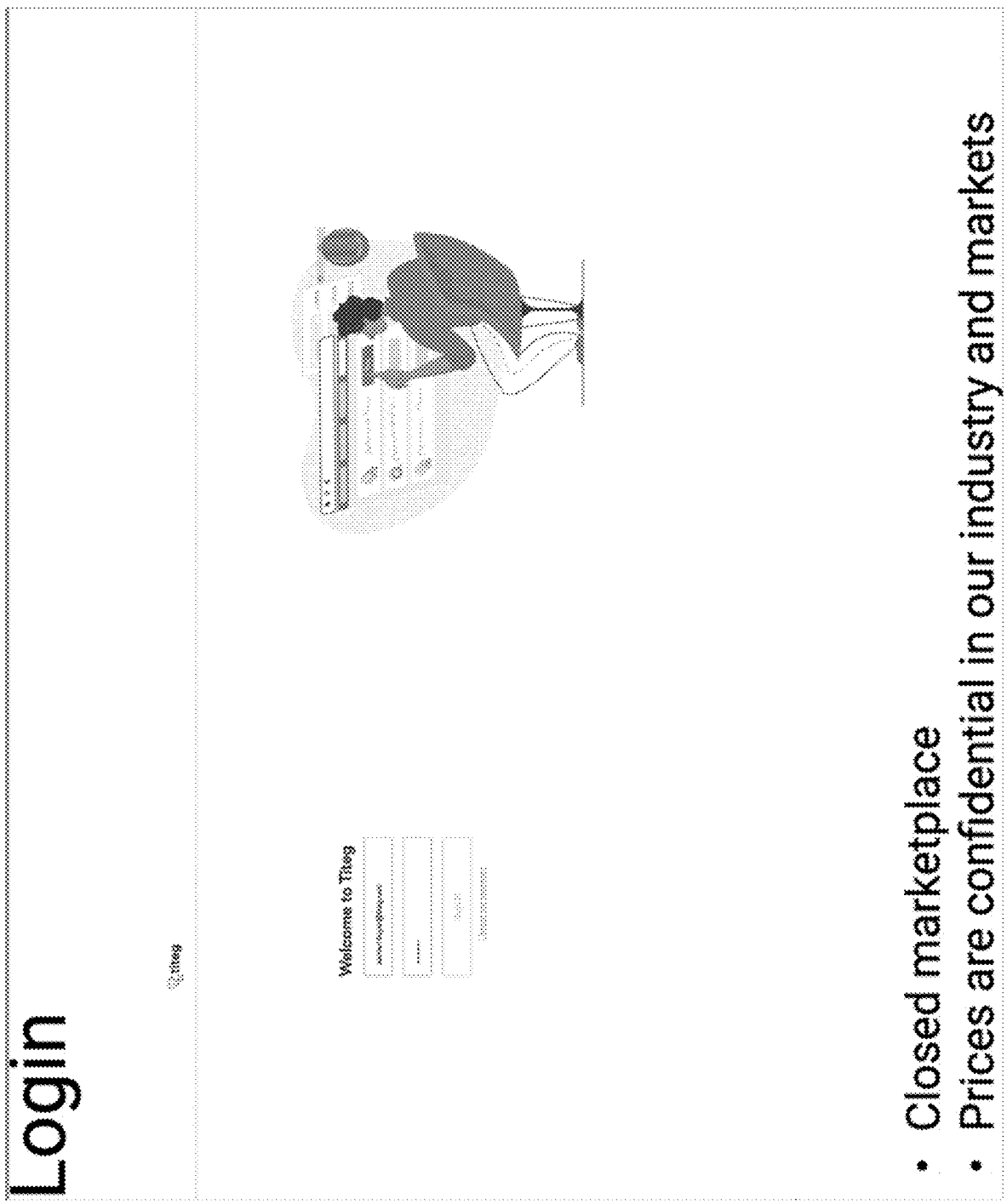
FIG. 2 is a login GUI screenshot for the buyer to login into the exchange platform application in accordance with one or more embodiments of the present disclosure.

FIG. 2 is a login GUI screenshot for the buyer to login into the exchange platform application to trade steel in a closed marketplace where all prices are confidential.

Figure 3:
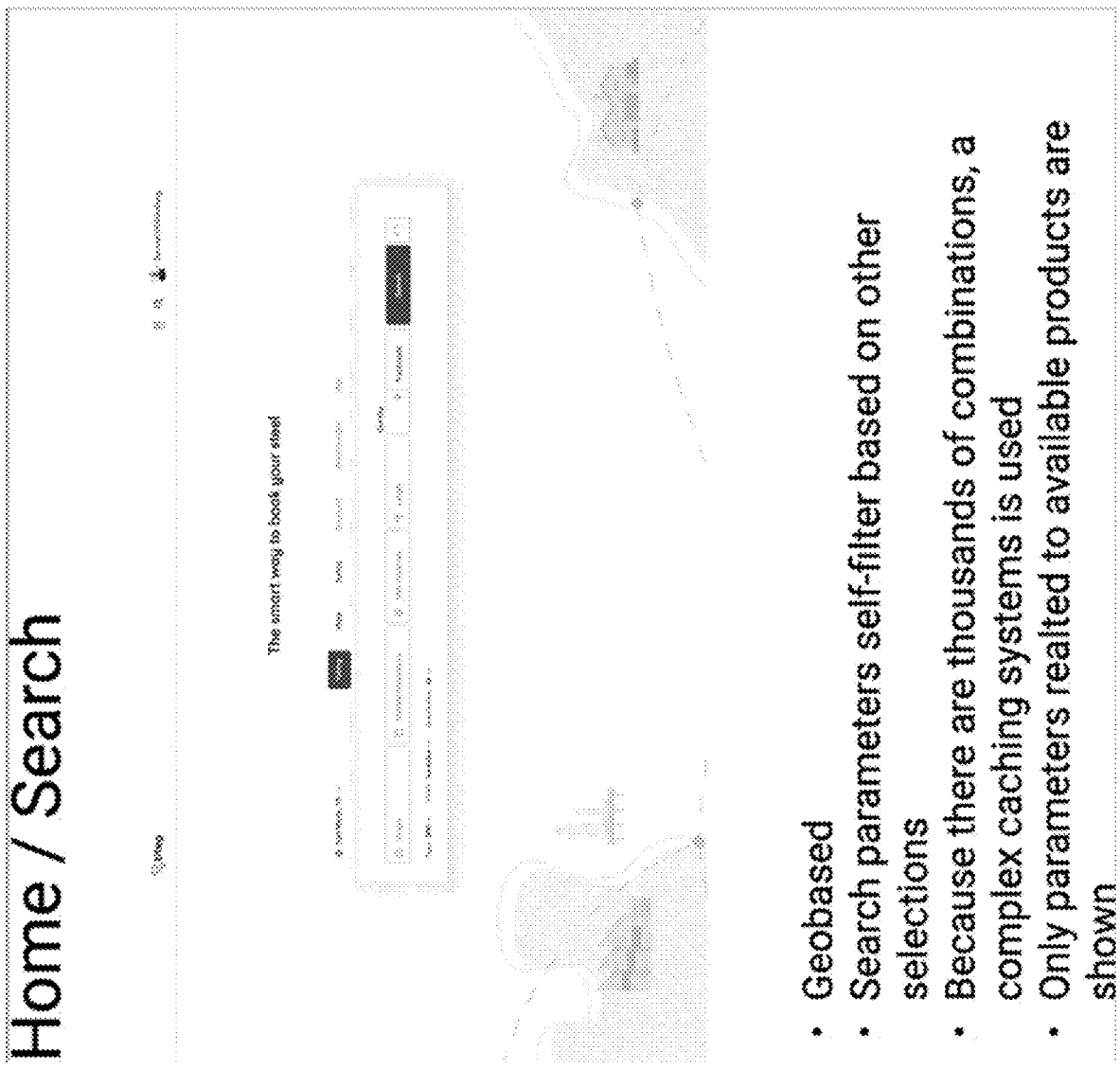
FIG. 3 is a home/search GUI screenshot for the buyer to search for the desired steel products in accordance with one or more embodiments of the present disclosure.

FIG. 3 is a home/search GUI screenshot for the buyer to search for the desired steel products. The search may be geobased. The search parameters may self-filter the available products to be displayed based on the previous search parameters previously entered by the buyer. Complex caching systems may be used.

Figure 4:
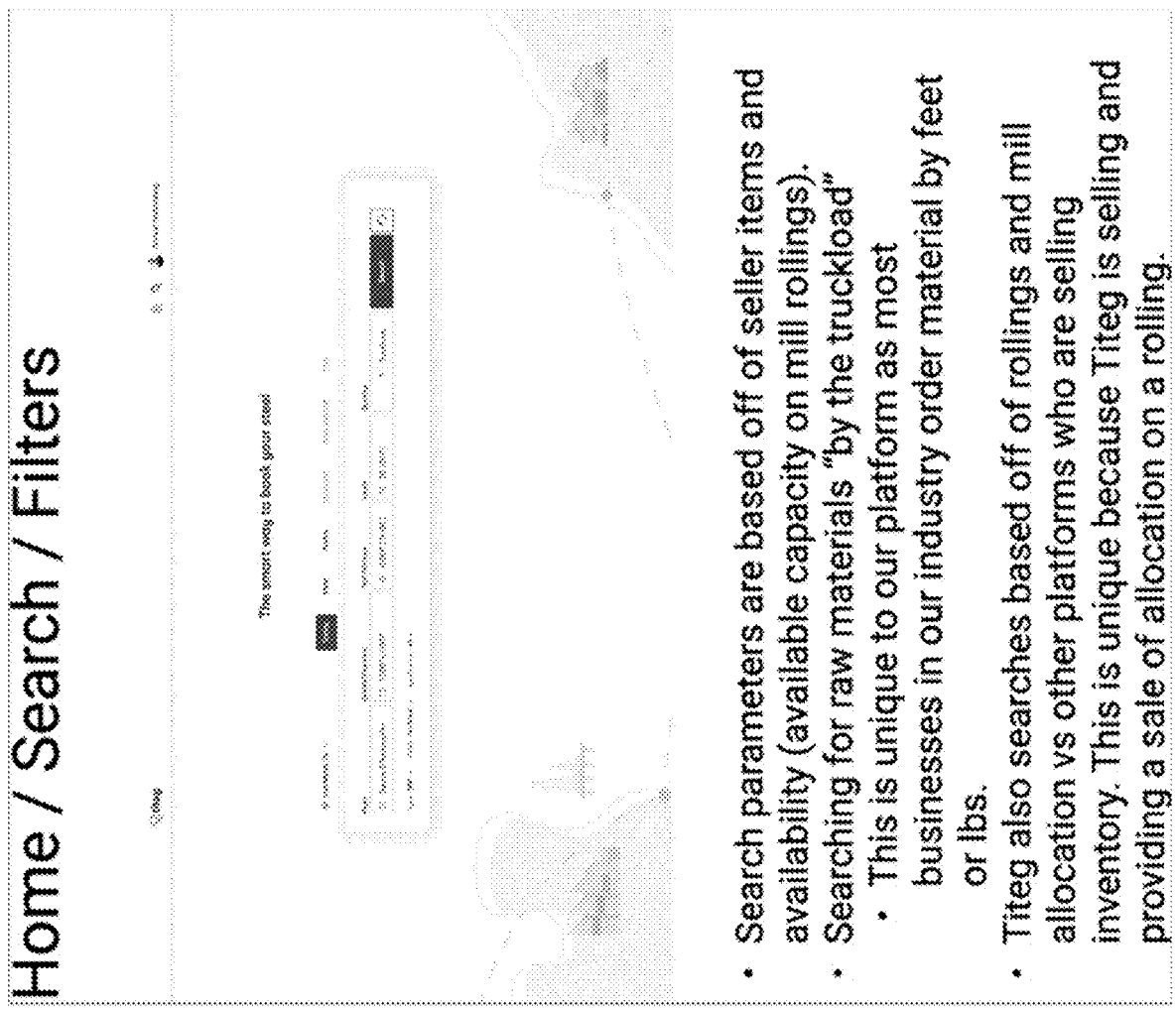
FIG. 4 is a home/search/filters GUI screenshot for the buyer to search for the desired steel products in accordance with one or more embodiments of the present disclosure.

FIG. 4 is a home/search/filters GUI screenshot for the buyer to search for the desired steel products. Search parameters are based on the seller's items and availability (e.g., available capacity of steel mill rollings). Searching for raw materials to purchase are presented in quantities with a granularity of a "truckload". The exchange platform application 115 may use information of steel mill rollings and steel mill allocations versus other platforms that are selling steel.

FIG. 5 is a search result/buy GUI screenshot that displays quotes to the buyer based on the buyer's search criteria. Quotes may be computed using a pricing engine running on the server. Custom pagination technology may be used to sort and search the results. Quotes may be specific to the buyer's location from a specific seller's location using a customized freight price. As a result, certain sellers may be invisible to certain buyers. Suggested and alternative products may be shown to the buyer based on the search query.

Figure 6:
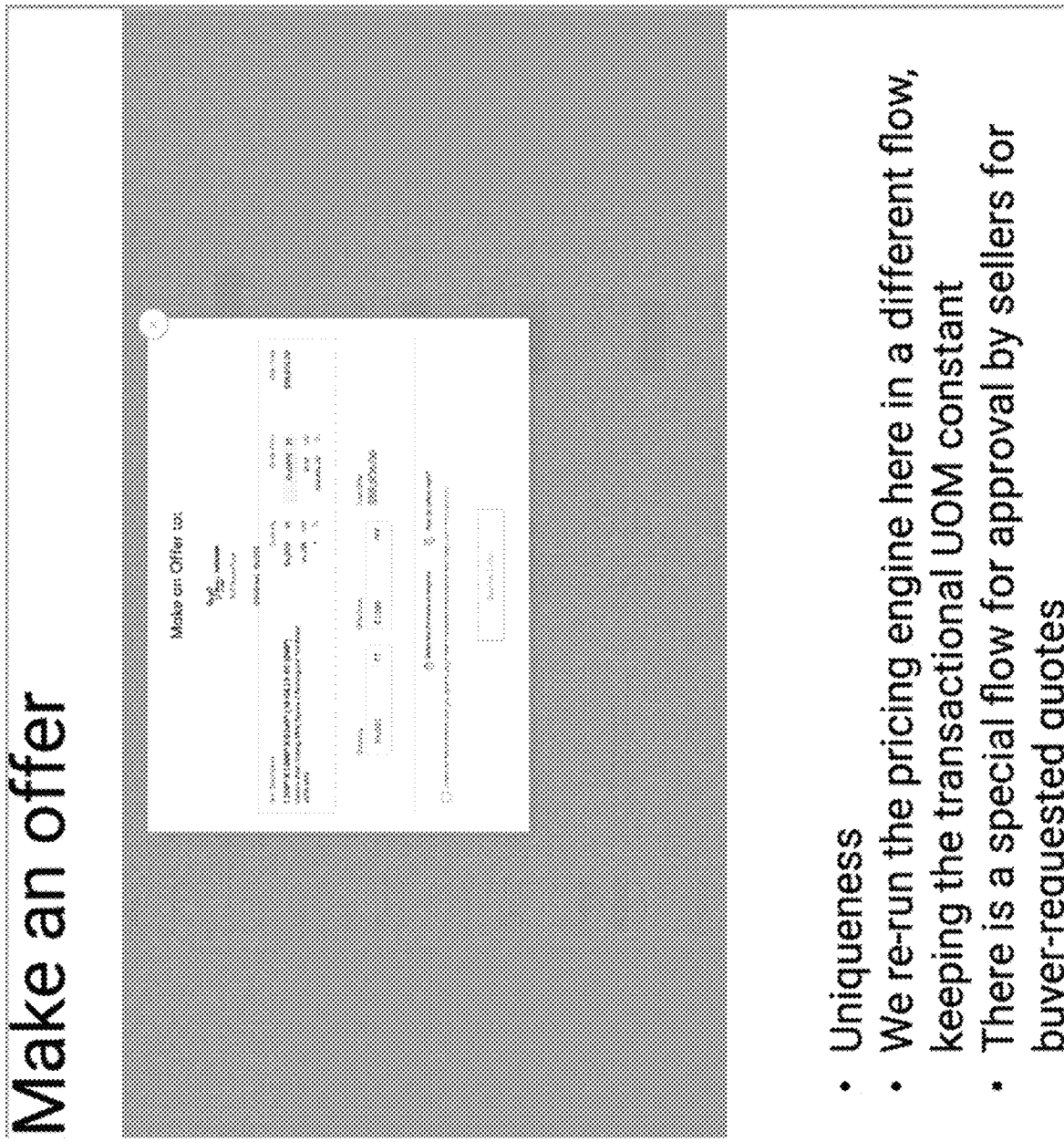
FIG. 6 is a GUI screenshot allowing the buyer to make a purchase offer in accordance with one or more embodiments of the present disclosure.

FIG. 6 is a GUI screenshot allowing the buyer to make a purchase offer. A pricing engine (e.g., pricing engine software module) may be executed in a different flow keeping the transactional unit of measure (UOM) constant. There may be a special flow for approval by sellers for the buyer-requested quotes (e.g., to give the buyer a special or more favorable quote).

Figure 7:
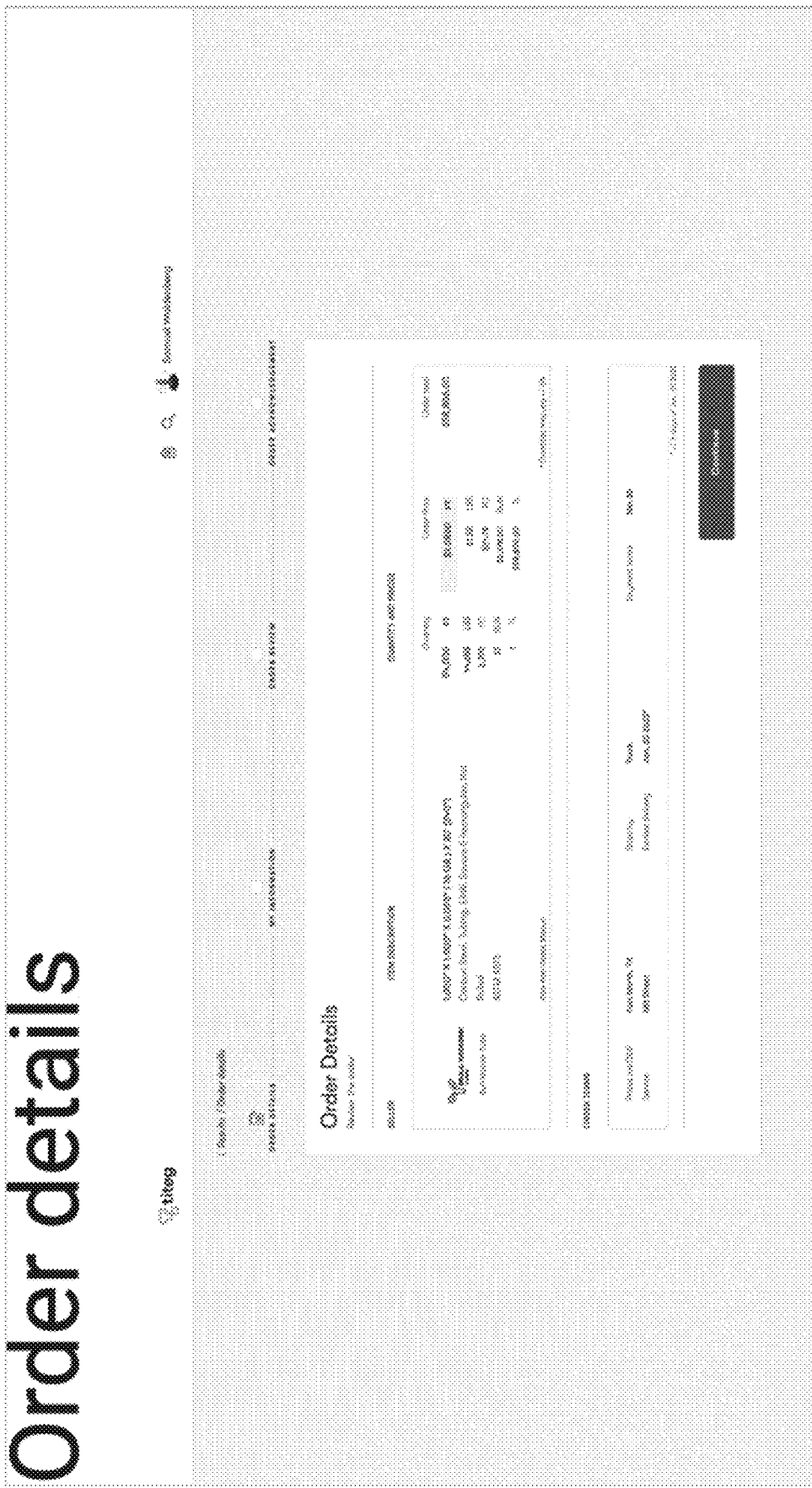
FIG. 7 is a GUI screenshot echoing back the order details to the buyer in accordance with one or more embodiments of the present disclosure.

FIG. 7 is a GUI screenshot echoing back the order details to the buyer.

Figure 8:
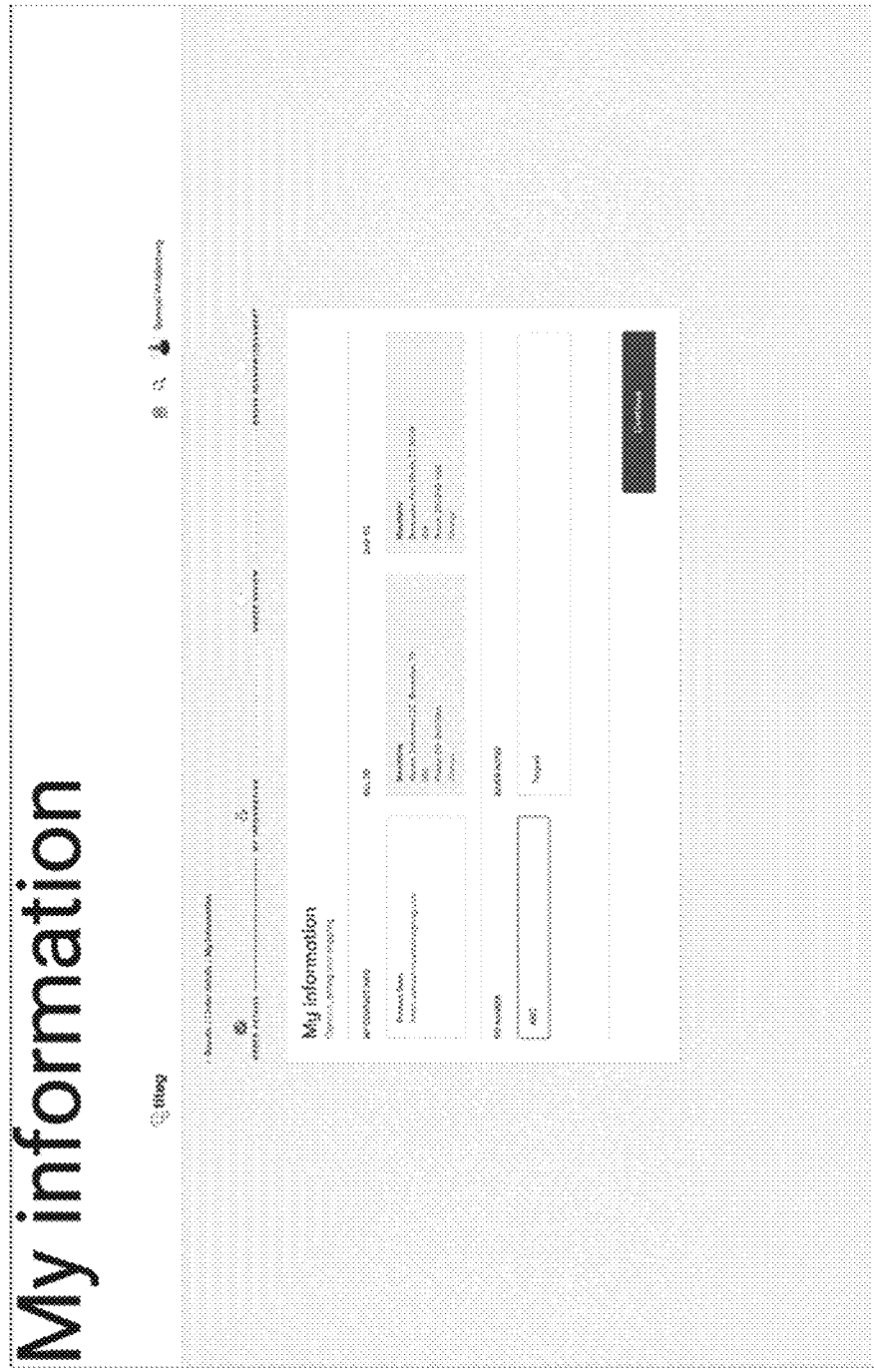
FIG. 8 is a GUI screenshot summarizing the buyer's information including the address in accordance with one or more embodiments of the present disclosure.

FIG. 8 is a GUI screenshot summarizing the buyer's information including the address. The address may be changed only if the new address is in the same delivery zone as the previously given address.

Figure 9:
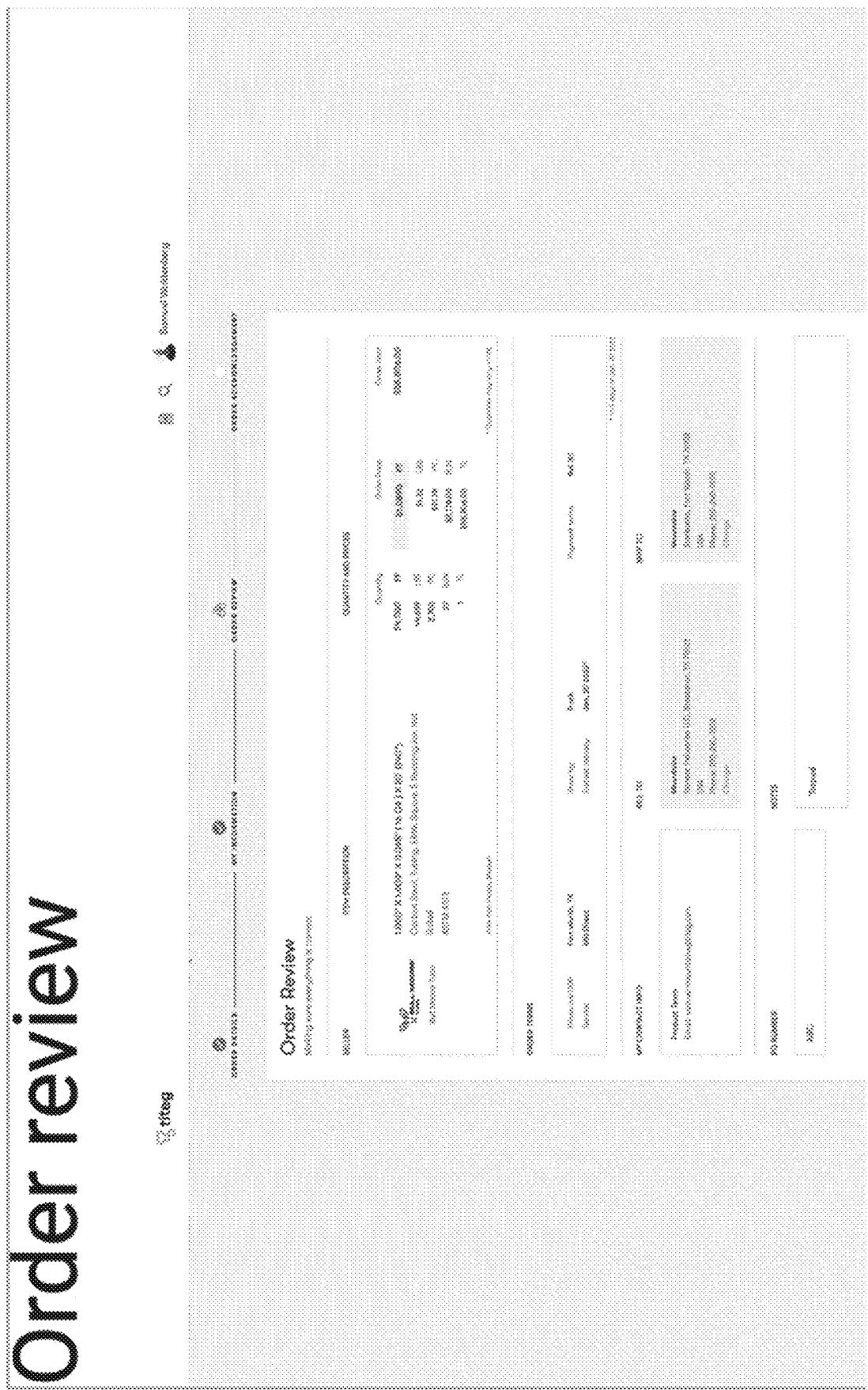
FIG. 9 is a GUI screenshot summarizing the order to allow the buyer to give a final review of the order before placing the order in accordance with one or more embodiments of the present disclosure.

FIG. 9 is a GUI screenshot summarizing the order to allow the buyer to give a final review of the order before placing the order.

Figure 10:
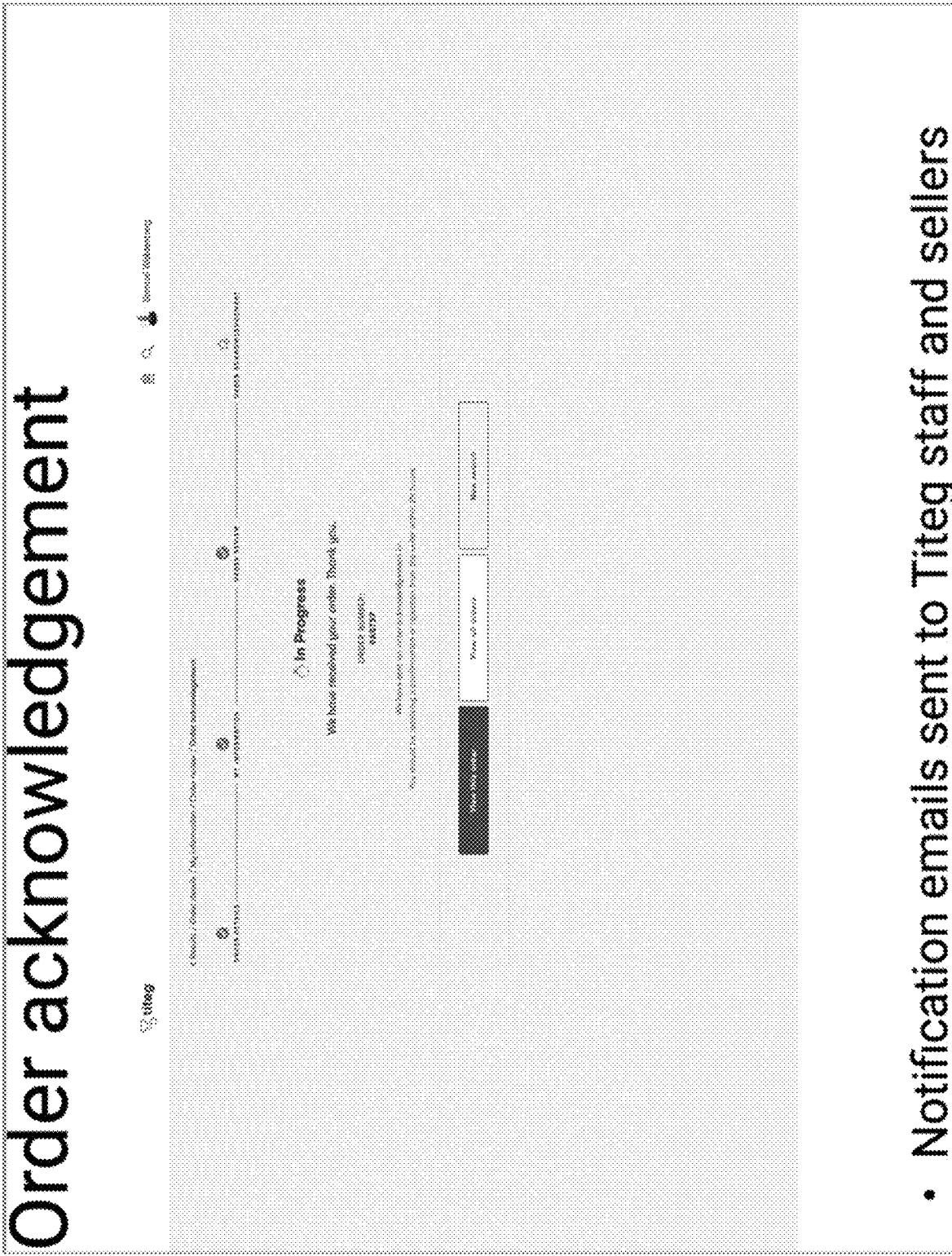
FIG. 10 is a GUI screenshot notifying the buyer with the order acknowledgment in accordance with one or more embodiments of the present disclosure.

FIG. 10 is a GUI screenshot notifying the buyer with the order acknowledgment. Notifications may be sent to the staff members of the entity managing the exchange platform application.

Figure 11:
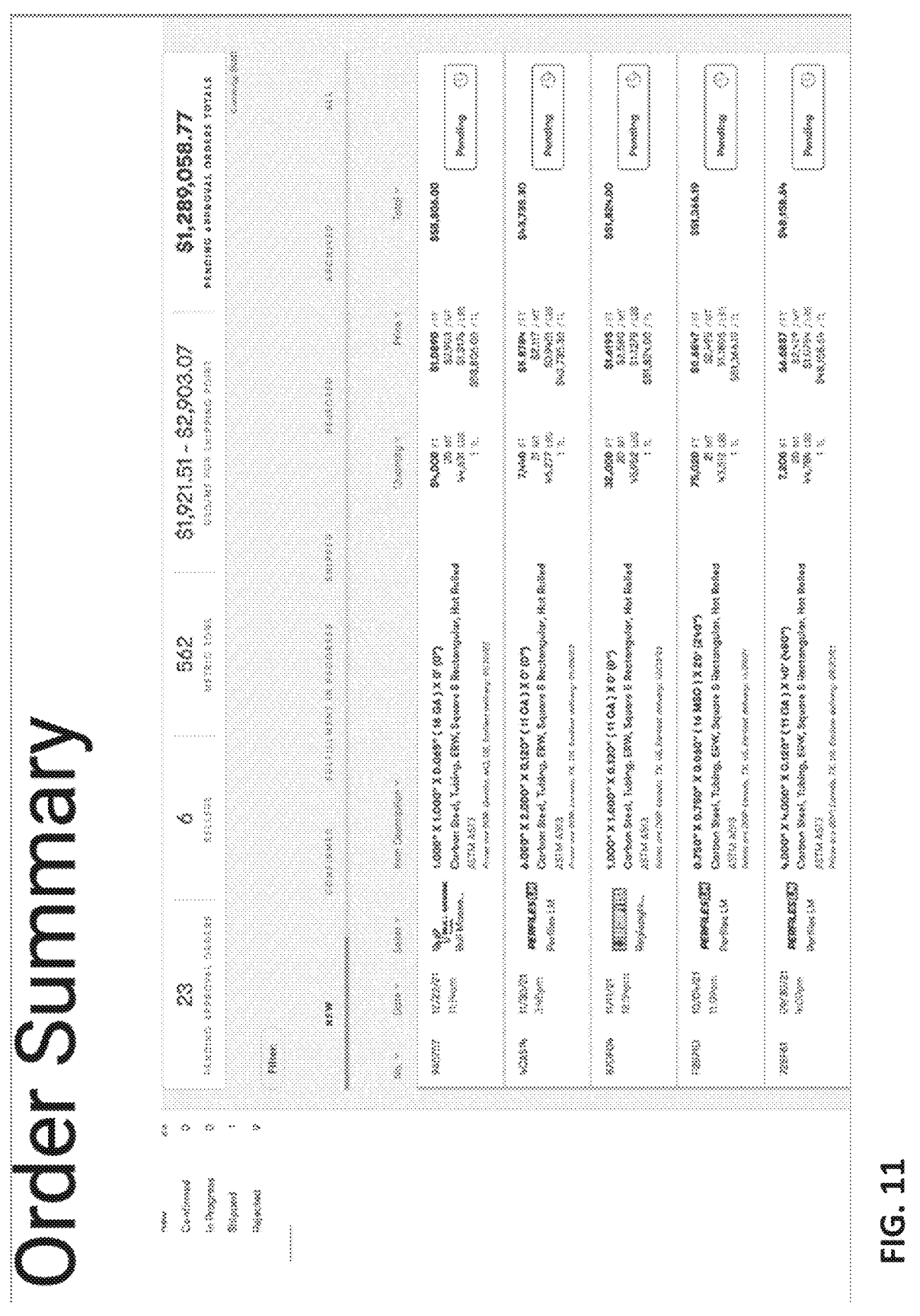

FIG. 11 is a GUI screenshot summarizing all of the buyer's orders that are pending approval by seller(s).

FIGS. 12-32 are GUI screenshots of a seller's platform flow displayed on a graphic user interface (e.g., EP GUI 253A . . . 253B) of a seller's computing device 230A . . . 230B in accordance with one or more embodiments of the present disclosure. In other embodiments, the GUI may be displayed on any of the N client devices 402-404, for example.

Figure 12:
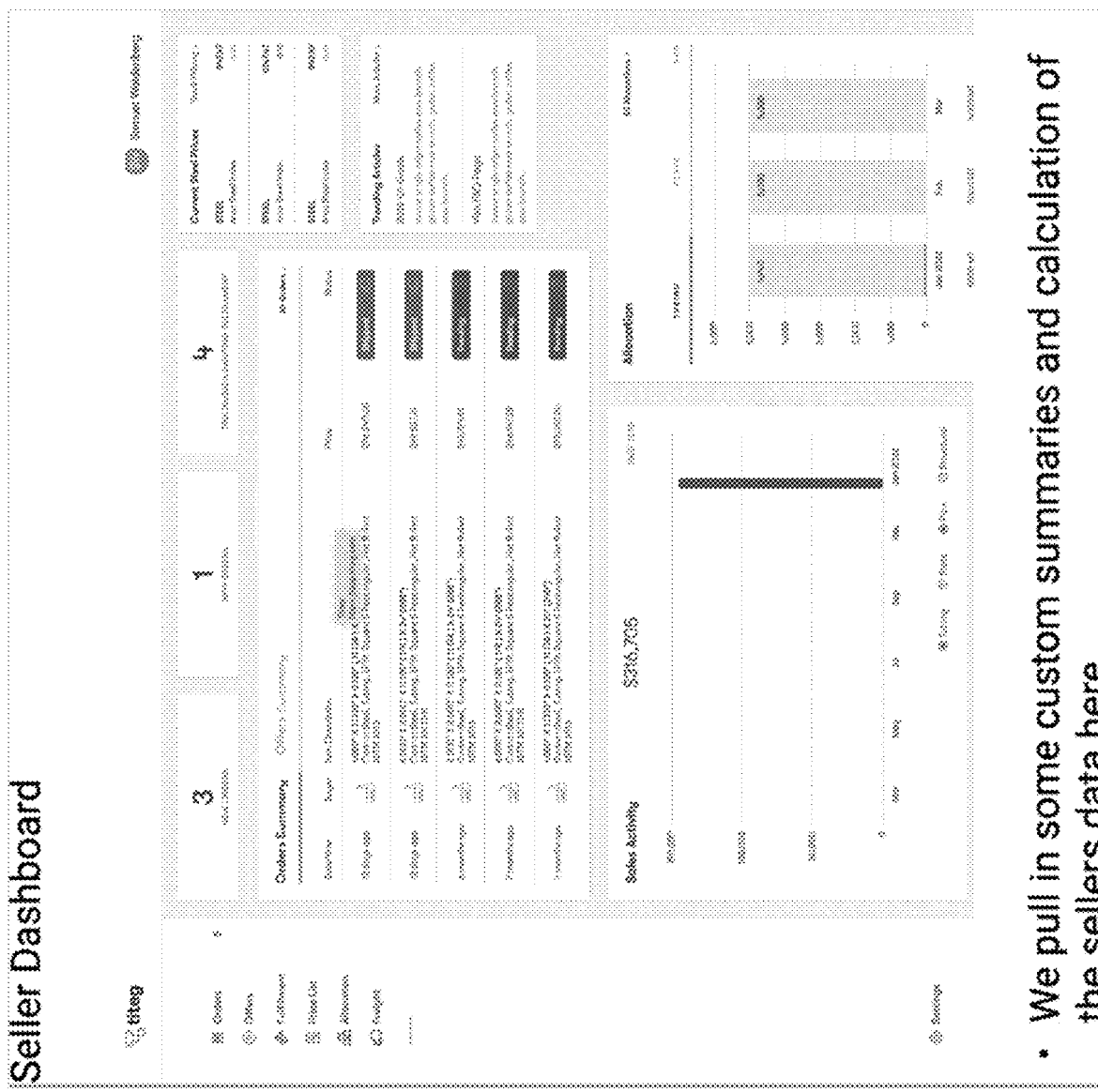
FIG. 12 is a GUI screenshot of the dashboard of a particular seller in accordance with one or more embodiments of the present disclosure.

FIG. 12 is a GUI screenshot of the dashboard of a particular seller. The dashboard may display customized summaries and data of the particular seller.

Figure 13:
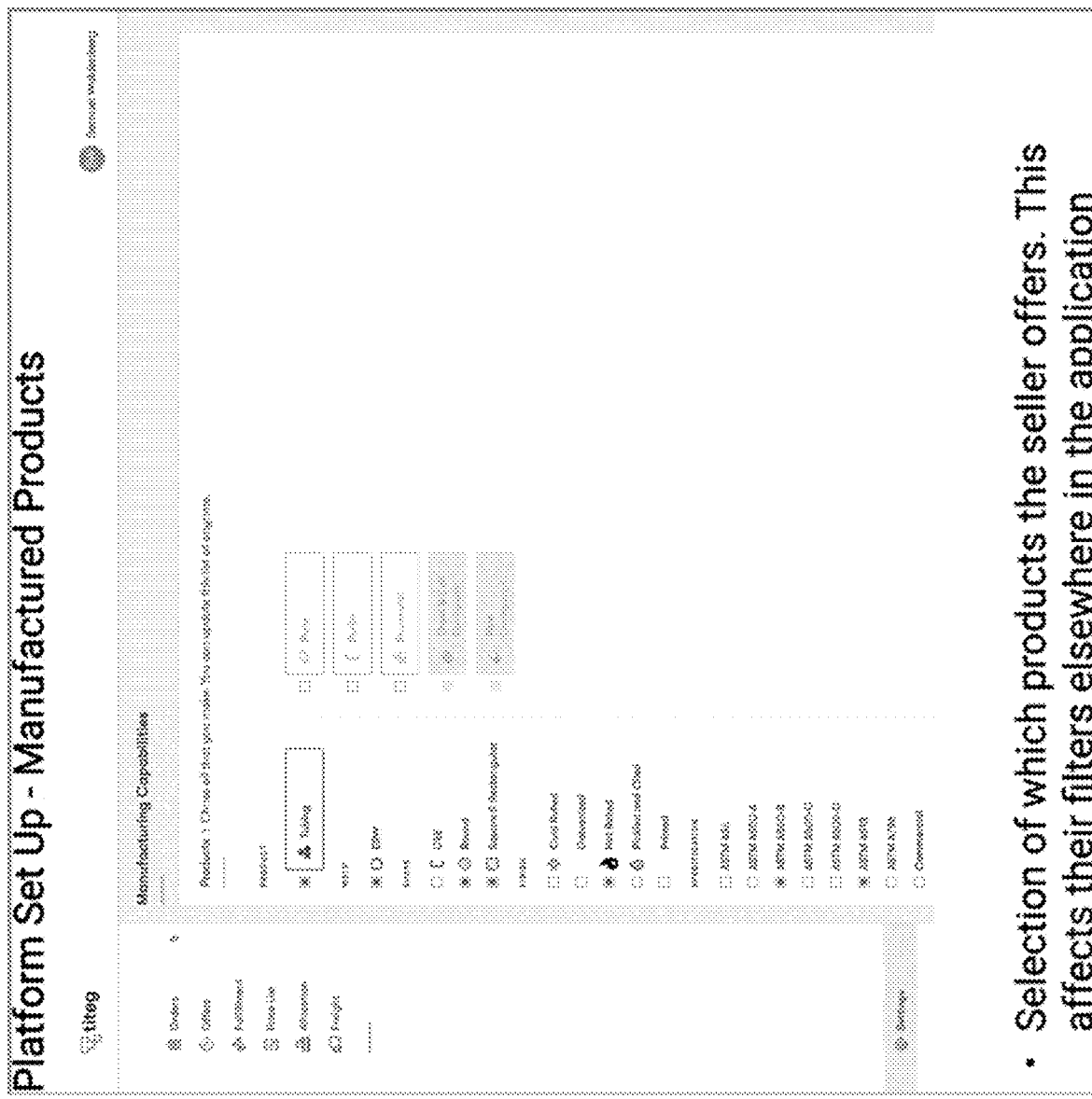
FIG. 13 is a GUI screenshot of a seller's platform setup to generate listings of the seller's manufactured products in accordance with one or more embodiments of the present disclosure.

FIG. 13 is a GUI screenshot of a seller's platform setup to generate listings of the seller's manufactured products. The seller's platform setup provides the selection of which products that the seller offers. This may affect the self-filtering GUI screenshots on the buyer's side elsewhere in the exchange platform application.

Figure 14:
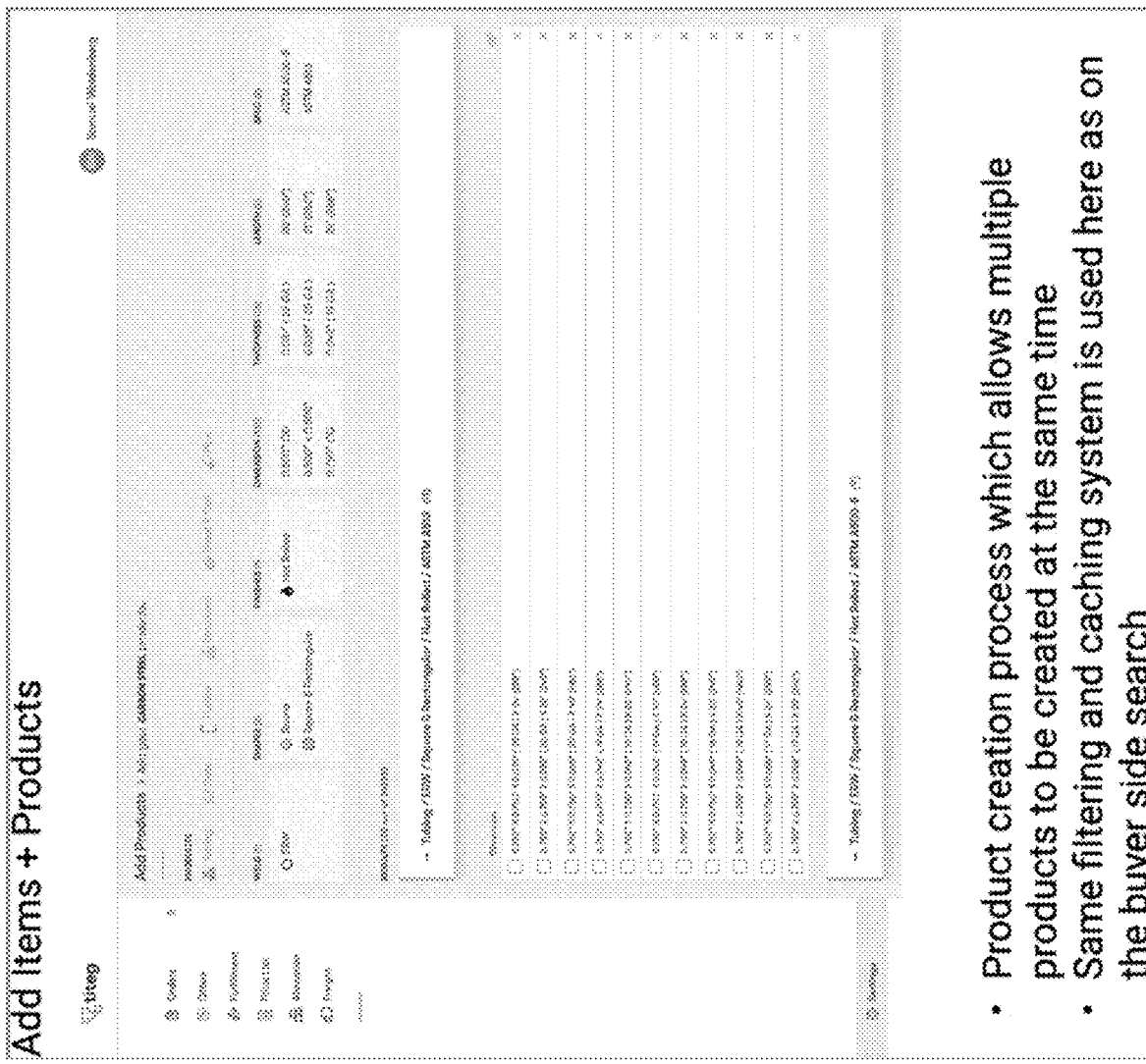
FIG. 14 is a GUI screenshot allowing the seller to add items and products to be displayed to potential buyers in accordance with one or more embodiments of the present disclosure.

FIG. 14 is a GUI screenshot allowing the seller to add items and products to be displayed to potential buyers. This page allows multiple products to be created at the same time. The same filtering and caching system may be used here as on the buyer search side.

Figure 15:
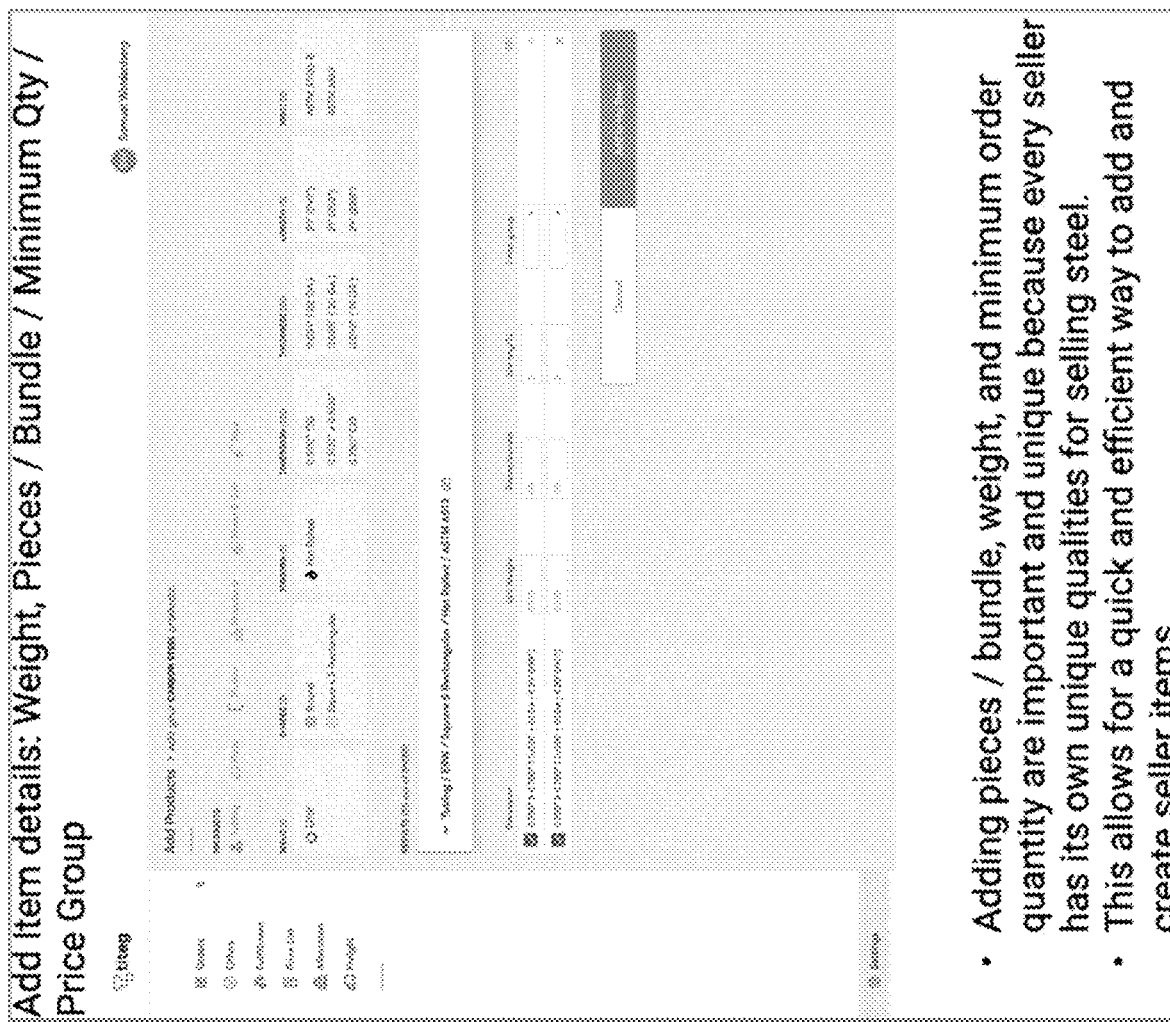
FIG. 15 is a GUI screenshot allowing the seller to add item details in accordance with one or more embodiments of the present disclosure.

FIG. 15 is a GUI screenshot allowing the seller to add item details such as weight, pieces, bundle, minimum quantity, and/or price group. These parameters are seller-specific since every seller has a unique way of selling steel. This GUI allows for a quick and efficient way for the seller to add and create items for display to potential buyers.

Figure 16:
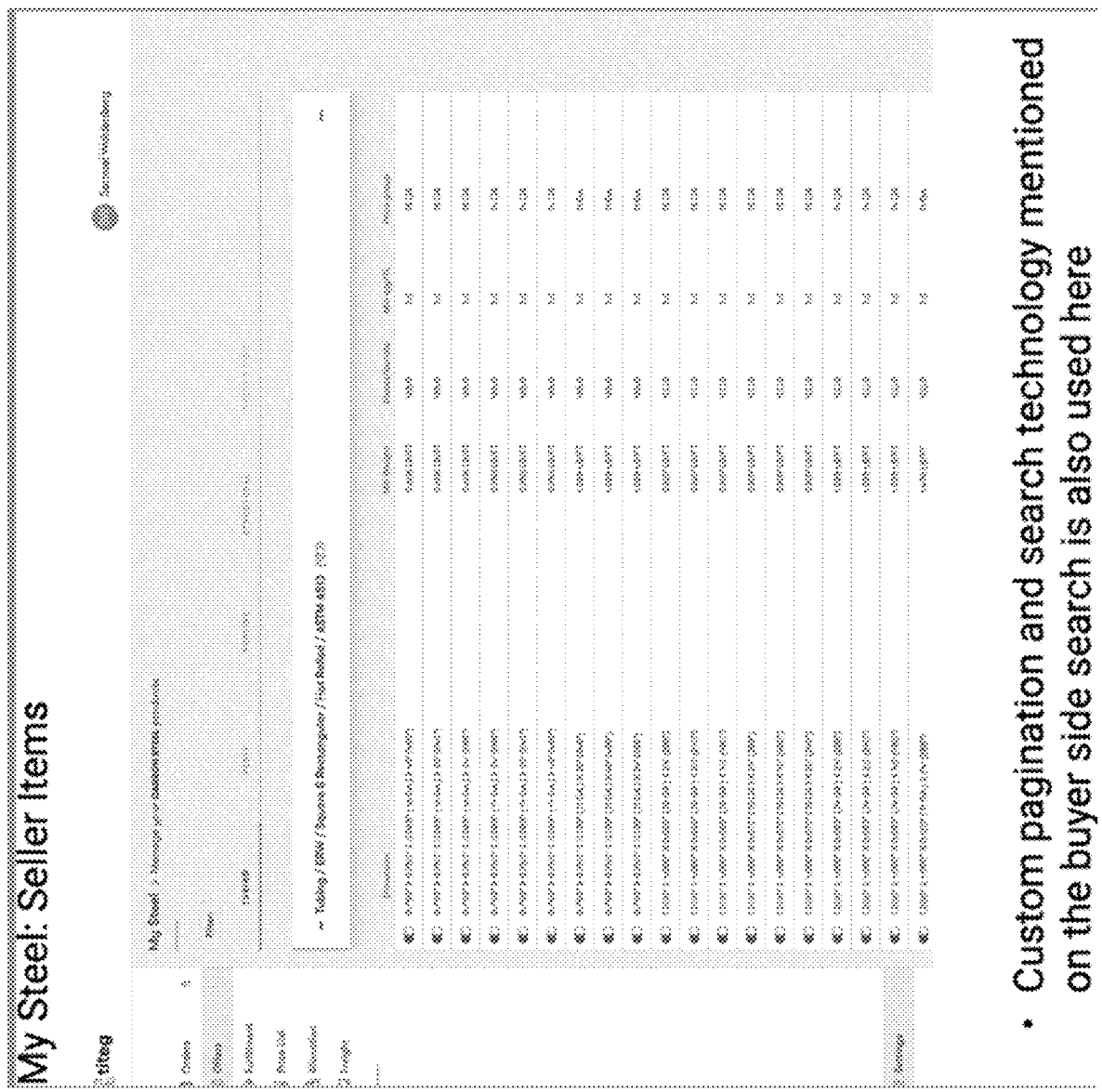
FIG. 16 is a GUI screenshot managing specific seller products for offer to buyers in accordance with one or more embodiments of the present disclosure.

FIG. 16 is a GUI screenshot managing specific seller products for offer to buyers. Custom pagination and search technology as shown on the buyer side may be also used here.

Figure 17:
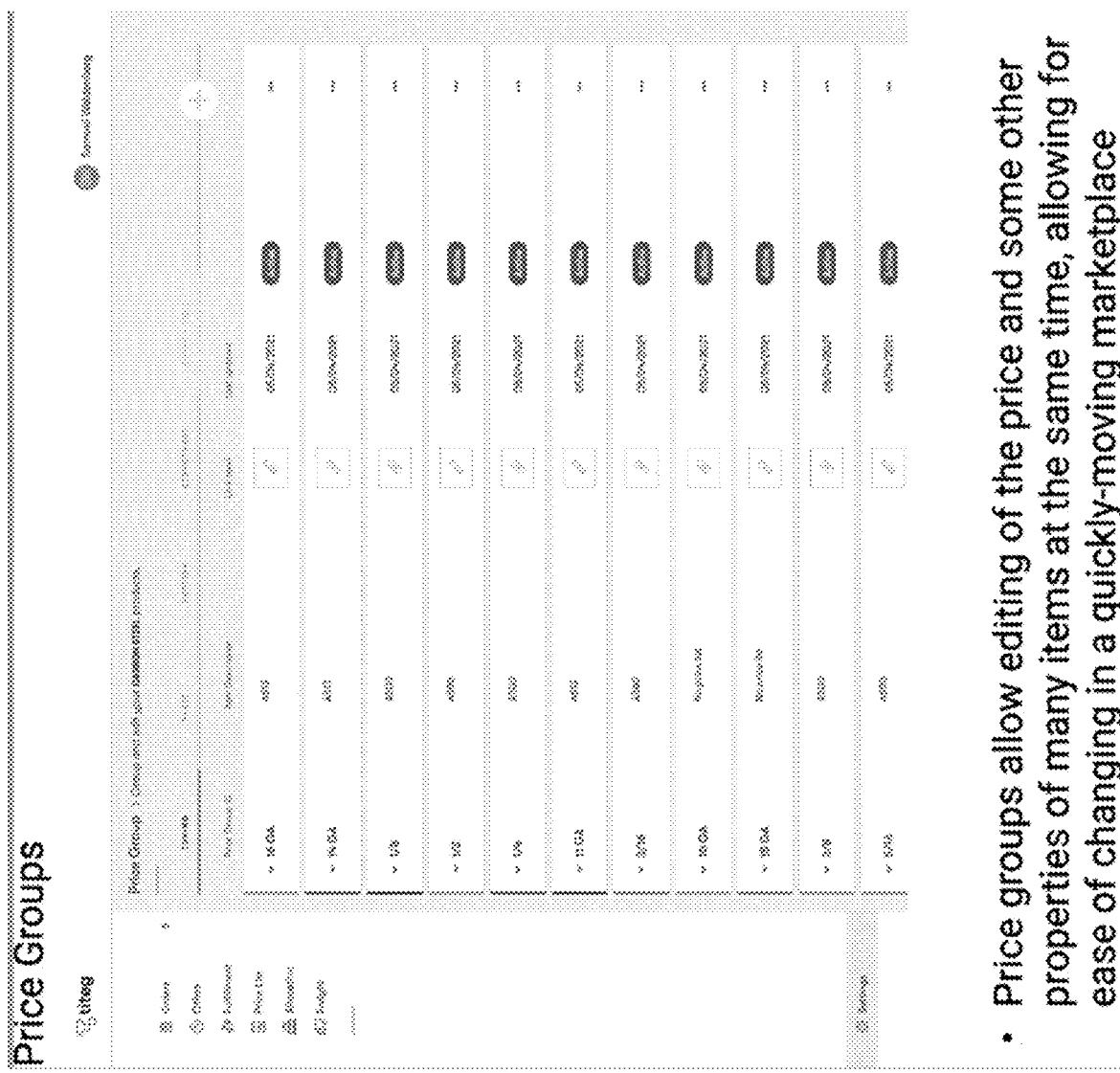
FIG. 17 is a GUI screenshot showing price groups in accordance with one or more embodiments of the present disclosure.

FIG. 17 is a GUI screenshot showing price groups which may allow for the editing of the price and other properties of many items of a seller's product at the same time in a quick moving market.

Figure 18:
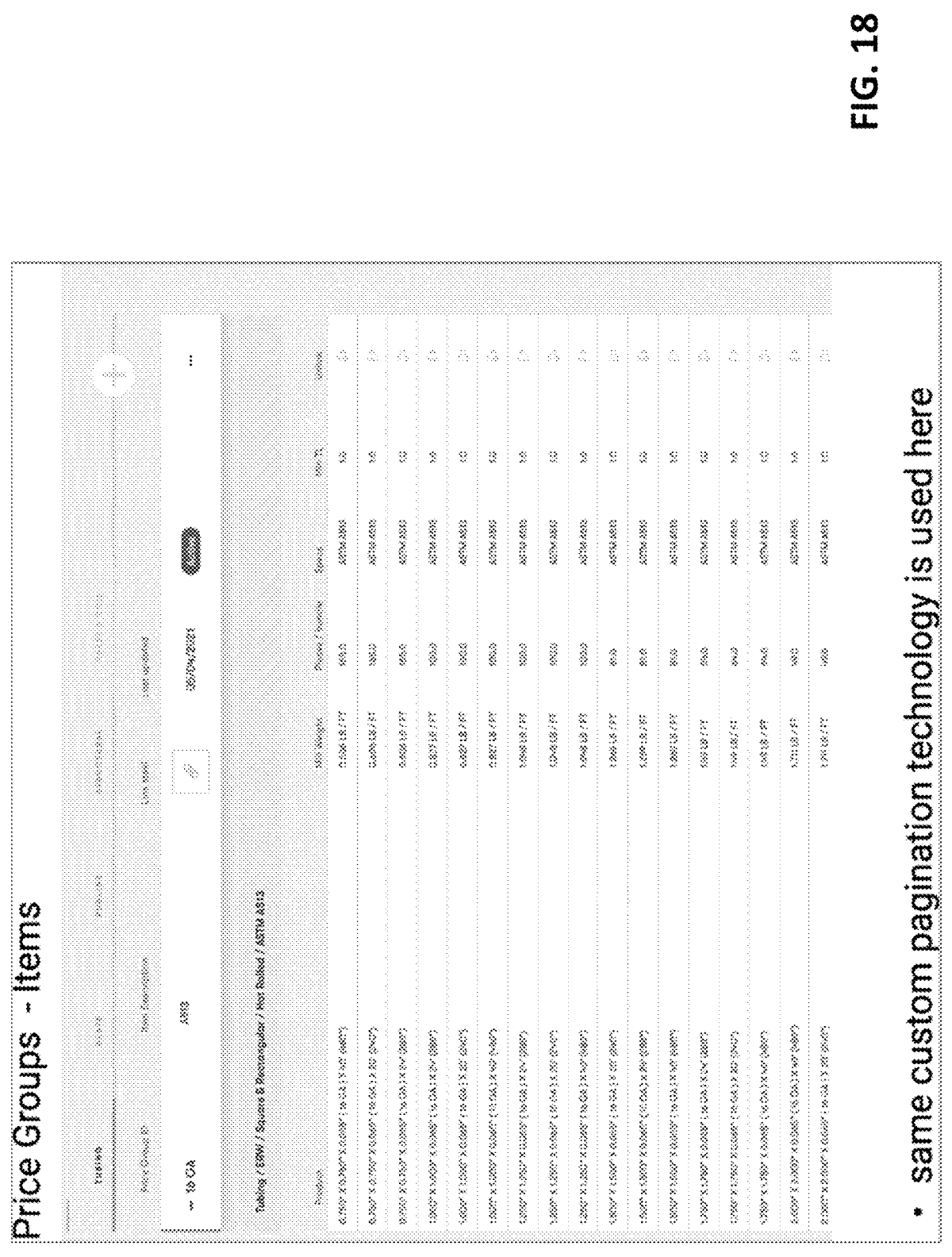

FIG. 18 is a GUI screenshot showing price group items with the customization pagination technology.

Figure 19:
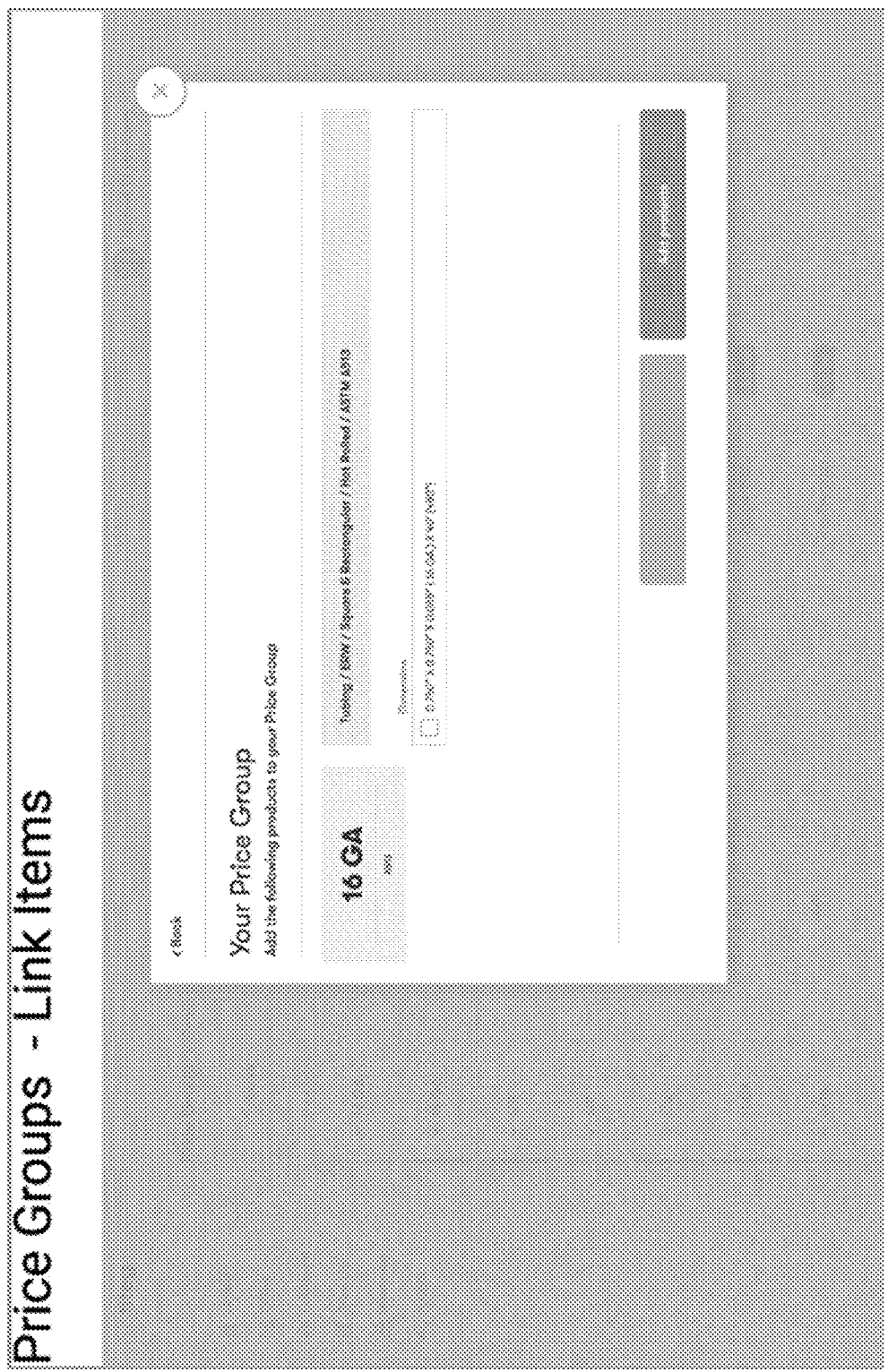
FIG. 19 is a GUI screenshot of a page for allowing the seller to add a specific product to a price group in accordance with one or more embodiments of the present disclosure.

FIG. 19 is a GUI screenshot of a page for allowing the seller to add a specific product to a price group.

FIG. 20 is a GUI screenshot of a price list page which allows the seller to manage prices for a plurality of items with minimal clicks per shipping point. It also allows the seller to adjust lead times for the listed products.

Figure 21:
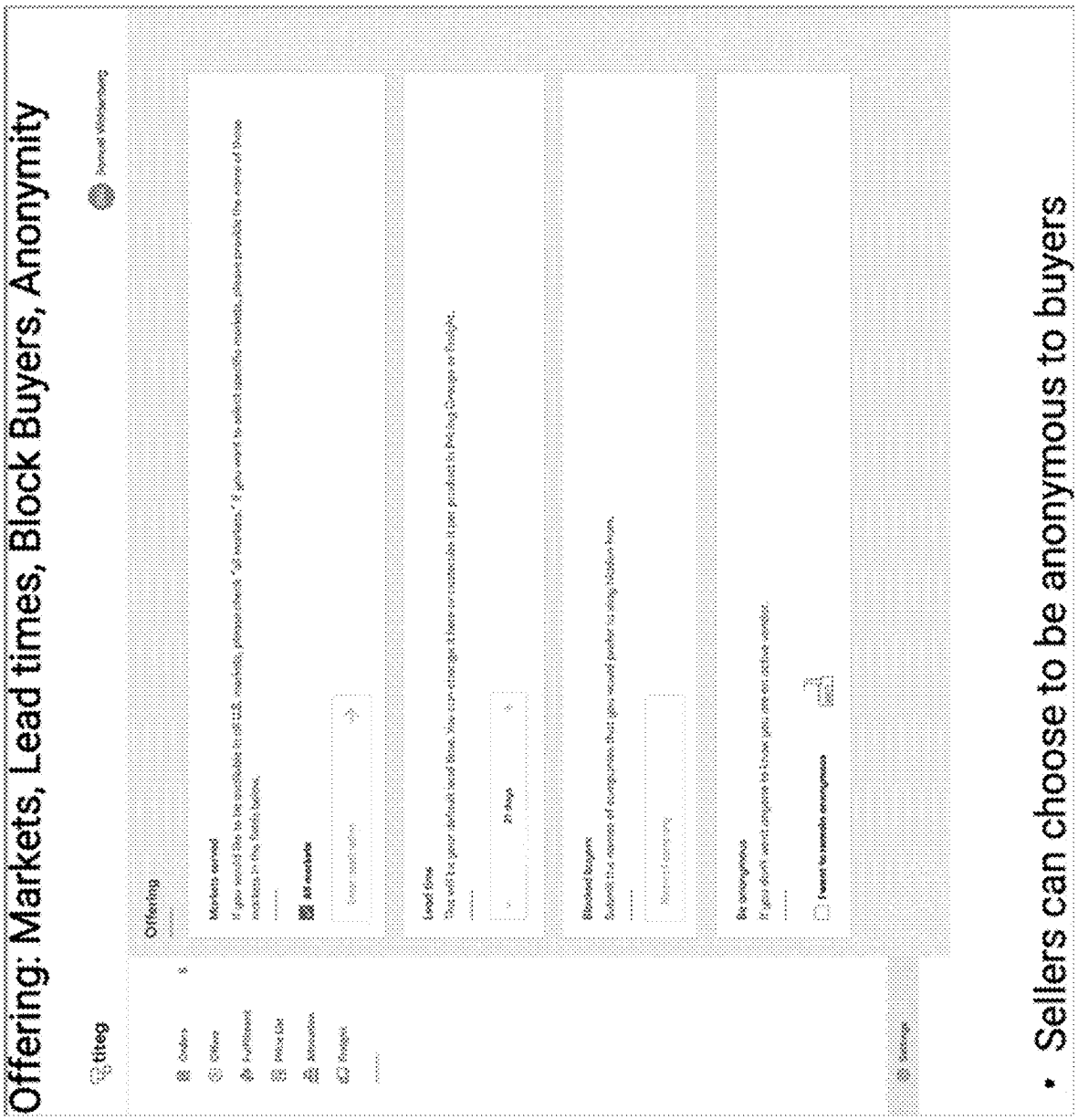
FIG. 21 is a GUI screenshot of an offering page in accordance with one or more embodiments of the present disclosure.

FIG. 21 is a GUI screenshot of an offering page which allows the seller to set: (1) which markets to serve, (2) default lead times, (3) buyers to block and (4) a setting to remain anonymous to buyers.

Figure 22:
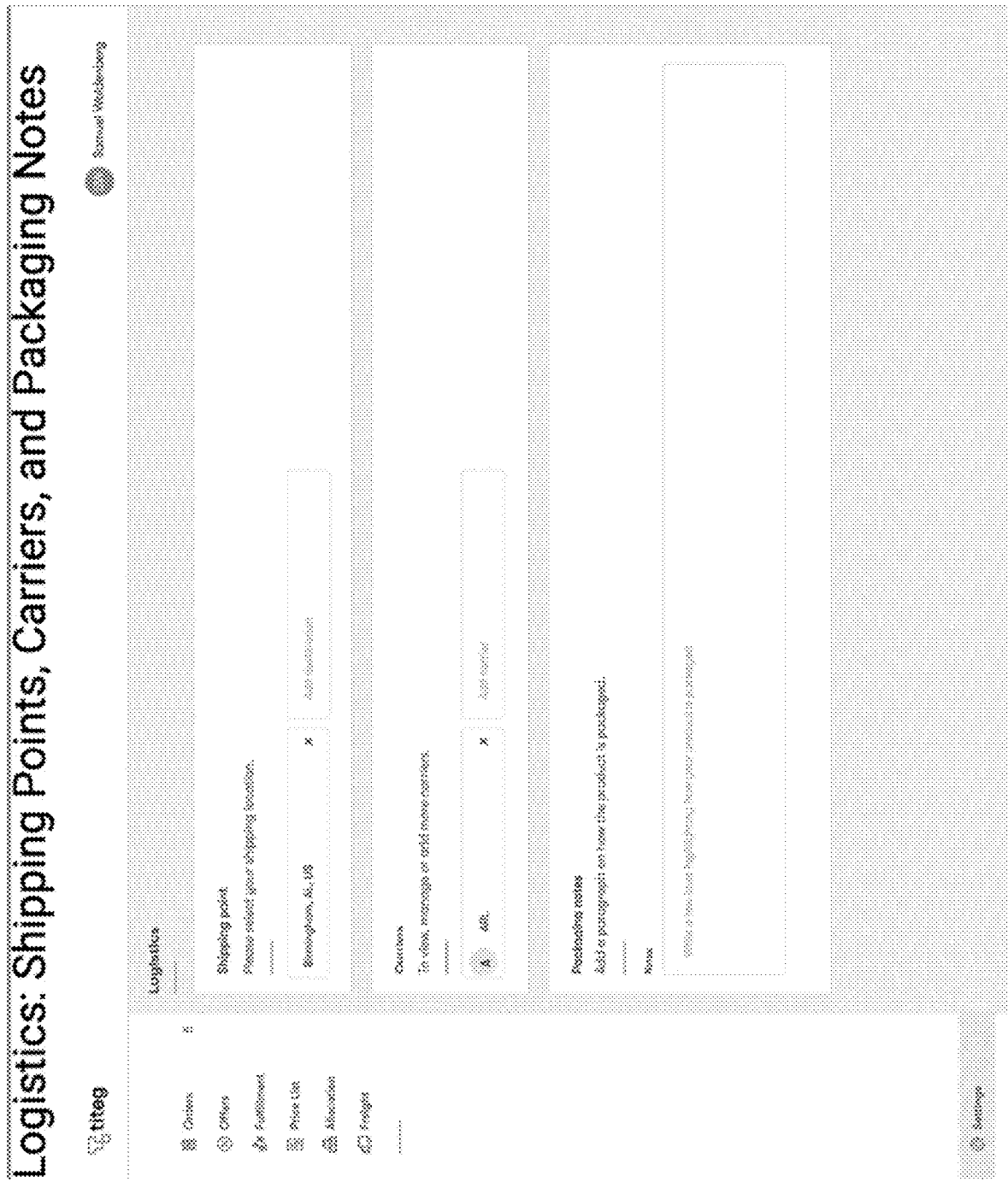
FIG. 22 is a GUI screenshot of a logistic page in accordance with one or more embodiments of the present disclosure.

FIG. 22 is a GUI screenshot of a logistic page which allows the seller to select shipping location and to manage carriers.

Figure 23:
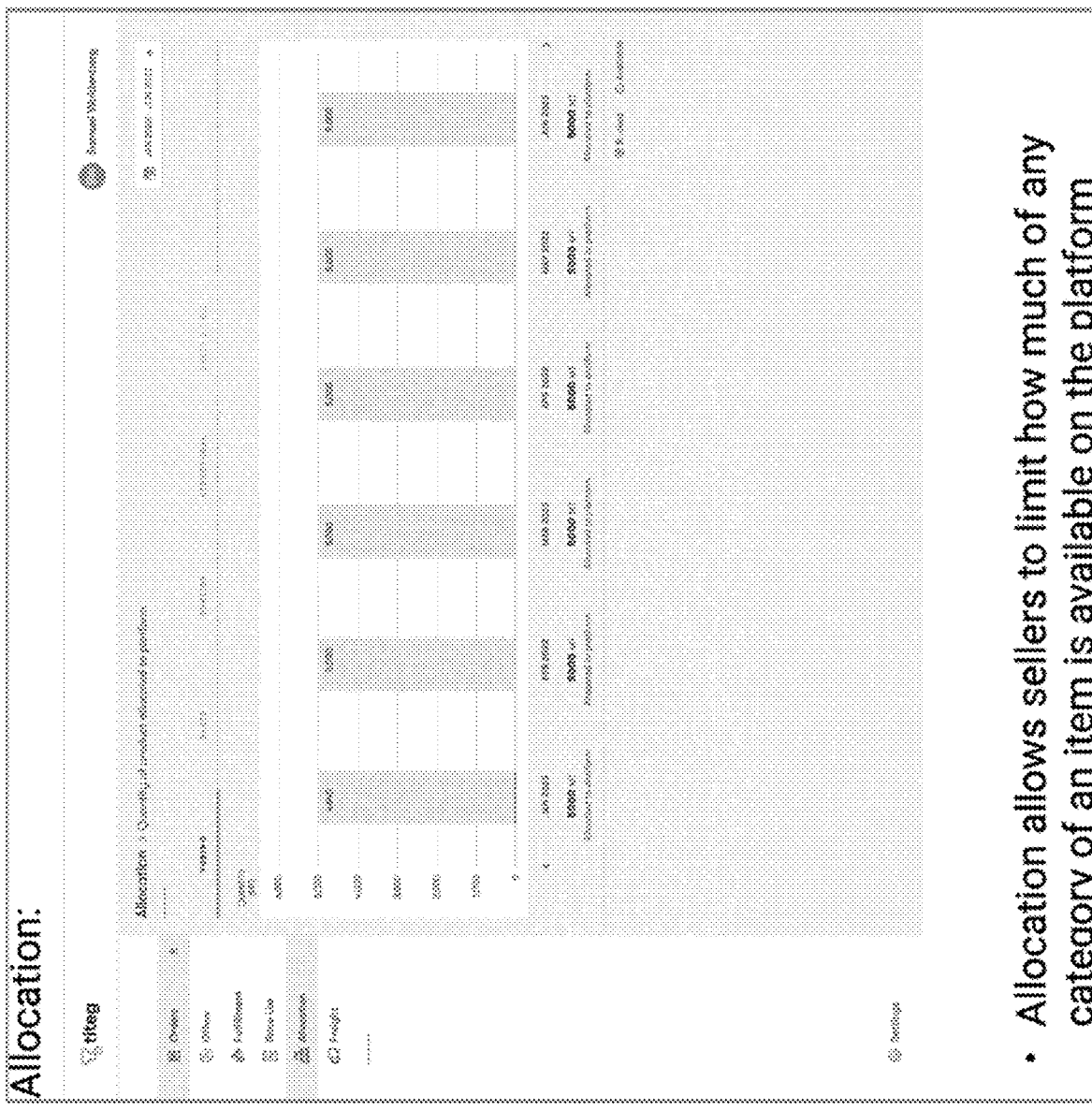
FIG. 23 is a GUI screenshot of an allocation page in accordance with one or more embodiments of the present disclosure.

FIG. 23 is a GUI screenshot of an allocation page which allows sellers to limit how much of any item that is available on the platform.

Figure 24:
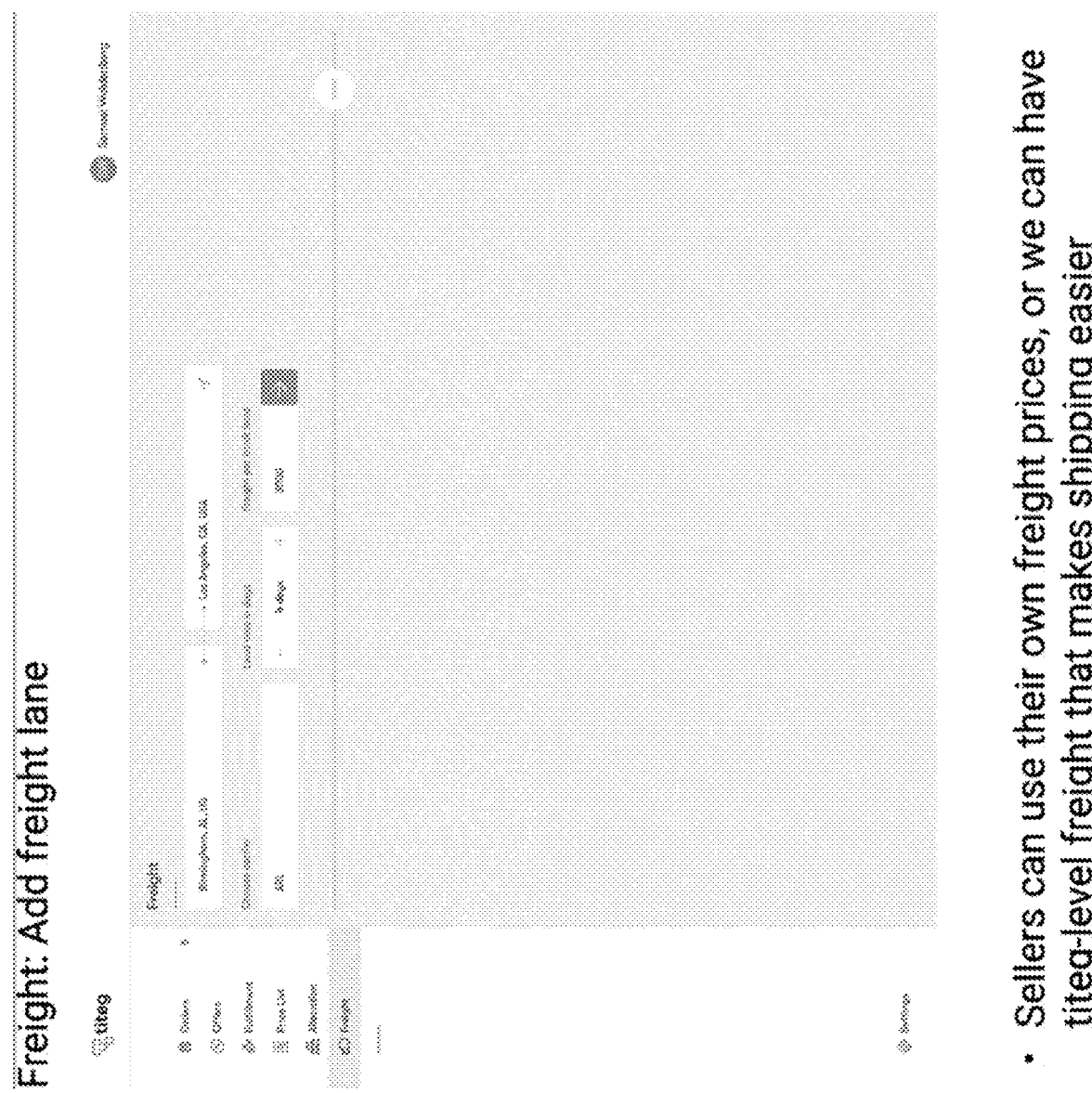
FIG. 24 is a GUI screenshot of an add freight page in accordance with one or more embodiments of the present disclosure.

FIG. 24 is a GUI screenshot of an add freight page that allows the seller to add their own freight prices or allows the entity managing the exchange platform application to supply freight options that makes shipping easier.

Figure 25:
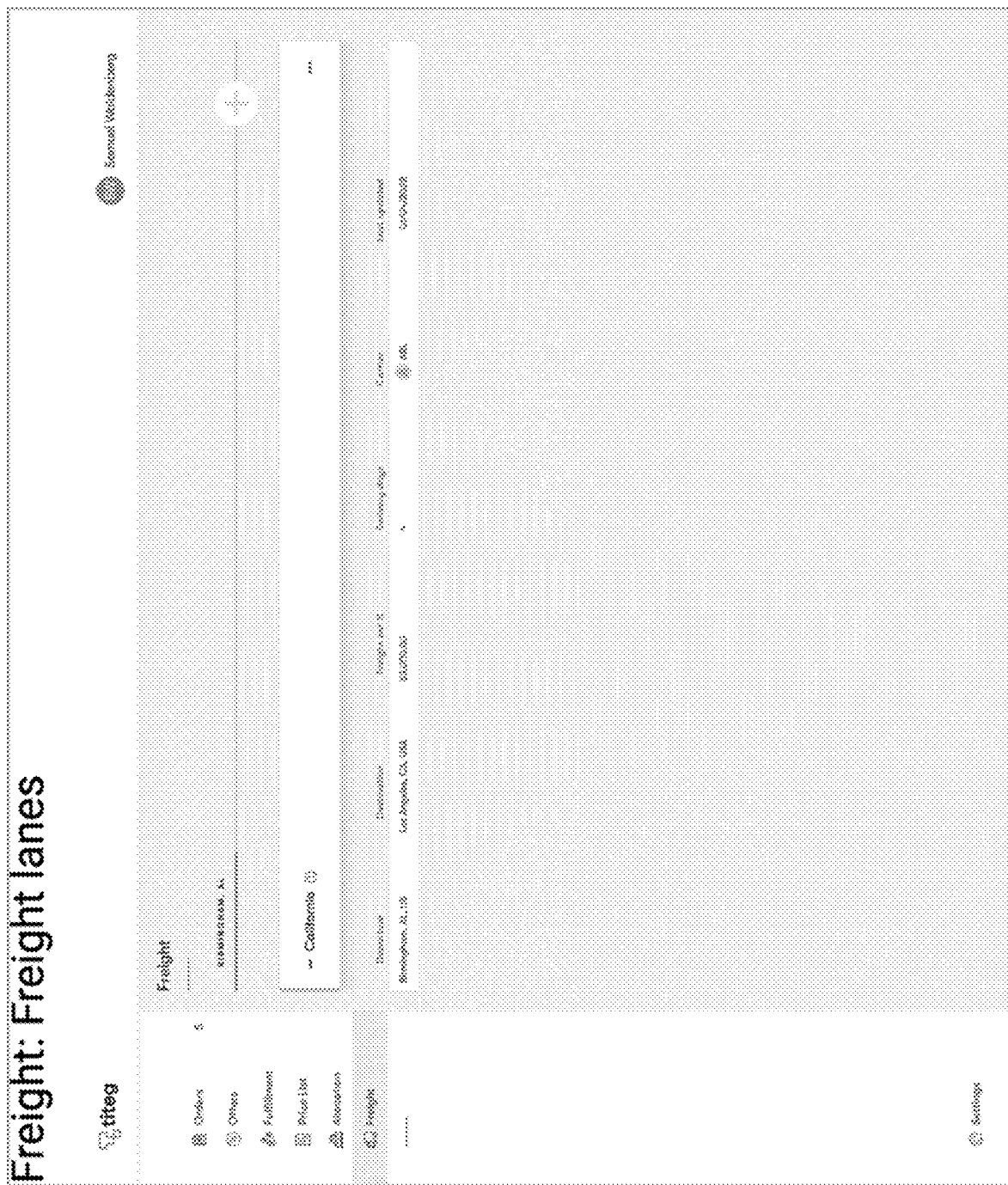
FIG. 25 is a GUI screenshot of a freight page in accordance with one or more embodiments of the present disclosure.

FIG. 25 is a GUI screenshot of a freight page that shows the freight lane selected by the seller.

Figure 26:
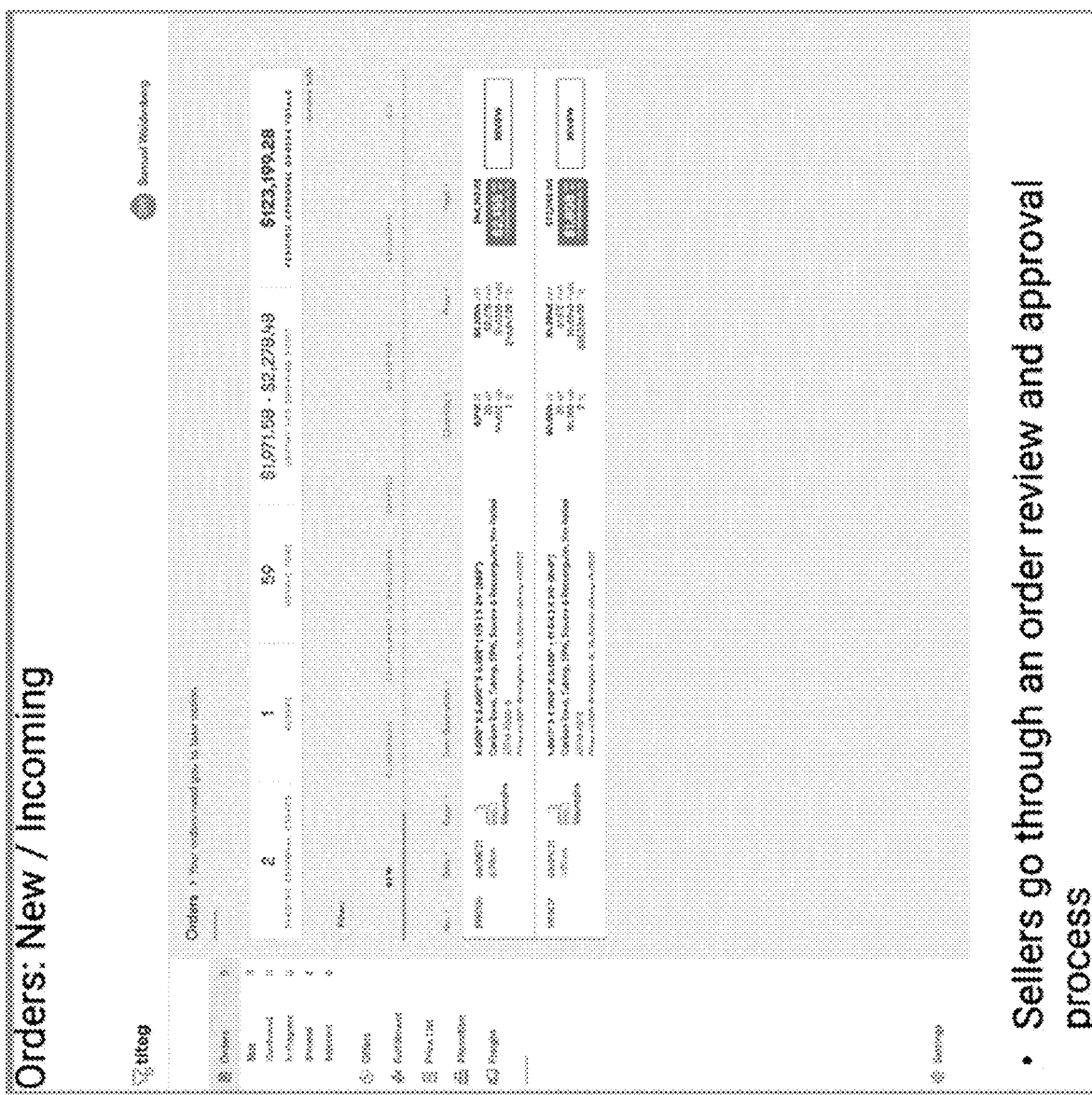
FIG. 26 is a GUI screenshot of a new/incoming order page in accordance with one or more embodiments of the present disclosure.

FIG. 26 is a GUI screenshot of a new/incoming order page listing new orders from at least one buyer that allows the seller to go through an order review and approval process.

Figure 27:
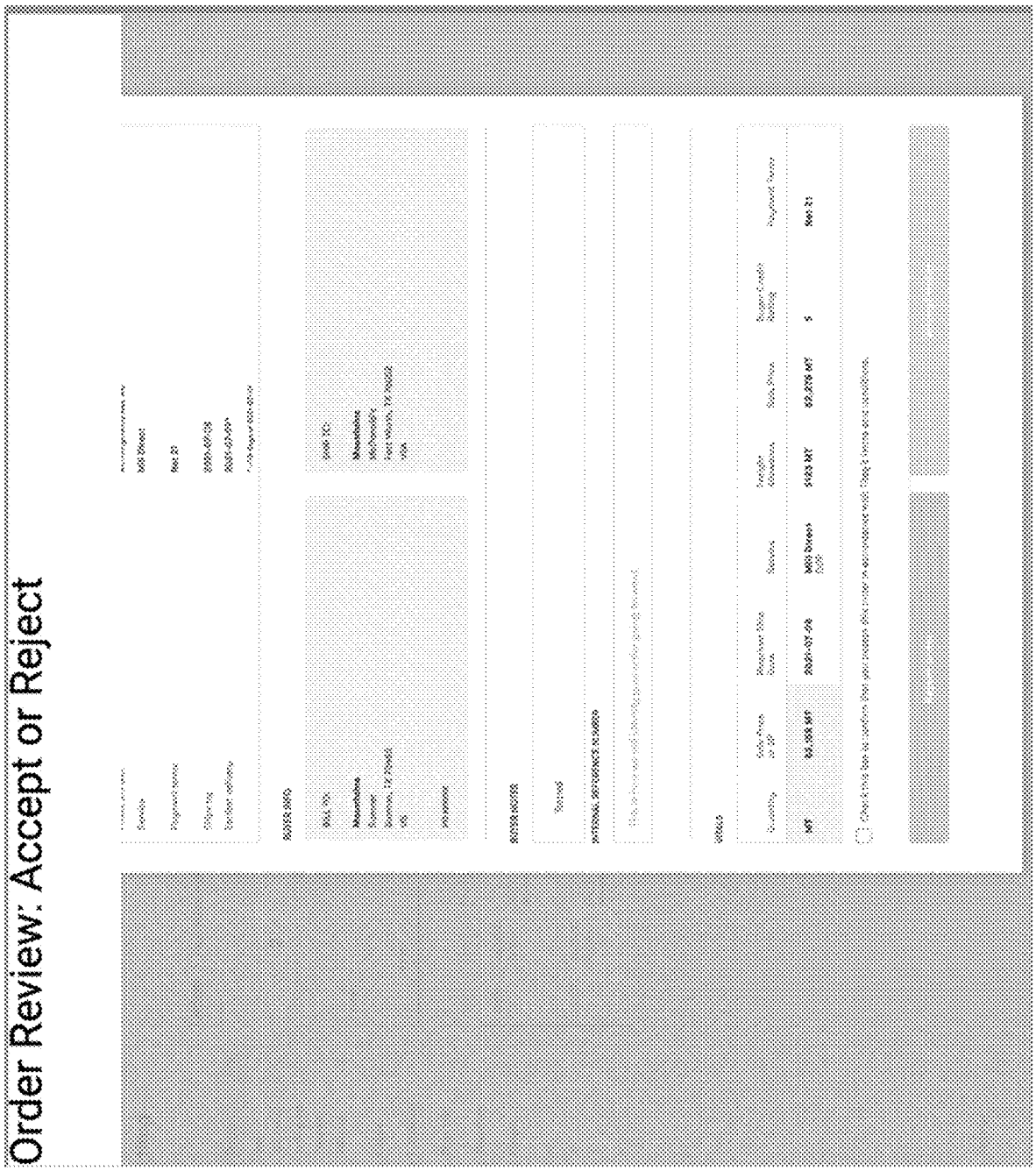
FIG. 27 is a GUI screenshot of a page that allows the seller to accept or reject a particular order from a buyer in accordance with one or more embodiments of the present disclosure.

FIG. 27 is a GUI screenshot of a page that allows the seller to accept or reject a particular order from a buyer.

Figure 28:
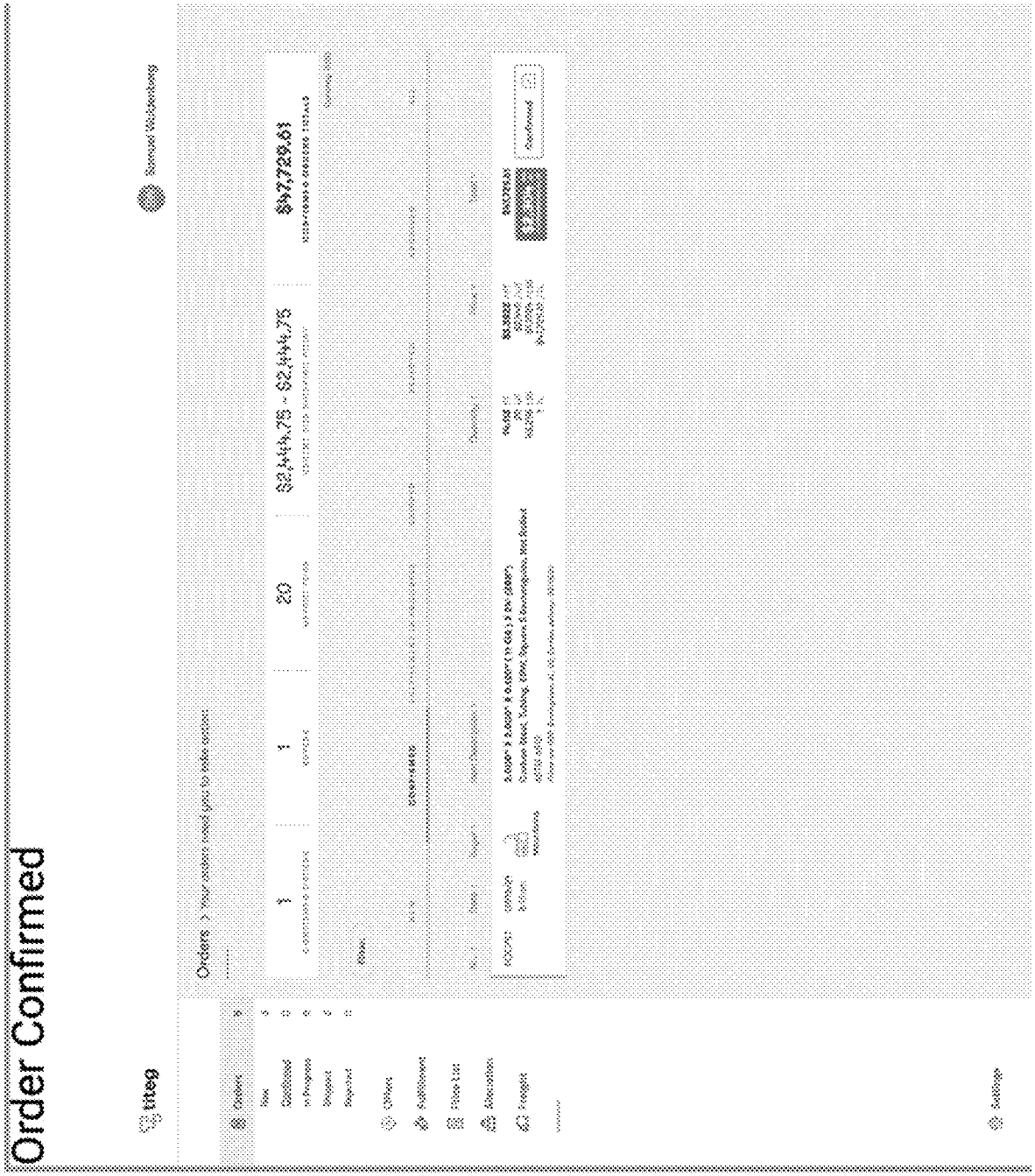
FIG. 28 is a GUI screenshot of a page that shows an order that has been accepted by the seller in accordance with one or more embodiments of the present disclosure.

FIG. 28 is a GUI screenshot of a page that shows an order that has been accepted by the seller.

Figure 29:
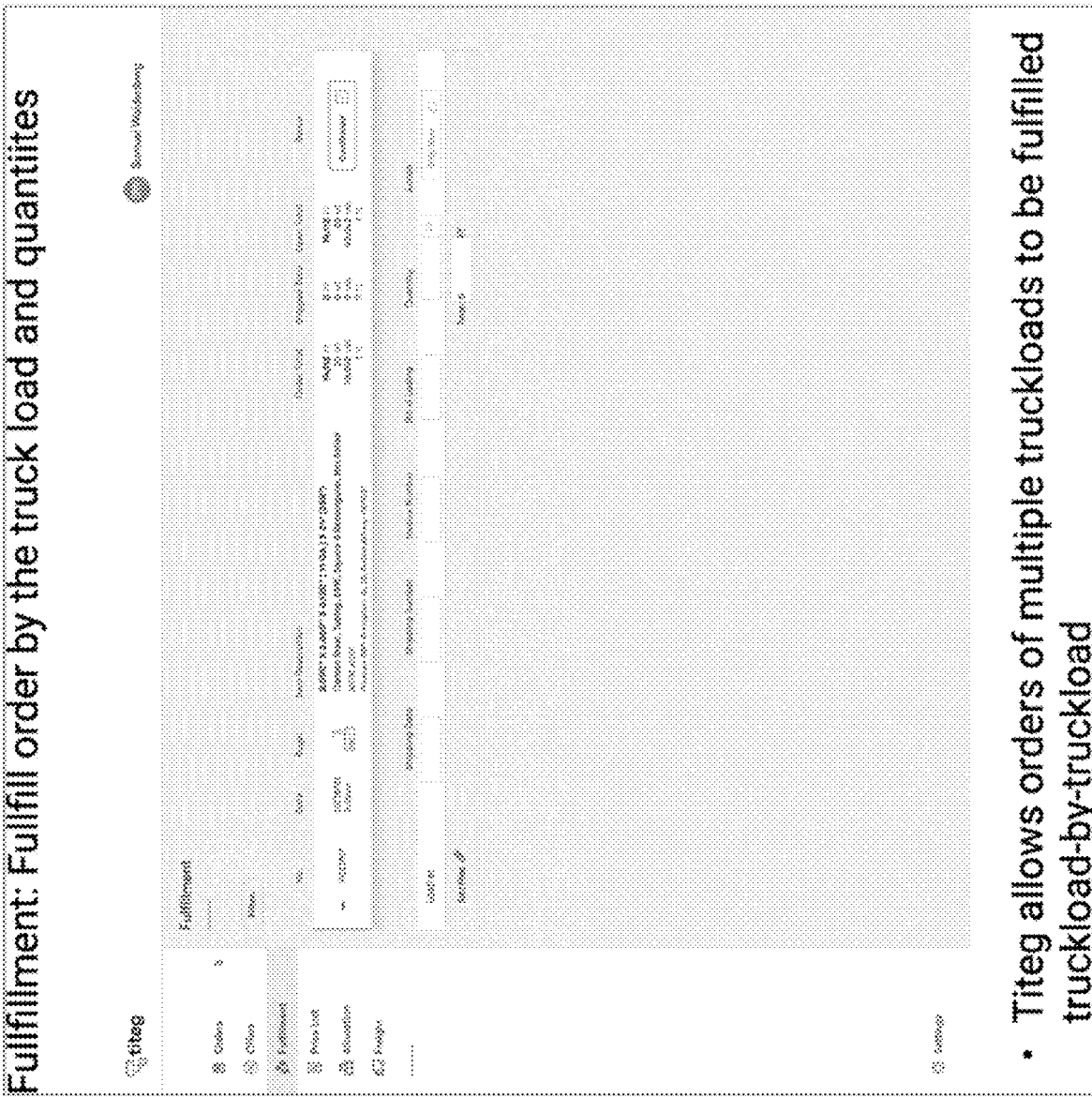
FIG. 29 is a GUI screenshot of a page that shows the order fulfillment in accordance with one or more embodiments of the present disclosure.

FIG. 29 is a GUI screenshot of a page that shows the order fulfillment with shipping date by the truckload and quantities fulfilled.

Figure 30:
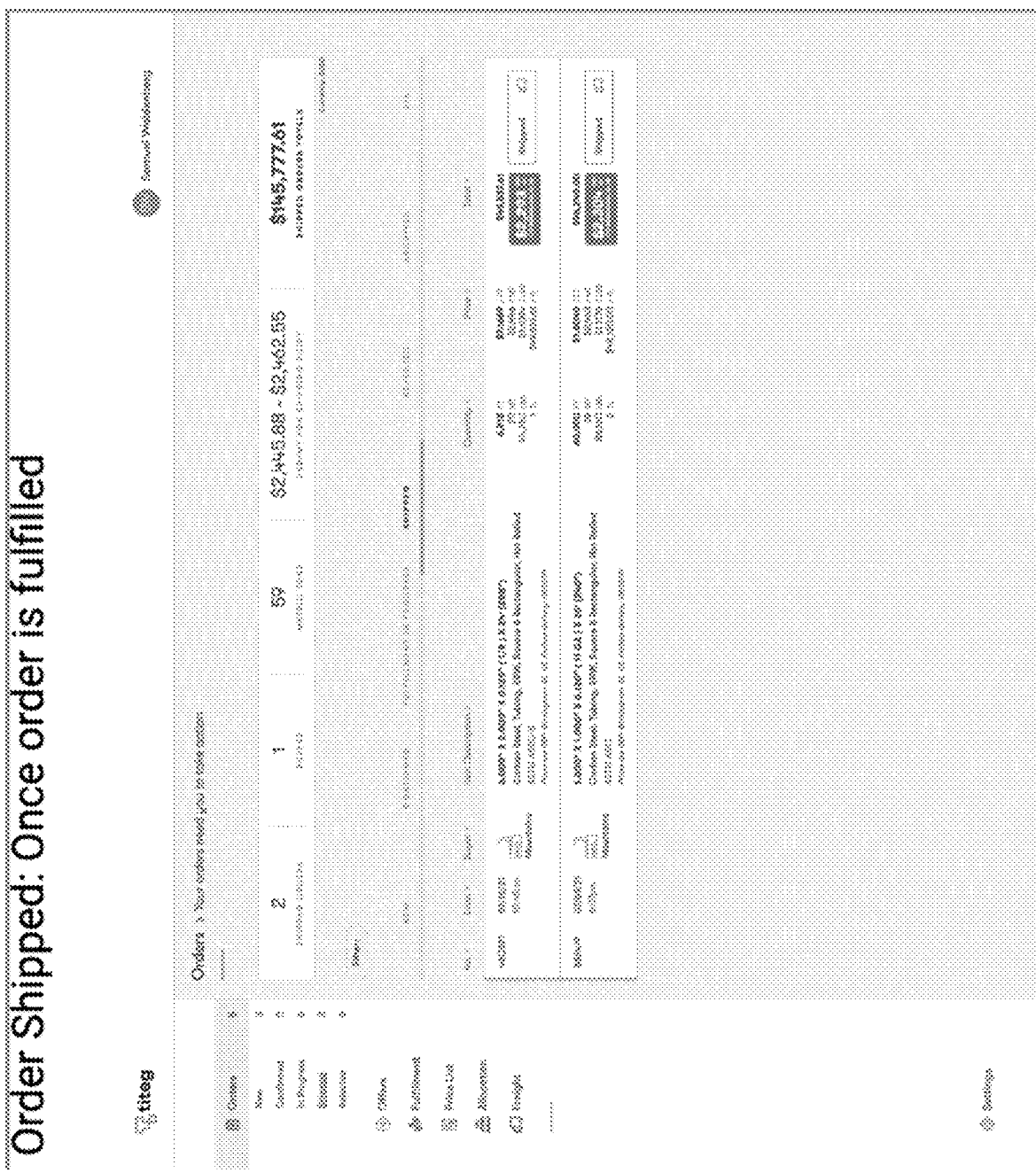
FIG. 30 is a GUI screenshot of a page showing that the order(s) is (are) fulfilled and shipped in accordance with one or more embodiments of the present disclosure.

FIG. 30 is a GUI screenshot of a page showing that the order(s) is (are) fulfilled and shipped.

Figure 31:
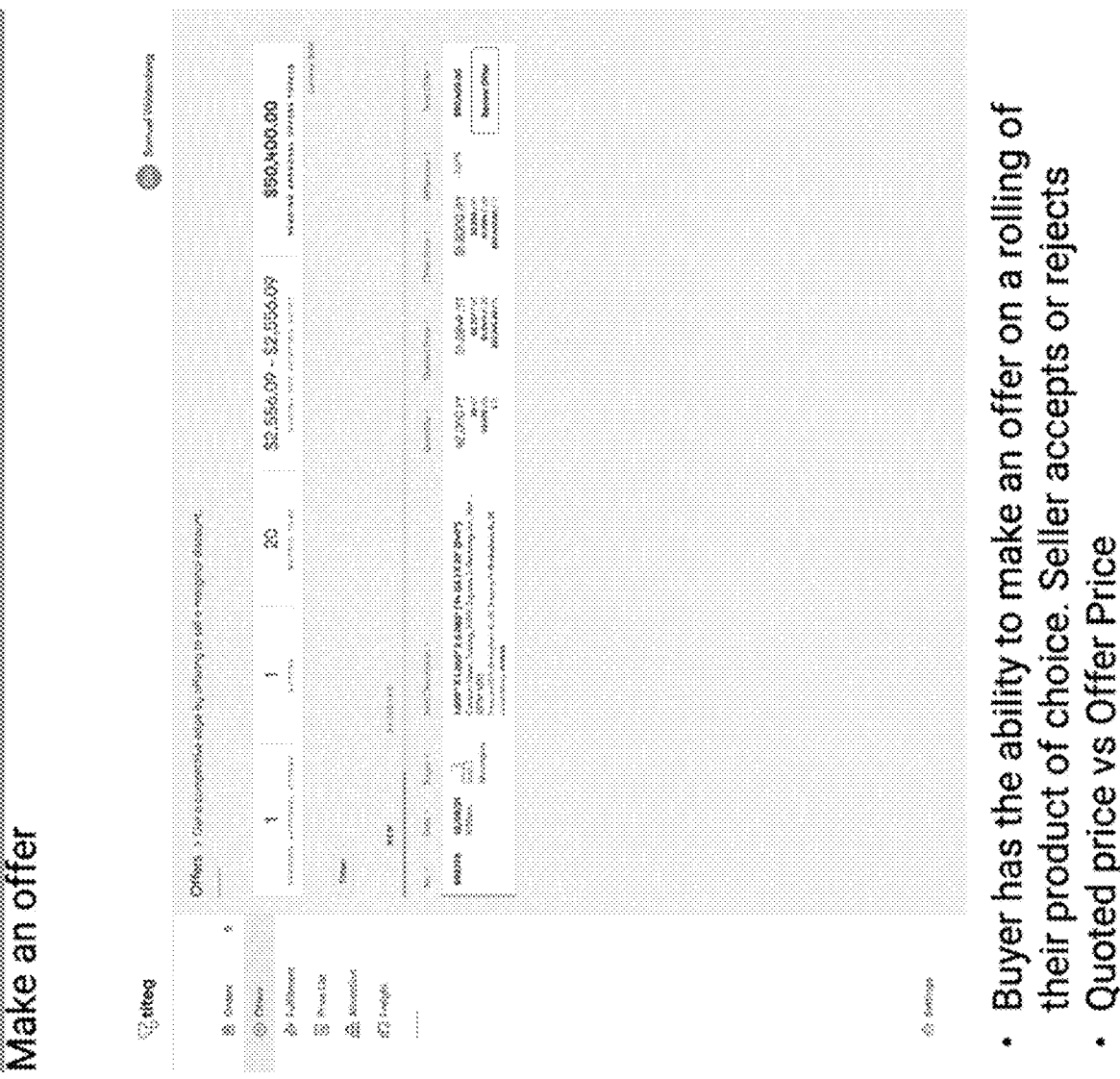
FIG. 31 is a GUI screenshot of a page allowing the seller to review an offer made by the buyer in accordance with one or more embodiments of the present disclosure.

FIG. 31 is a GUI screenshot of a page allowing the seller to review an offer made by the buyer that allows the seller to accept an offer price at a marginal discount from the quoted price. The buyer may make an offer based on a rolling of their product of choice, which the seller may accept or reject.

Figure 32:
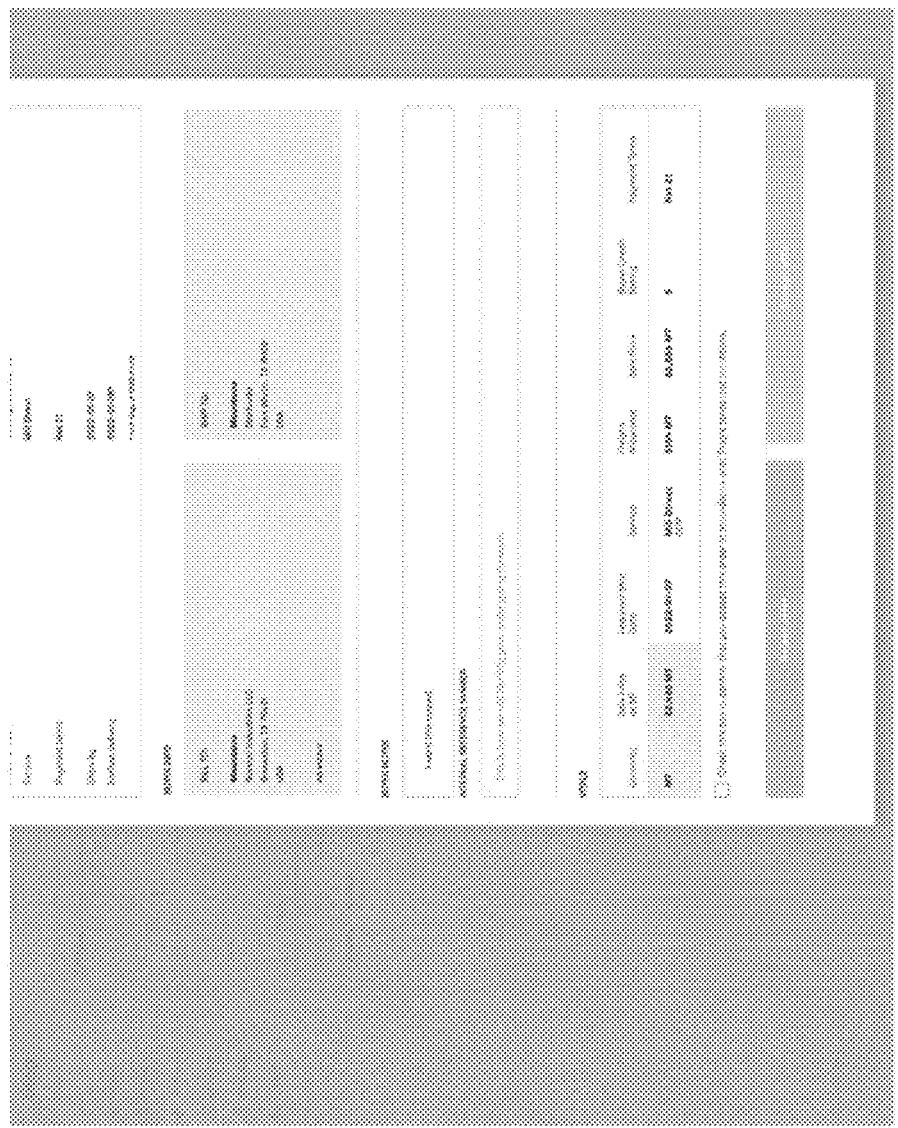
FIG. 32 is a GUI screenshot of a page allowing the seller to review the offer made by the buyer in accordance with one or more embodiments of the present disclosure.

FIG. 32 is a GUI screenshot of a page allowing the seller to review the offer made by the buyer. Once the offer is accepted or rejected, an offer becomes a confirmed order or a rejected order. A confirmed order follows the order confirmation flow.

FIGS. 33-44 are flowcharts of processes performed by one or more software modules that may be executed by the processor(s) of the server 406 or 407, server 105, and/or entity servers 155A . . . 155B.

Figure 33:
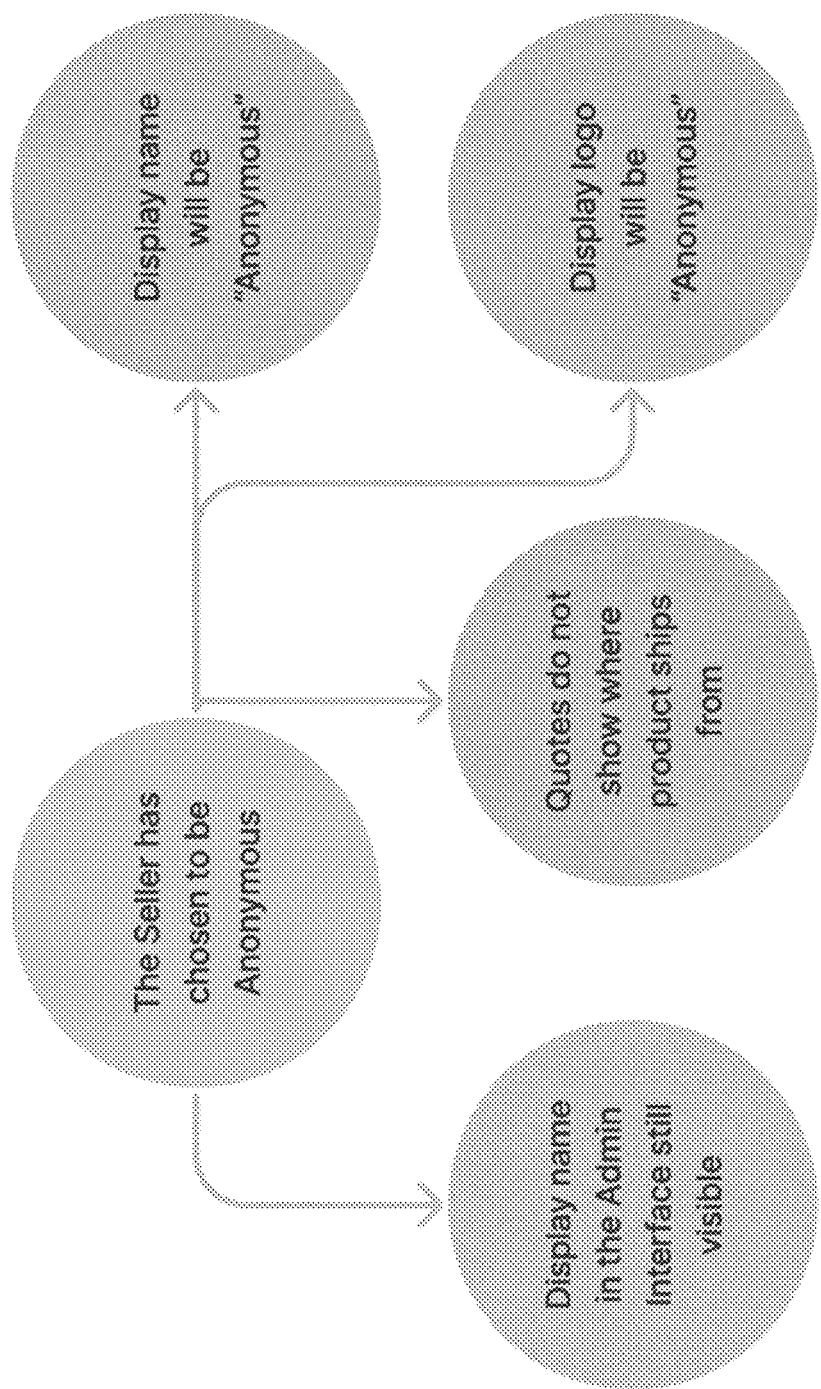
FIG. 33 is a flowchart of an anonymity flow process when the seller choses to remain anonymous in accordance with one or more embodiments of the present disclosure.

FIG. 33 is a flowchart of an anonymity flow process when the seller choses to remain anonymous.

Figure 34:
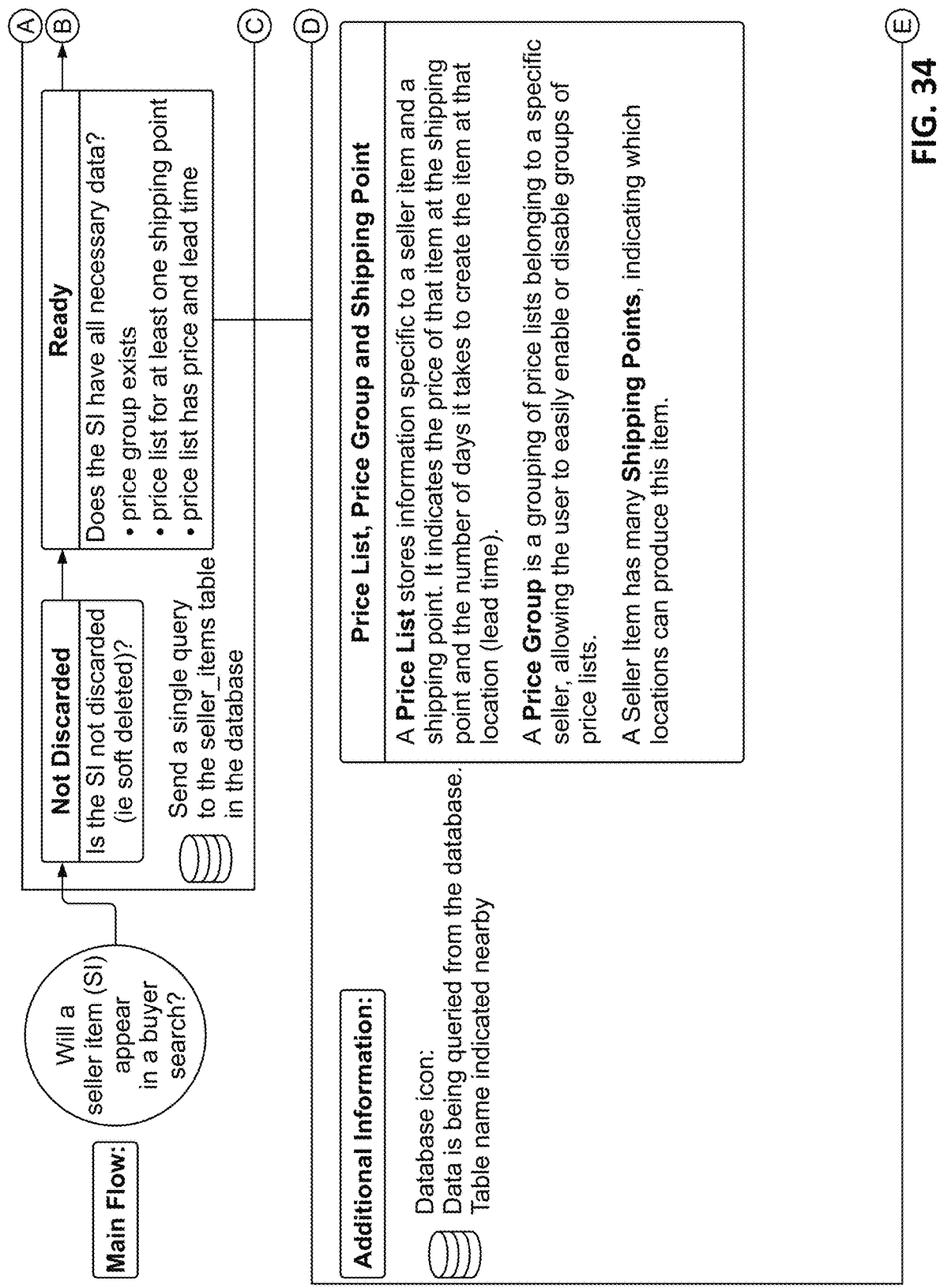
FIG. 34 is a flowchart for determining whether a particular seller's items may appear in a particular buyer's search in accordance with one or more embodiments of the present disclosure.

FIG. 34 is a flowchart for determining whether a particular seller's items may appear in a particular buyer's search.

Figure 35:
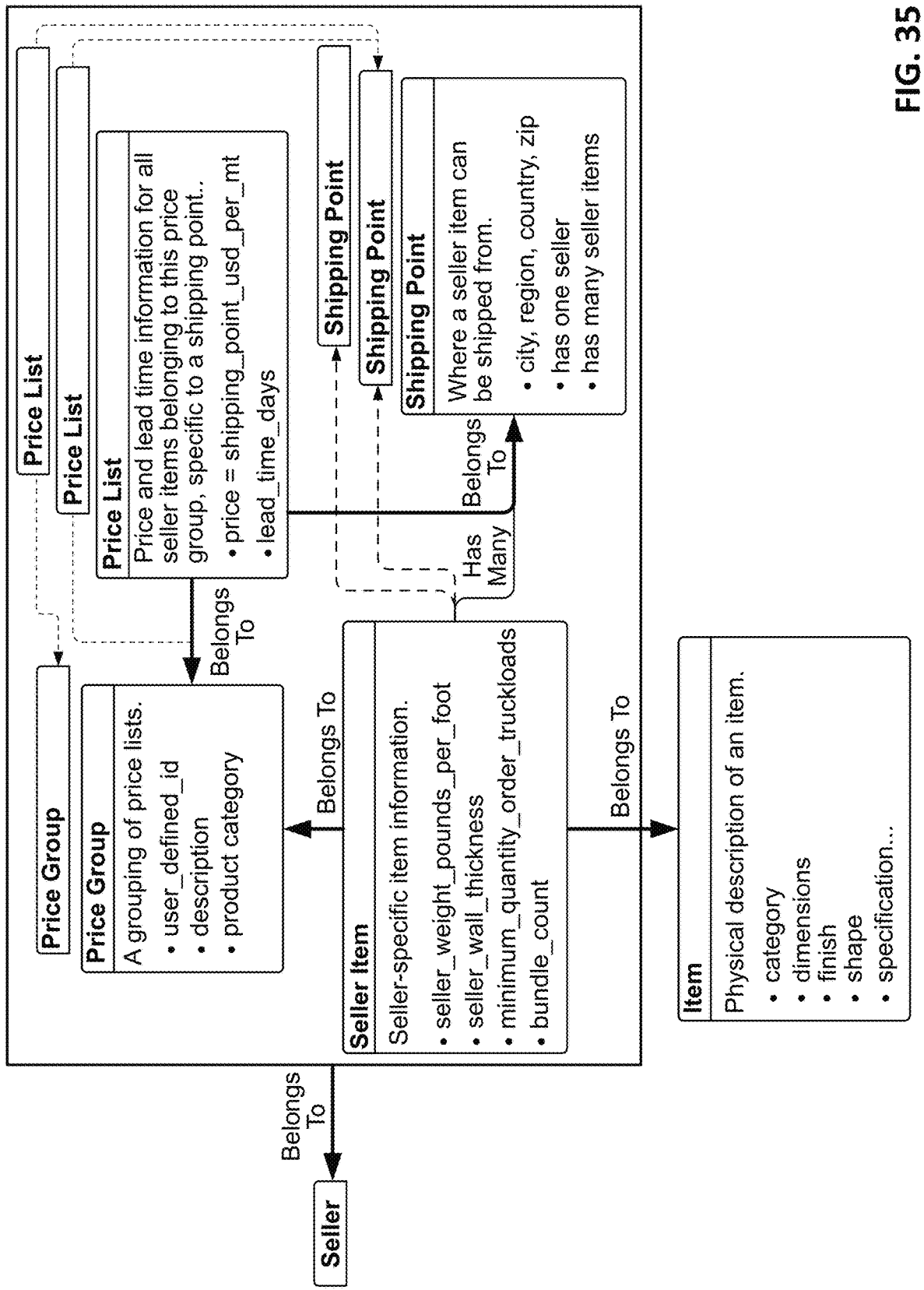
FIG. 35 is a flowchart illustrating the factors related to seller item associations to price groups, price lists, and shipping points in accordance with one or more embodiments of the present disclosure.

FIG. 35 is a flowchart illustrating the factors related to seller item associations to price groups, price lists, and shipping points.

Figure 36:
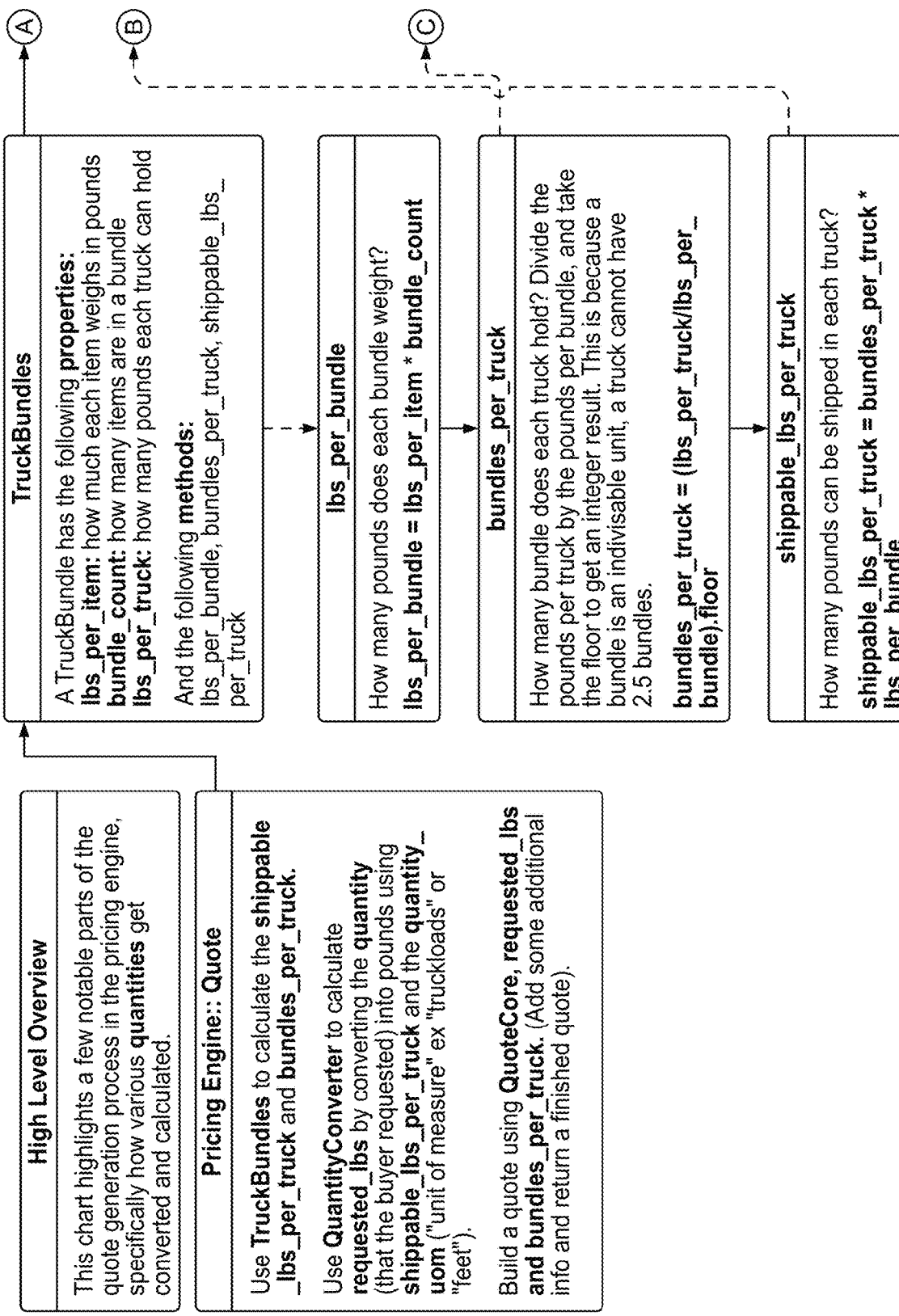
FIG. 36 is a flowchart of a quote generation process that accounts for truck bundle weights and maximum weight in a truckload in accordance with one or more embodiments of the present disclosure.
Figure 36:
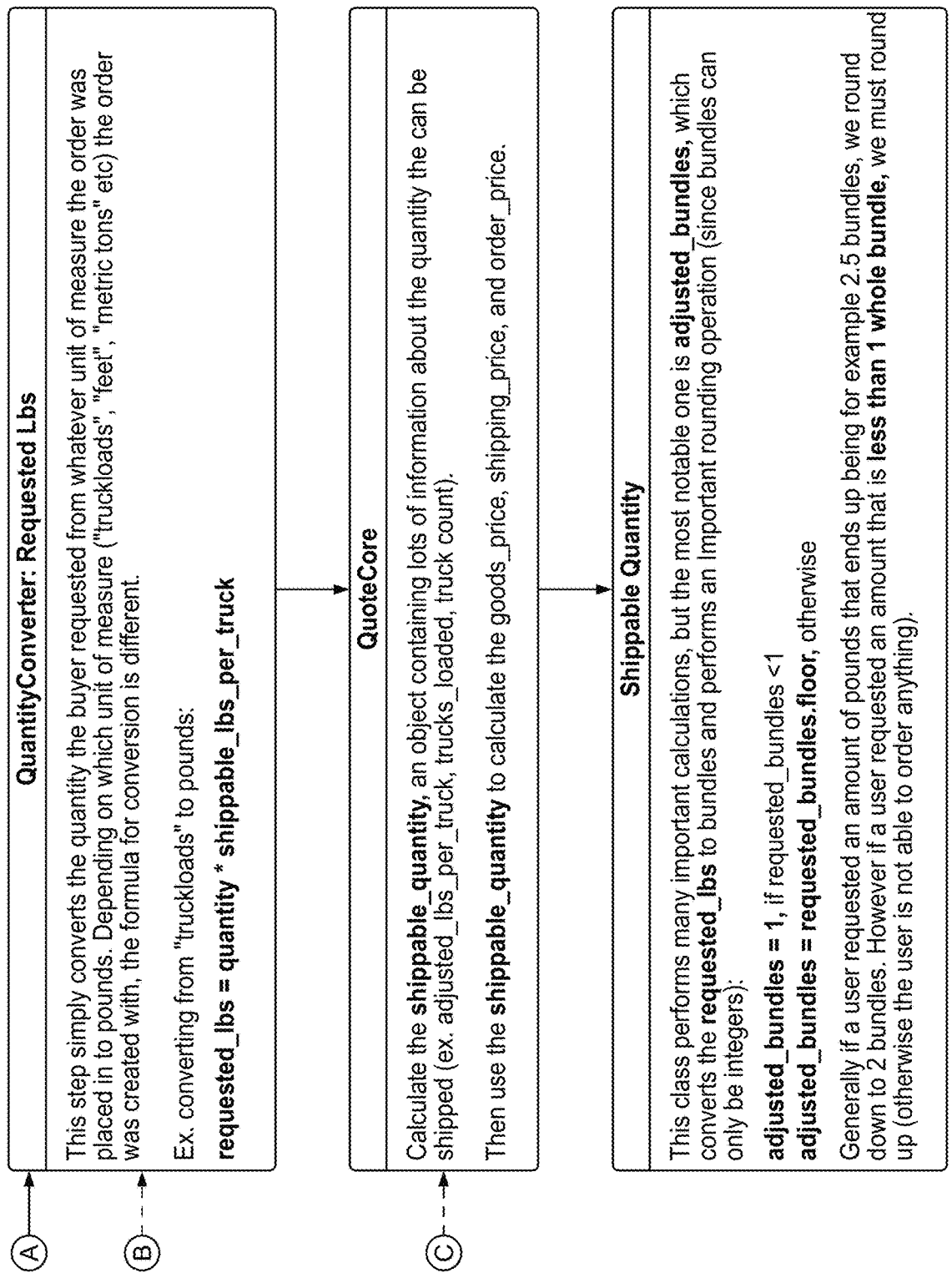

FIG. 36 is a flowchart of a quote generation process that accounts for truck bundle weights and maximum weight in a truckload.

Figure 37A:
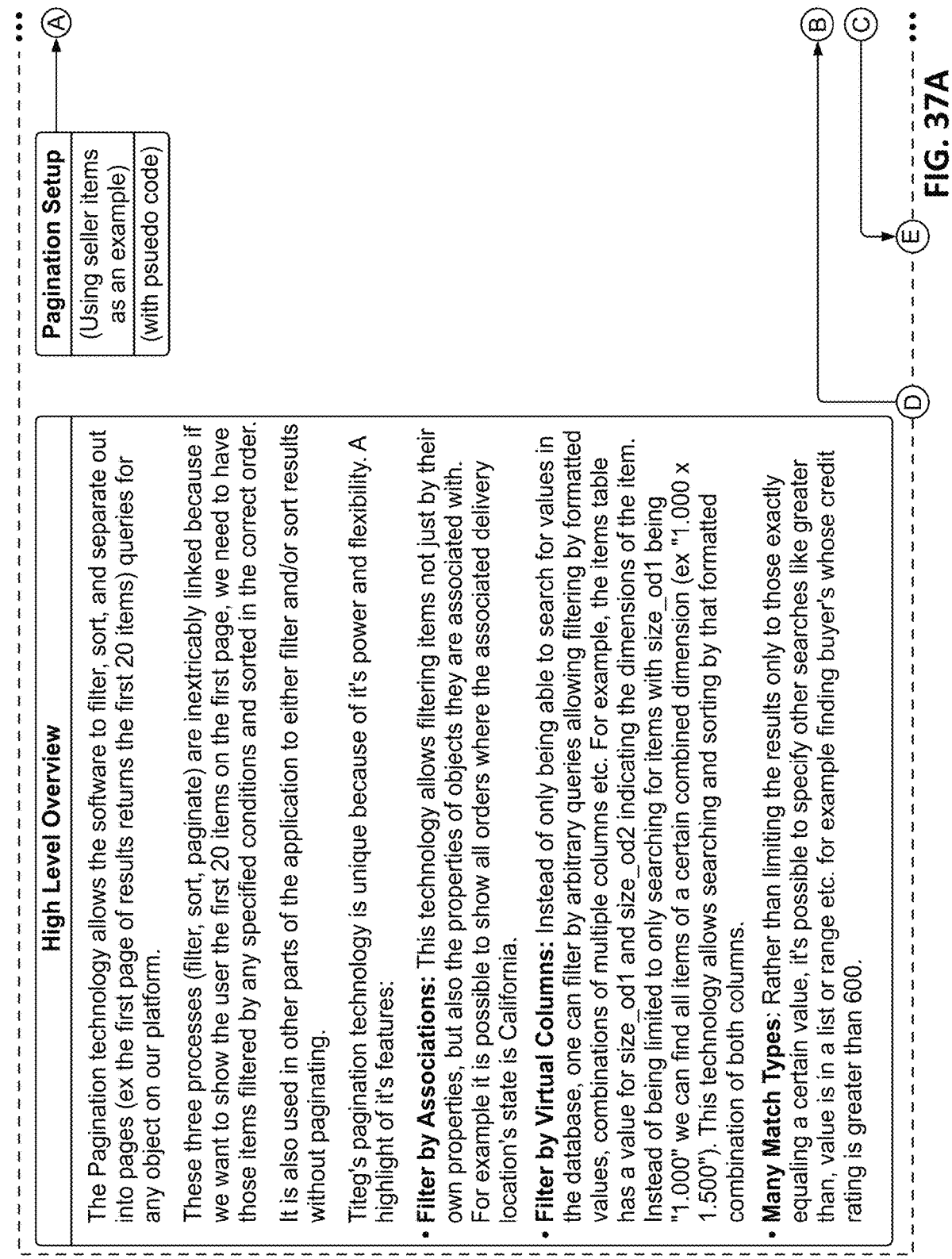
FIGS. 37A and 37B are a flowchart of pagination technology in accordance with one or more embodiments of the present disclosure.
Figure 37A:
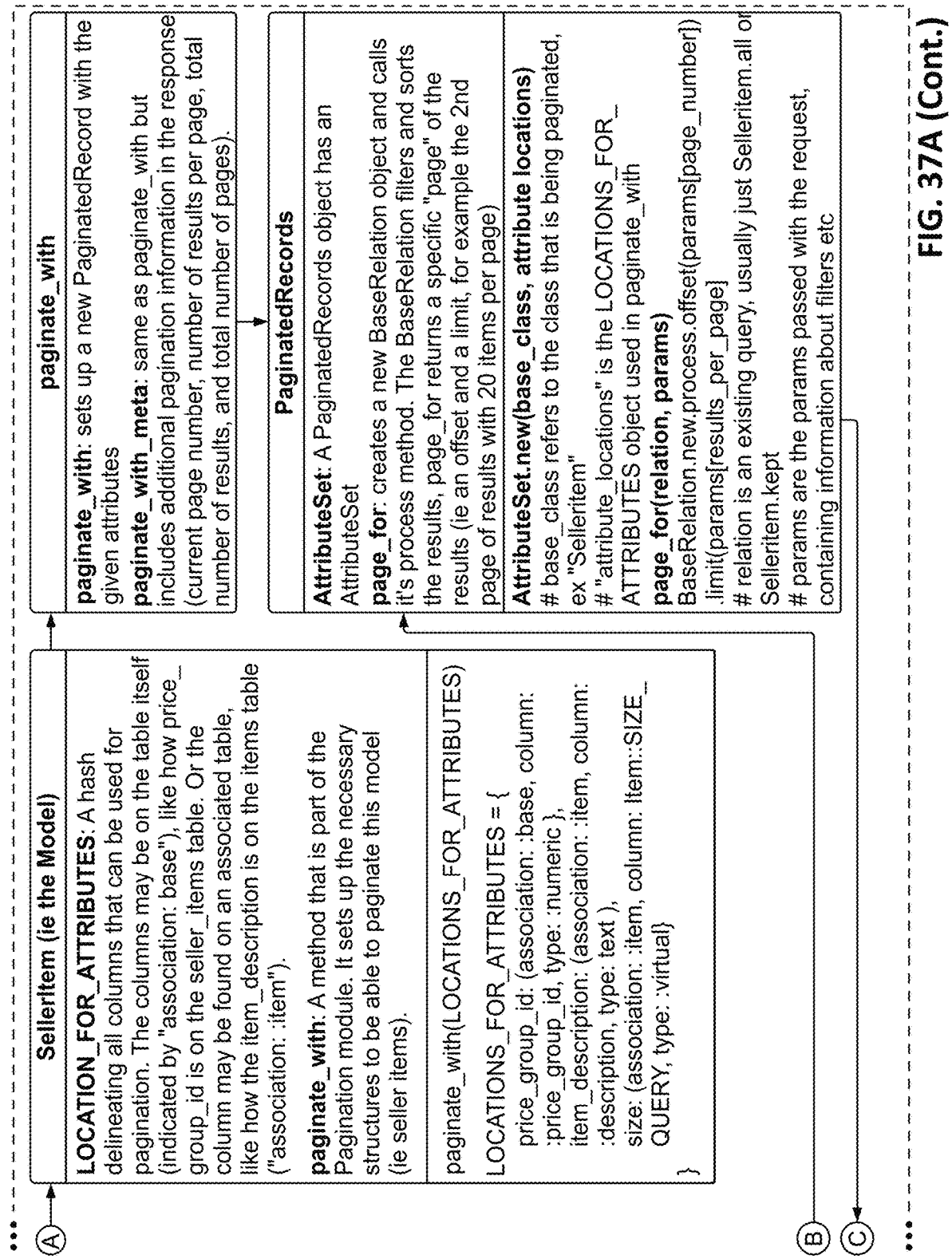
Figure 37B:
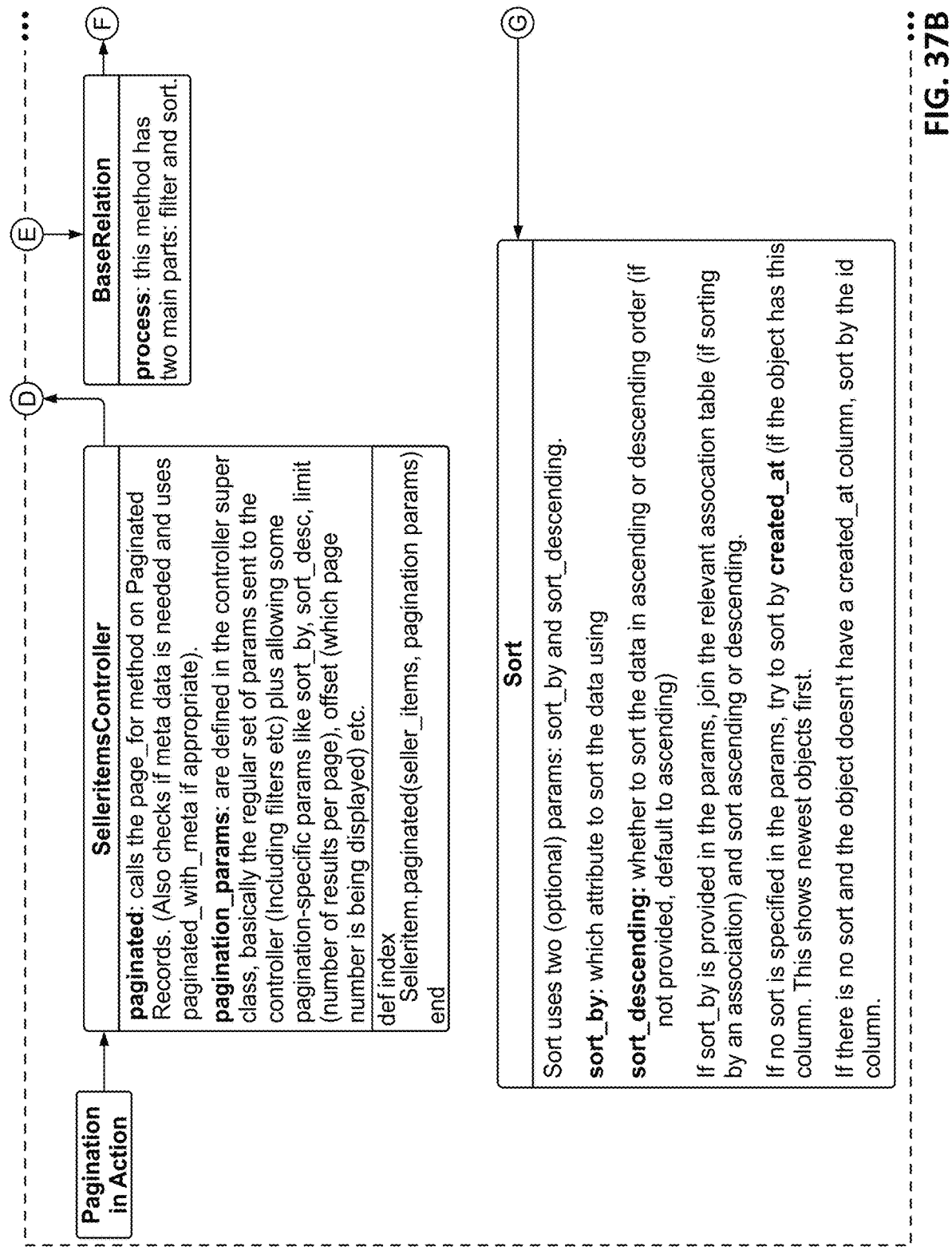
Figure 37B:
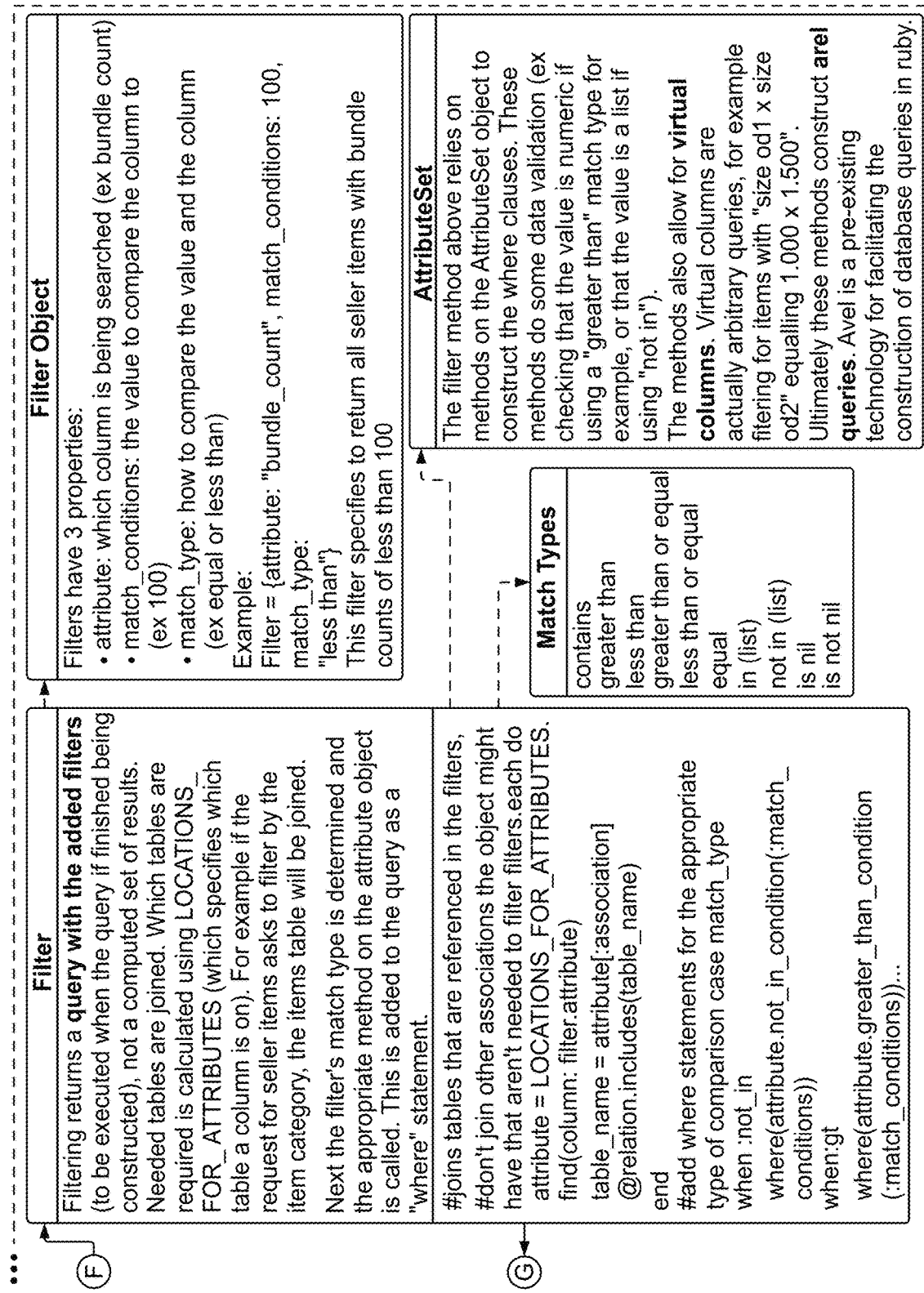

FIGS. 37A and 37B are a flowchart of pagination technology that allows the exchange platform application to filter, sort, and separate objects from queries into pages.

Figure 38:
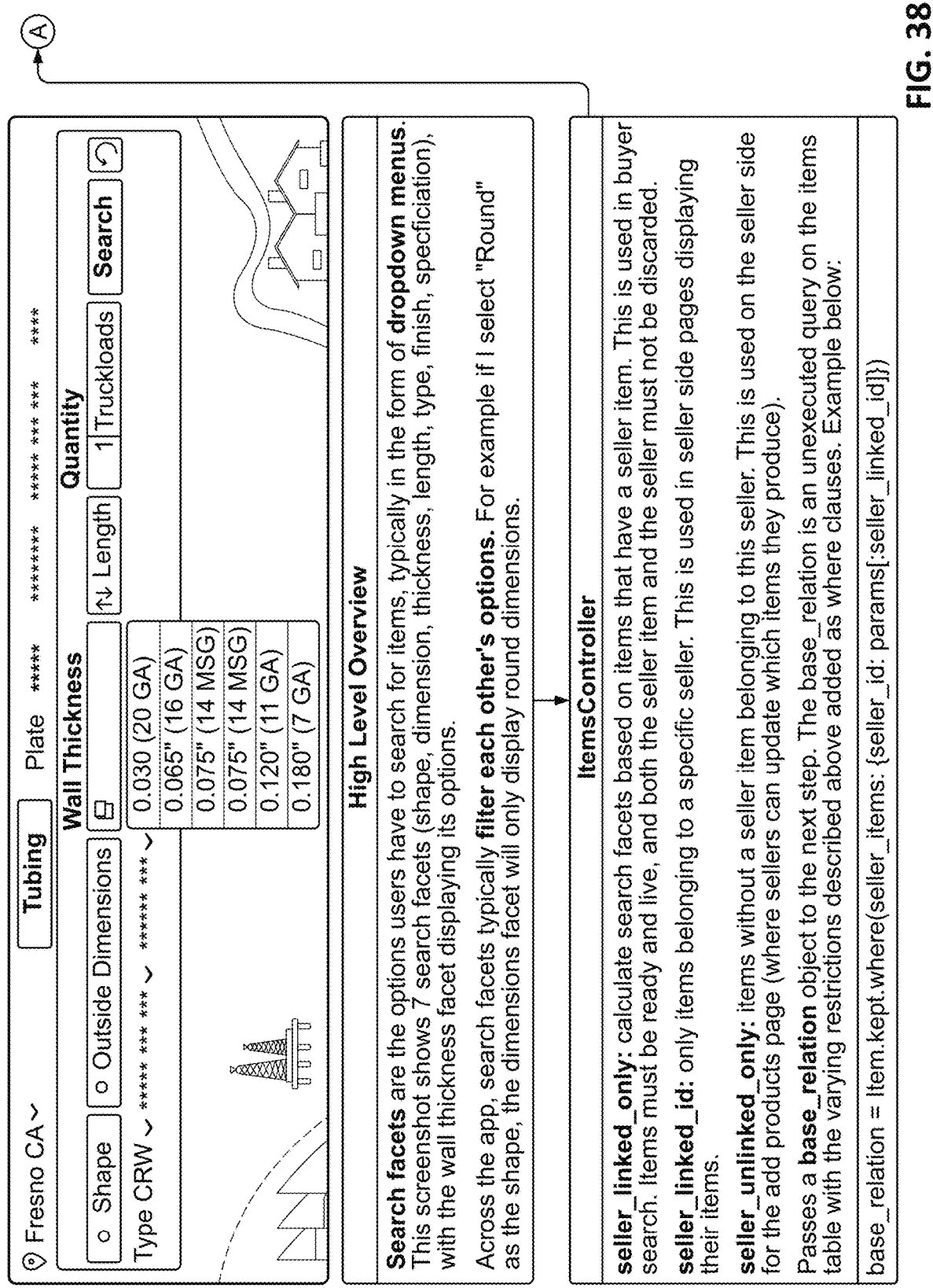
FIG. 38 is a flowchart of search facets with user options in accordance with one or more embodiments of the present disclosure.
Figure 38:
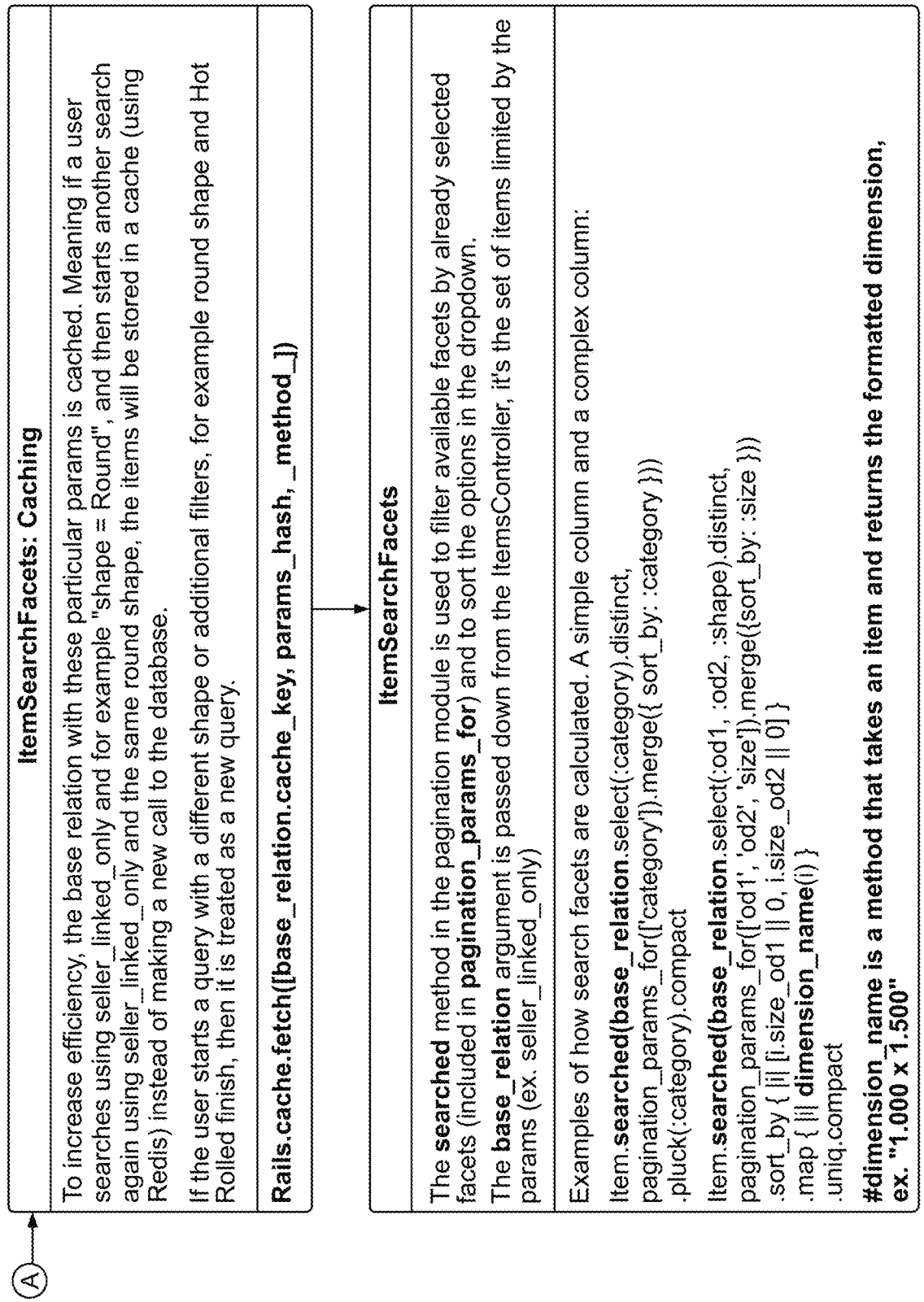

FIG. 38 is a flowchart of search facets with user options shown as the choice options in various pulldown menus. The seven search facets may include shape, dimension, thickness, length, type, finish, and specification for the steel items.

Figure 39:
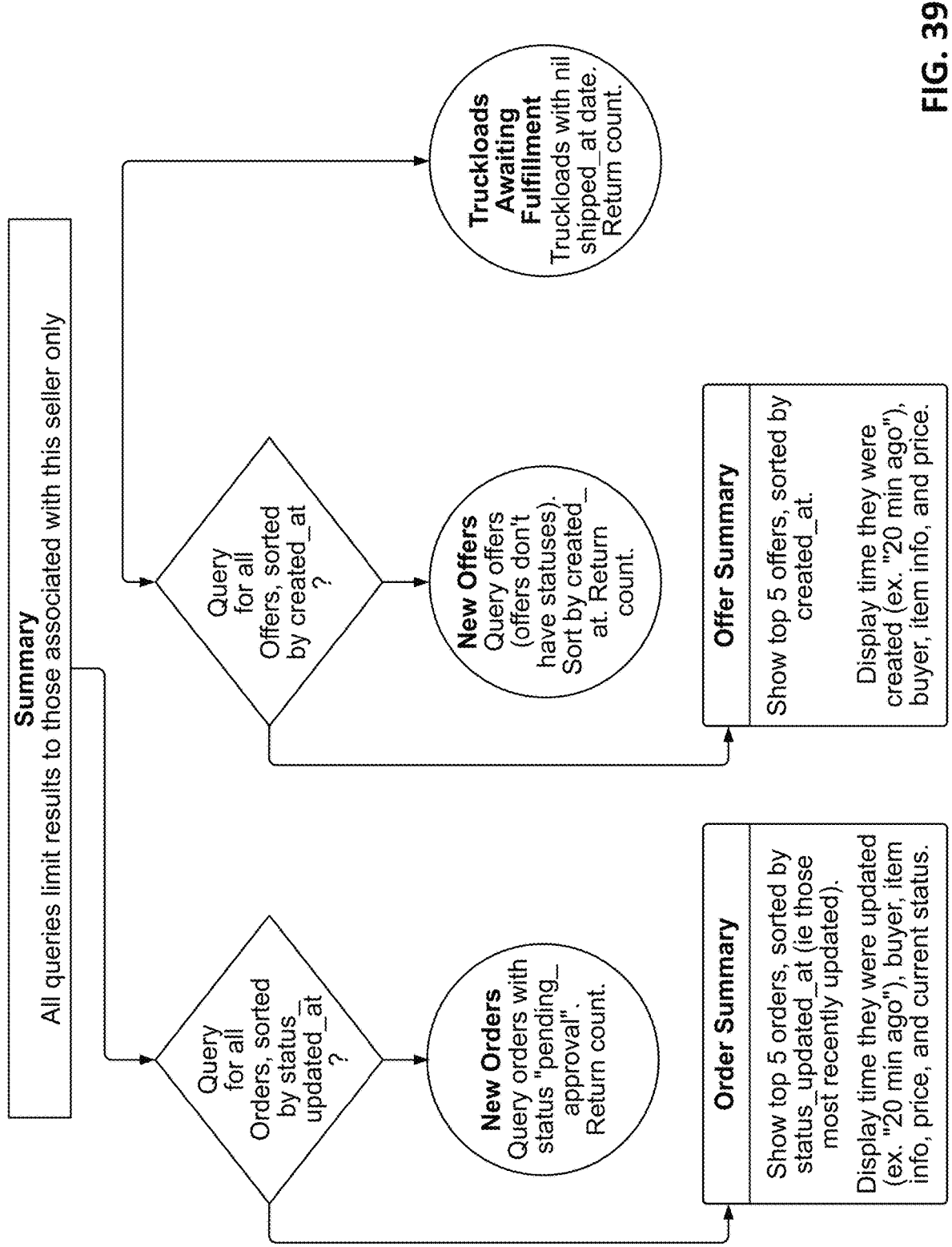
FIG. 39 is a flowchart of the process flow for queries limit results associated with a particular seller in accordance with one or more embodiments of the present disclosure.

FIG. 39 is a flowchart of the process flow for queries limit results associated with a particular seller.

Figure 40:
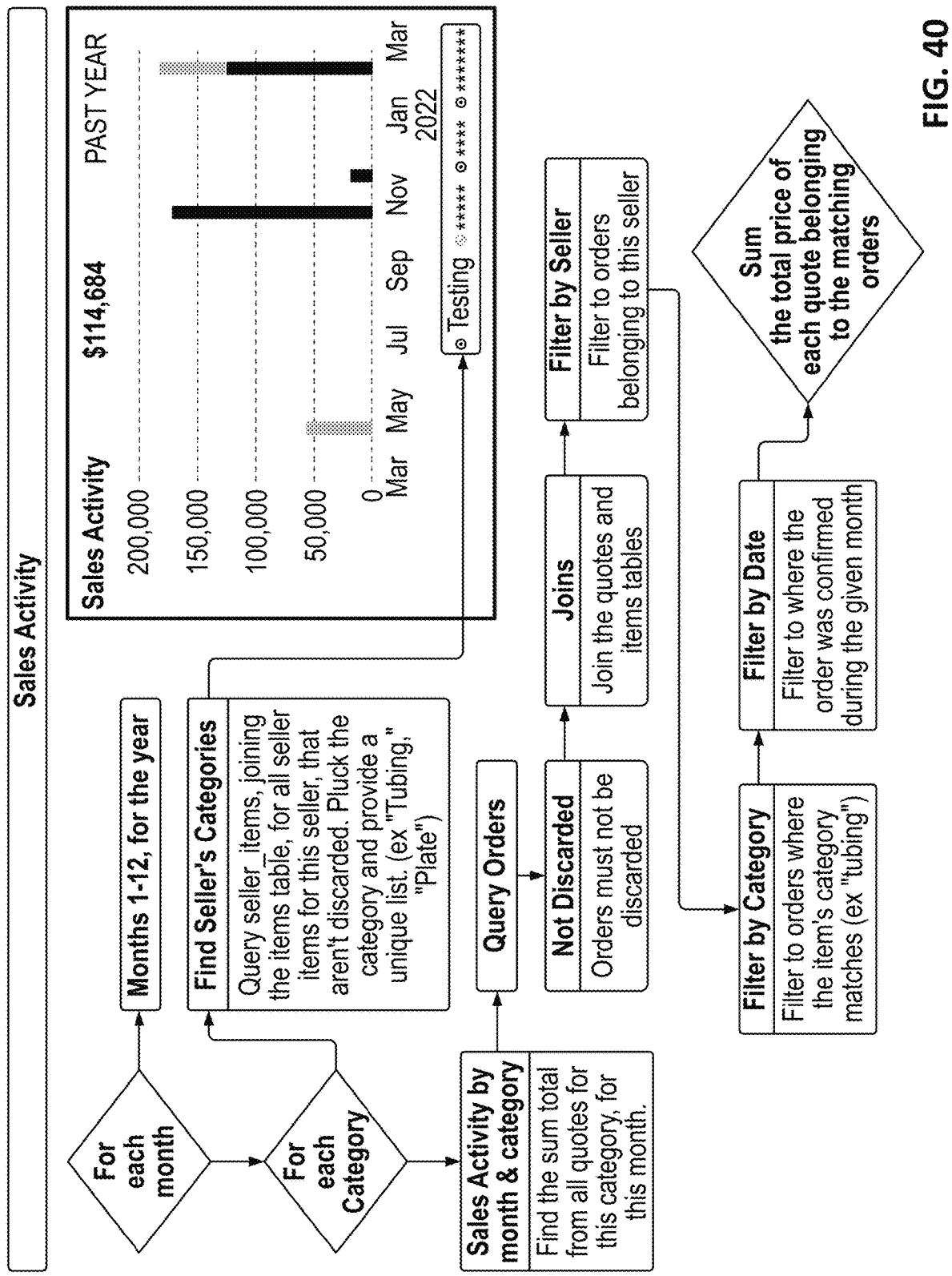
FIG. 40 is a flowchart of a sales activity process flow for generating a sales activity summary for a particular seller in accordance with one or more embodiments of the present disclosure.

FIG. 40 is a flowchart of a sales activity process flow for generating a sales activity summary for a particular seller.

Figure 41:
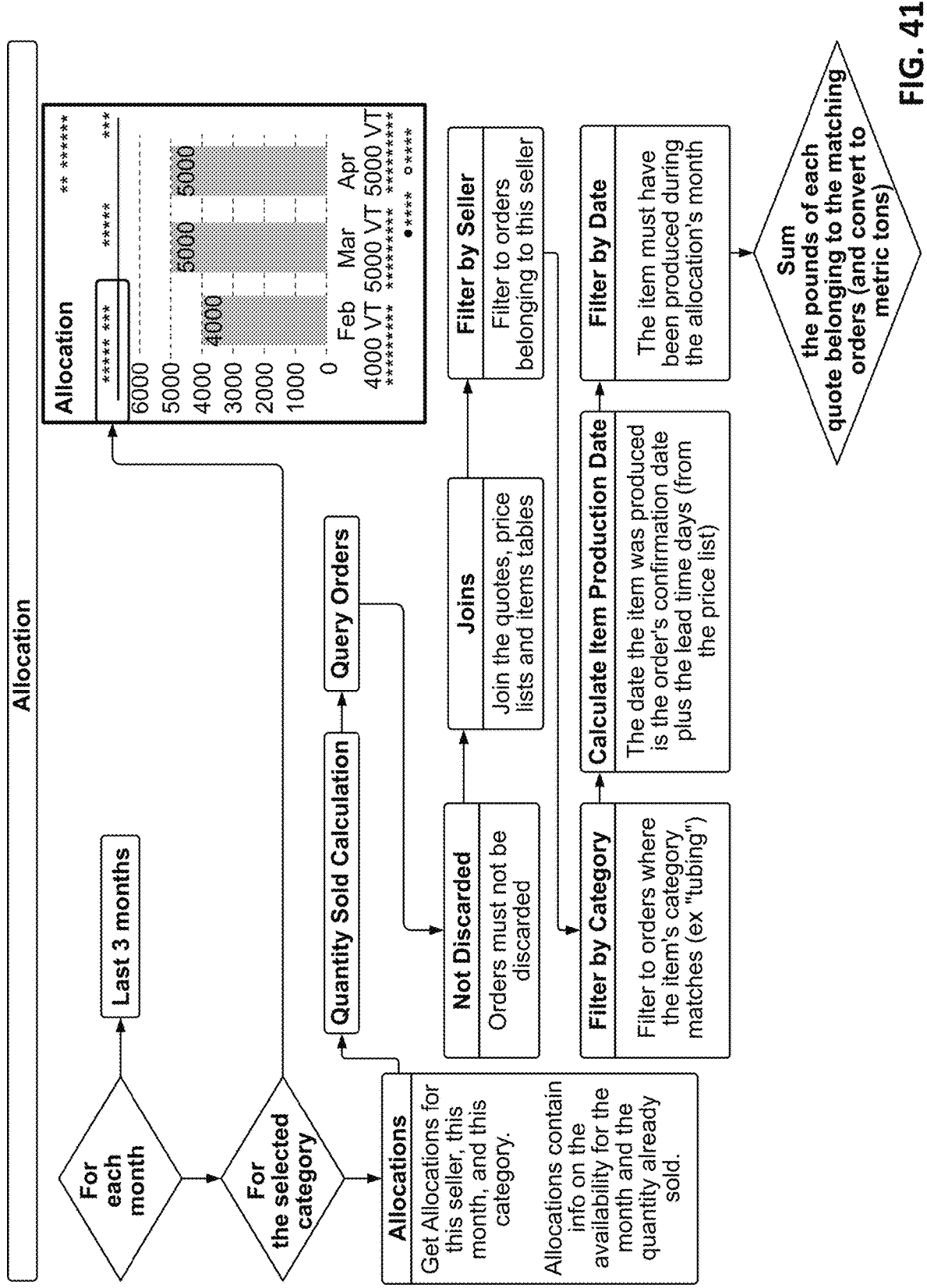
FIG. 41 is a flowchart of an allocation process flow for managing steel allocations of a particular seller during a predefined time period for filling orders in accordance with one or more embodiments of the present disclosure.

FIG. 41 is a flowchart of an allocation process flow for managing steel allocations of a particular seller during a predefined time period for filling orders.

Figure 42:
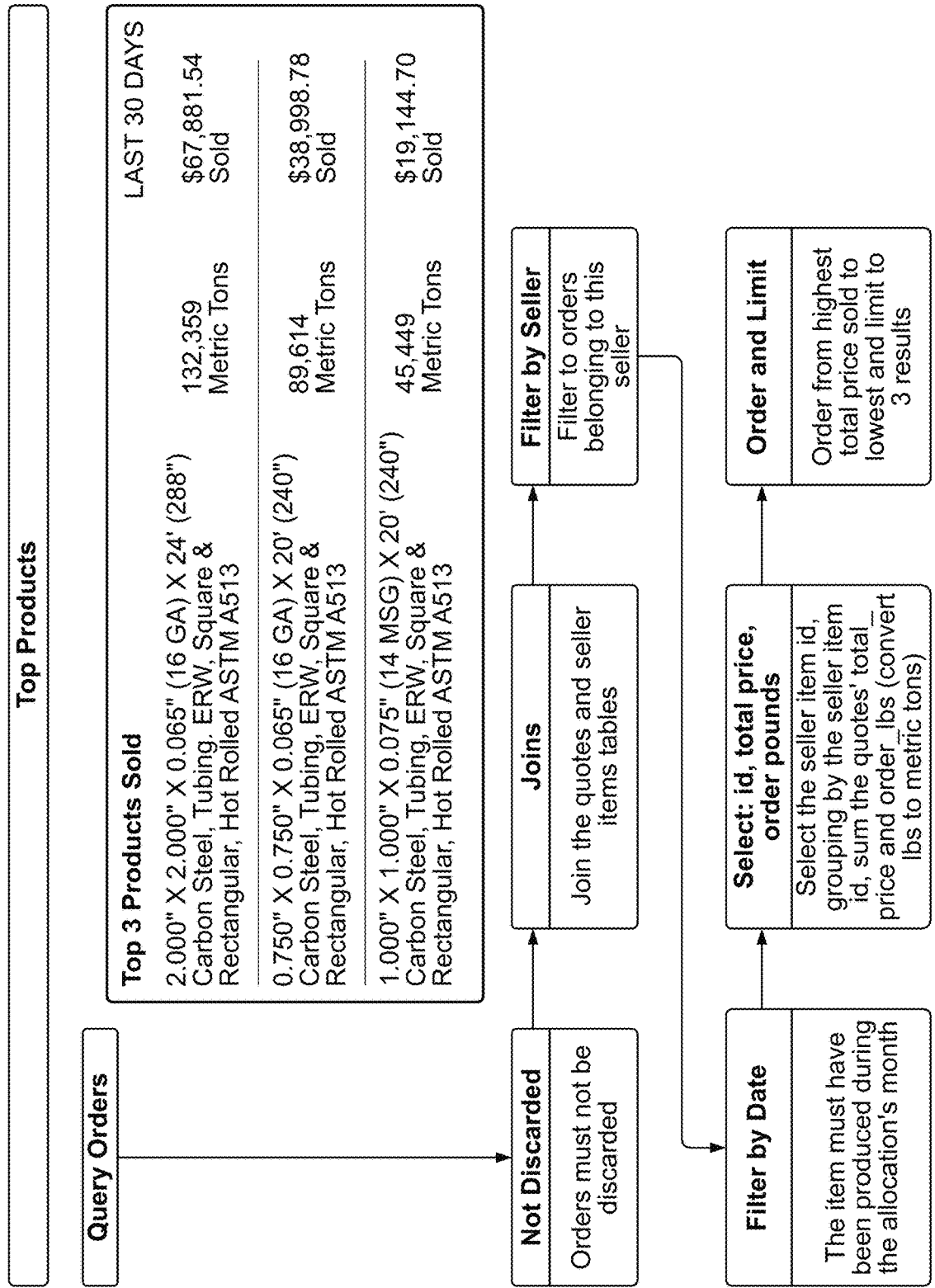
FIG. 42 is a flowchart of a process flow to determine the top products sold by querying the orders to arrange the orders from highest total price sold to the lowest in accordance with one or more embodiments of the present disclosure.

FIG. 42 is a flowchart of a process flow to determine the top products sold by querying the orders to arrange the orders from highest total price sold to the lowest.

Figure 43:
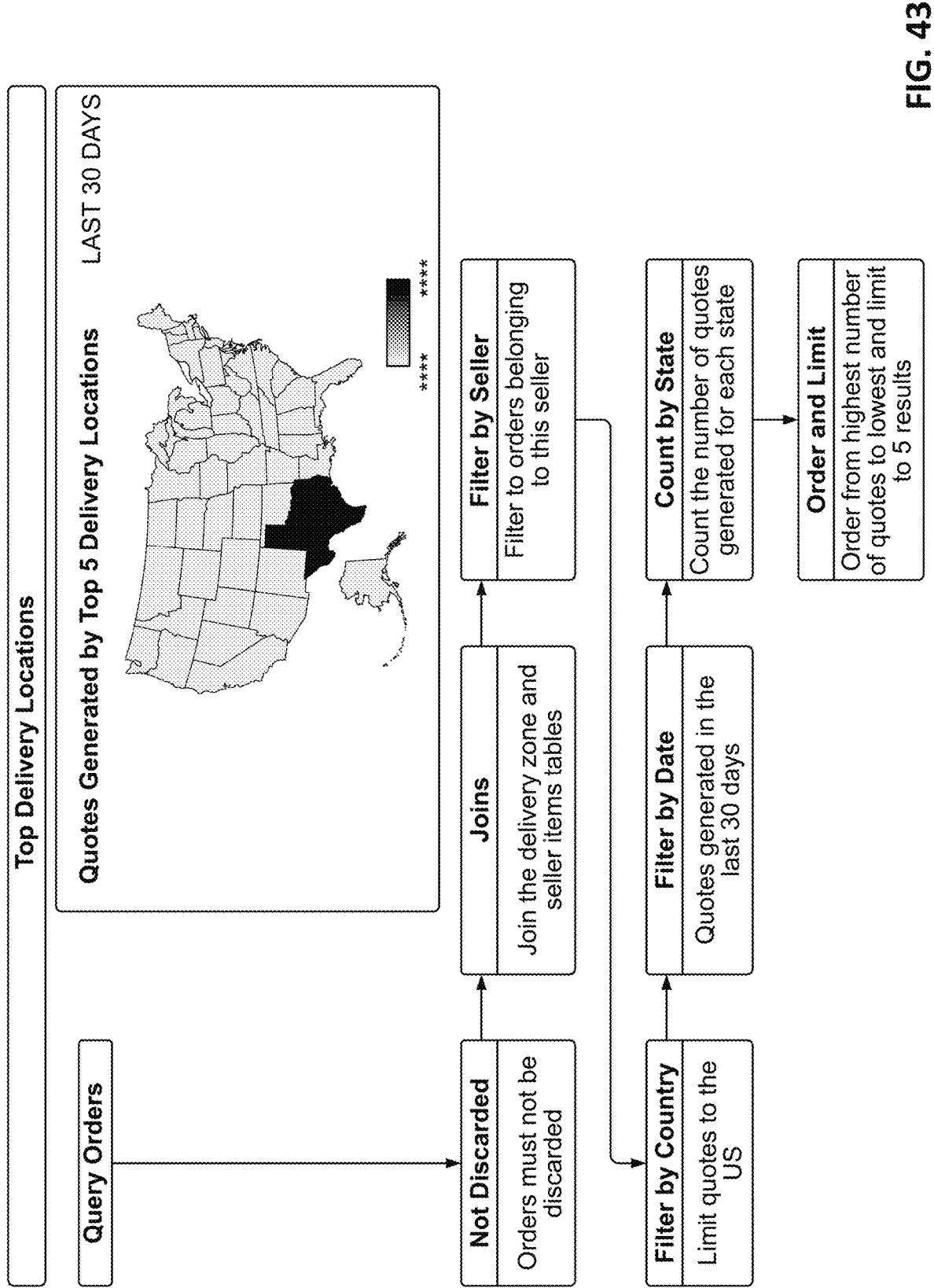
FIG. 43 is a flowchart of a process flow to determine the top delivery locations to arranged from the location with the highest number of quotes to the lowest in accordance with one or more embodiments of the present disclosure.

FIG. 43 is a flowchart of a process flow to determine the top delivery locations to arranged from the location with the highest number of quotes to the lowest.

Figure 44:
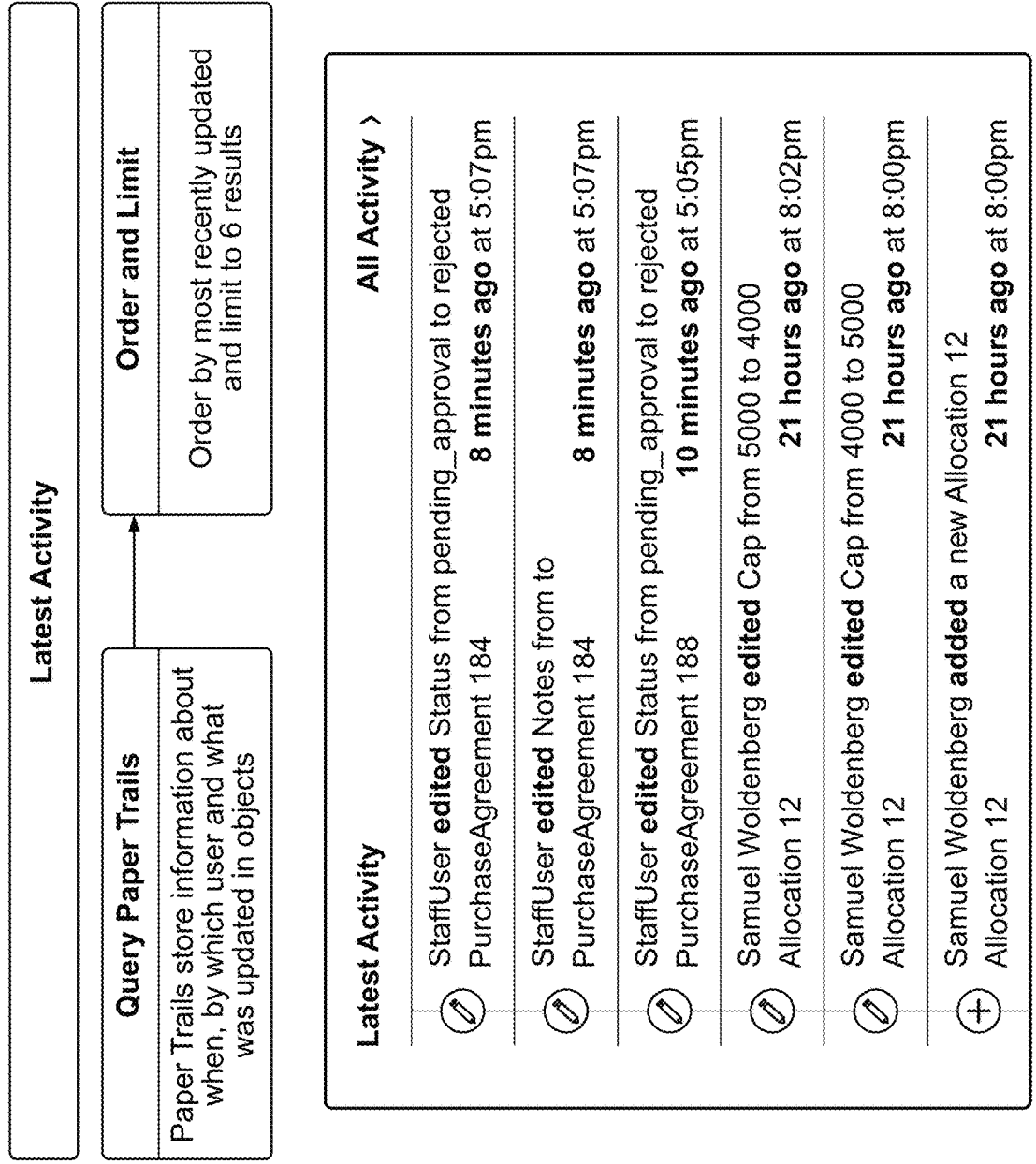
FIG. 44 is a flowchart of a process flow to determine the updated orders and limits of the seller that may be displayed to the seller in accordance with one or more embodiments of the present disclosure.

FIG. 44 is a flowchart of a process flow to determine the updated orders and limits of the seller that may be displayed to the seller.

In some embodiments, a system may include at least one non-transitory memory storing computer code, and at least one processor which, when executing the computer code, is configured to receive a first request from a user comprising a request for data elements; where the request for data elements may include at least one data type, and at least one data unit based on a data vehicle type for exchanging the at least one data type to the user; transmit the first request over a communication network to a plurality of first servers; where the first request may initiate an application programming (API) call to remotely program a database in each of the plurality of first servers to identify at least one data element stored in the database matching data elements in the first request, and transmit, in response to the first request, at least one data object including the at least one identified data element from the plurality of first servers and an availability date; receive over the communication network, the at least one data object from the plurality of first servers; display on a graphic user interface (GUI) on a display, a list of the at least one identified data element for each of the at least one data object; receive from the user via the GUI, a chosen data element from any of the at least one identified data element displayed in the list; where the chosen data element may be associated with a particular first server from the plurality of first servers; and transmit a second request over the communication network to the particular first server; where the second request may include the at least one data type, and a number of data units of the at least data type to exchange based on the data vehicle type.

In some embodiments, the at least one data type is at least one commodity type. The at least one data unit is at least one shipping unit. The data vehicle type is a shipping vehicle type. The plurality of first servers is a plurality of entity servers associated with a plurality of commodity manufacturing entities. The database in each of the plurality of first servers is a commodity manufacturing database. The at least one identified data element is at least one identified commodity manufacturing data element. The availability date is an available shipping date. The second request is a commodity purchase order. The chosen data element is a chosen data element is a chosen commodity manufacturing data element. The number of data units is a quantity number of shipping units. The particular first server is a particular entity server associated with a particular commodity manufacturing entity.

In some embodiments, the at least one processor may be configured to transmit instructions over the communication network to program a packing unit coupled to the particular entity server at a location site of the particular commodity manufacturing entity on the available shipping date to automatically load the quantity number of shipping units on to a shipping vehicle of the shipping vehicle type to ship to the user.

In some embodiments, a system may include at least one non-transitory memory storing computer code, and at least one processor which, when executing the computer code, may be configured to receive a query request from a user (e.g., a buyer) including query request data elements; the query request data elements may include at least one commodity type, and at least one shipping unit based on a shipping vehicle type for shipping the at least one commodity type to the user; transmit the query request over a communication network to a plurality of entity servers associated with a plurality of commodity manufacturing entities; where the query request may remotely program a commodity manufacturing database in each of the plurality of entity servers to identify at least one commodity manufacturing data element stored in the commodity manufacturing database matching the query request data elements requested by the user, and transmit, in response to the query request, at least one manufacturing data object including the at least one identified commodity manufacturing data element from the plurality of entity servers and an available shipping date; receive over the communication network, the at least one manufacturing data object from the plurality of entity servers; display on a graphic user interface (GUI) on a display, a list of the at least one identified commodity manufacturing data element for each of the at least one manufacturing data object; receive from the user via the GUI, a chosen commodity manufacturing data element from any of the at least one identified commodity manufacturing data element displayed in the list; where the chosen commodity manufacturing data element may be associated with a particular commodity manufacturing entity; transmit a commodity purchase order over the communication network to a particular entity server from the plurality of entity servers associated with the particular commodity manufacturing entity; where the commodity purchase order may include the at least one commodity type, and a quantity number of shipping units of the at least one commodity type to purchase based on the shipping vehicle type; and transmit instructions over the communication network to program a packing unit coupled to the particular entity server at a location site of the particular commodity manufacturing entity on the available shipping date to automatically load the quantity number of shipping units on to a shipping vehicle of the shipping vehicle type to ship to the user.

In some embodiments, the user may be a buyer of the at least one commodity type.

In some embodiments, the at least one identified commodity manufacturing data element may include at least one price per shipping unit for the at least one commodity from any of the plurality of commodity manufacturing entities, and wherein the at least one processor is configured to display the list on the GUI of the at least one price per shipping unit from any of the plurality of commodity manufacturing entities.

In some embodiments, the at least one price per shipping unit may be based on a location of the user.

In some embodiments, the at least one processor may be configured to hide a name of any of the plurality of commodity manufacturing entities that choses to maintain anonymity on the display of the list.

In some embodiments, the at least one processor may be configured to sort, the at least one price per shipping unit for the at least one commodity from any of the plurality of commodity manufacturing entities in the list, by price or location of the plurality of commodity manufacturing entities closest to a location of the user.

In some embodiments, the at least one processor may be configured to transmit a purchase order notification to an entity server associated with the particular commodity manufacturing entity when the commodity purchase order is placed.

In some embodiments, the at least one processor may be configured to enable the user to provide via the GUI a price offer to any of the plurality of commodity manufacturing entities.

In some embodiments, the at least one commodity type may be steel. The plurality of commodity manufacturing entities may be a plurality of steel mills.

In some embodiments, the at least one processor may be configured to transmit the instruction to program the packing unit to automatically load the shipping vehicle based on a number of steel bundles that may fit on the shipping vehicle without exceeding a maximum load weight of the shipping vehicle.

In some embodiments, a method may include receiving, by at least one processor, a first request from a user comprising a request for data elements. The request for data elements may include at least one data type, and at least one data unit based on a data vehicle type for exchanging the at least one data type to the user. The first request may be transmitted over a communication network to a plurality of first servers. The first request may initiate an application programming (API) call to remotely program a database in each of the plurality of first servers to identify at least one data element stored in the database matching data elements in the first request by the user, and transmit, in response to the first request, at least one data object including the at least one identified data element from the plurality of first servers and an availability date. The at least one data object from the plurality of first servers may be received over the communication network. A list of the at least one identified data element for each of the at least one data object may be displayed on a graphic user interface (GUI) on a display. A chosen data element from any of the at least one identified data element displayed in the list may be received from the user via the GUI. The chosen data element may be associated with a particular first server from the plurality of first servers. A second request may be transmitted over the communication network to the particular first server. The second request may include the at least one data type, and a number of data units of the at least data type to exchange based on the data vehicle type.

In some embodiments, the at least one data type is at least one commodity type. The at least one data unit is at least one shipping unit. The data vehicle type is a shipping vehicle type. The plurality of first servers is a plurality of entity servers associated with a plurality of commodity manufacturing entities. The database in each of the plurality of first servers is a commodity manufacturing database. The at least one identified data element is at least one identified commodity manufacturing data element. The availability date is an available shipping date. The second request is a commodity purchase order. The chosen data element is a chosen data element is a chosen commodity manufacturing data element. The number of data units is a quantity number of shipping units. The particular first server is a particular entity server associated with a particular commodity manufacturing entity.

In some embodiments, the method may further include transmitting, by the at least one processor, instructions over the communication network to program a packing unit coupled to the particular entity server at a location site of the particular commodity manufacturing entity on the available shipping date to automatically load the quantity number of shipping units on to a shipping vehicle of the shipping vehicle type to ship to the user.

In some embodiments, a method may include receiving, by at least one processor, a query request from a user comprising query request data elements, where the query request data elements may include at least one commodity type, and at least one shipping unit based on a shipping vehicle type for shipping the at least one commodity type to the user. The query request may be transmitted over a communication network to a plurality of entity servers associated with a plurality of commodity manufacturing entities, where the query request remotely programs a commodity manufacturing database in each of the plurality of entity servers to identify at least one commodity manufacturing data element stored in the commodity manufacturing database matching the query request data elements requested by the user, and transmit, in response to the query request, at least one manufacturing data object including the at least one identified commodity manufacturing data element from the plurality of entity servers and an available shipping date. The at least one manufacturing data object from the plurality of entity servers may be received over the communication network. A list of the at least one identified commodity manufacturing data element for each of the at least one manufacturing data object may be displayed on a graphic user interface (GUI) on a display. A chosen commodity manufacturing data element from any of the at least one identified commodity manufacturing data element displayed in the list may be received from the user via the GUI, where the chosen commodity manufacturing data element may be associated with a particular commodity manufacturing entity. A commodity purchase order may be transmitted over the communication network to a particular entity server from the plurality of entity servers associated with the particular commodity manufacturing entity, where the commodity purchase order may include the at least one commodity type, and a quantity number of shipping units of the at least one commodity type to purchase based on the shipping vehicle type. Instructions may be transmitted over the communication network to program a packing unit coupled to the particular entity server at a location site of the particular commodity manufacturing entity on the available shipping date to automatically load the quantity number of shipping units on to a shipping vehicle of the shipping vehicle type to ship to the user.

In some embodiments, the user may be a buyer of the at least one commodity type.

In some embodiments, the at least one identified commodity manufacturing data element may include at least one price per shipping unit for the at least one commodity from any of the plurality of commodity manufacturing entities. The displaying of the list on the GUI may include displaying the list of the at least one price per shipping unit from any of the plurality of commodity manufacturing entities.

In some embodiments, the at least one price per shipping unit may be based on a location of the user.

In some embodiments, the method may further include hiding, by the at least one processor, a name of any of the plurality of commodity manufacturing entities that choses to maintain anonymity on the display of the list.

In some embodiments, the method may further include sorting, by the at least one processor, the at least one price per shipping unit for the at least one commodity from any of the plurality of commodity manufacturing entities in the list, by price or location of the plurality of commodity manufacturing entities closest to a location of the user.

In some embodiments, the method may further include transmitting, by the at least one processor, a purchase order notification to an entity server associated with the particular commodity manufacturing entity when the commodity purchase order is placed.

In some embodiments, the method may further include enabling, by the at least one processor, the user to provide via the GUI a price offer to any of the plurality of commodity manufacturing entities.

In some embodiments, the at least one commodity type may be steel. The plurality of commodity manufacturing entities may be a plurality of steel mills.

In some embodiments, the transmitting of the instruction to program the packing unit may include transmitting an instruction to program the packing unit to automatically load the shipping vehicle based on a number of steel bundles that may fit on the shipping vehicle without exceeding a maximum load weight of the shipping vehicle.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A system, comprising: at least one non-transitory memory storing computer code, and at least one processor which, when executing the computer code, is configured to: receive a first request from a user comprising a request for data elements; wherein the request for data elements comprises: at least one data type, and at least one data unit based on a data vehicle type for exchanging the at least one data type to the user; transmit the first request over a communication network to a plurality of first servers; wherein the first request initiates an application programming (API) call to remotely program a database in each of the plurality of first servers to: identify at least one data element stored in the database that matches data elements in the first request by the user, and transmit, in response to the first request, at least one data object comprising: the at least one identified data element from the plurality of first servers and, an availability date; receive over the communication network, the at least one data object from the plurality of first servers; display on a graphic user interface (GUI) on a display, a list of the at least one identified data element for each of the at least one data object; receive from the user via the GUI, a chosen data element from any of the at least one identified data element displayed in the list; wherein the chosen data element is associated with a particular first server from the plurality of first servers; and transmit a second request over the communication network to the particular first server; wherein the second request comprises: the at least one data type, and a number of data units of the at least data type to exchange based on the data vehicle type; wherein the at least one commodity type is steel; wherein the plurality of commodity manufacturing entities is a plurality of steel mills; and wherein the at least one processor is configured to transmit instructions to program a packing unit to automatically load a shipping vehicle based on a number of steel bundles that may fit on the shipping vehicle without exceeding a maximum load weight of the shipping vehicle.

2. The system according to claim 1, wherein the at least one data unit is at least one shipping unit;
wherein the data vehicle type is a shipping vehicle type;
wherein the database in each of the plurality of first servers is a commodity manufacturing database;
wherein the at least one identified data element is at least one identified commodity manufacturing data element;
wherein the availability date is an available shipping date;
wherein the second request is a commodity purchase order;
wherein the chosen data element is a chosen commodity manufacturing data element;
wherein the number of data units is a quantity number of shipping units; and
wherein the particular first server is a particular entity server associated with a particular commodity manufacturing entity.

3. The system according to claim 2, wherein the at least one processor is configured to transmit instructions over the communication network to program a packing unit coupled to the particular entity server at a location site of the particular commodity manufacturing entity on the available shipping date to automatically load the quantity number of shipping units on to a shipping vehicle of the shipping vehicle type to ship to the user.

4. The system according to claim 2, wherein the user is a buyer of the at least one commodity type.

5. The system according to claim 2, wherein the at least one identified commodity manufacturing data element comprises at least one price per shipping unit for the at least one commodity type from any of the plurality of commodity manufacturing entities, and wherein the at least one processor is configured to display the list on the GUI of the at least one price per shipping unit from any of the plurality of commodity manufacturing entities.

6. The system according to claim 5, wherein the at least one price per shipping unit is based on a location of the user.

7. The system according to claim 5, wherein the at least one processor is configured to hide a name of any of the plurality of commodity manufacturing entities that choses to maintain anonymity on the display of the list.

8. The system according to claim 5, wherein the at least one processor is configured to sort, the at least one price per shipping unit for the at least one commodity type from any of the plurality of commodity manufacturing entities in the list, by price or location of the plurality of commodity manufacturing entities closest to a location of the user.

9. The system according to claim 2, wherein the at least one processor is configured to transmit a purchase order notification to an entity server associated with the particular commodity manufacturing entity when the commodity purchase order is placed.

10. The system according to claim 2, wherein the at least one processor is configured to enable the user to provide via the GUI a price offer to any of the plurality of commodity manufacturing entities.

11. A method, comprising: receiving, by at least one processor, a first request from a user comprising a request for data elements; wherein the request for data elements comprises: at least one data type, and at least one data unit based on a data vehicle type for exchanging the at least one data type to the user; transmitting, by the at least one processor, the first request over a communication network to a plurality of first servers; wherein the first request initiates an application programming (API) call to remotely program a database in each of the plurality of first servers to: identify at least one data element stored in the database that matches data elements in the first request by the user, and transmit, in response to the first request, at least one data object comprising: the at least one identified data element from the plurality of first servers and, an availability date; receiving, by the at least one processor, over the communication network, the at least one data object from the plurality of first servers; displaying, by the at least one processor, on a graphic user interface (GUI) on a display, a list of the at least one identified data element for each of the at least one data object; receiving, by the at least one processor, from the user via the GUI, a chosen data element from any of the at least one identified data element displayed in the list; wherein the chosen data element is associated with a particular first server from the plurality of first servers; and transmitting, by the at least one processor, a second request over the communication network to the particular first server; wherein the second request comprises: the at least one data type, a number of data units of the at least one data type to exchange based on the data vehicle type; wherein the at least one commodity type is steel; wherein the plurality of commodity manufacturing entities is a plurality of steel mills; wherein the at least one processor is configured to transmit instructions to program a packing unit to automatically load a shipping vehicle based on a number of steel bundles that may fit on the shipping vehicle without exceeding a maximum load weight of the shipping vehicle.

12. The method according to claim 11, wherein the at least one data unit is at least one shipping unit;
wherein the data vehicle type is a shipping vehicle type;
wherein the database in each of the plurality of first servers is a commodity manufacturing database;
wherein the at least one identified data element is at least one identified commodity manufacturing data element;
wherein the availability date is an available shipping date;
wherein the second request is a commodity purchase order;
wherein the chosen data element is a chosen commodity manufacturing data element;
wherein the number of data units is a quantity number of shipping units; and
wherein the particular first server is a particular entity server associated with a particular commodity manufacturing entity.

13. The method according to claim 12, further comprising transmitting, by the at least one processor, instructions over the communication network to program a packing unit coupled to the particular entity server at a location site of the particular commodity manufacturing entity on the available shipping date to automatically load the quantity number of shipping units on to a shipping vehicle of the shipping vehicle type to ship to the user.

14. The method according to claim 12, wherein the user is a buyer of the at least one commodity type.

15. The method according to claim 12, wherein the at least one identified commodity manufacturing data element comprises at least one price per shipping unit for the at least one commodity from any of the plurality of commodity manufacturing entities, and wherein the displaying of the list on the GUI comprises displaying the list of the at least one price per shipping unit from any of the plurality of commodity manufacturing entities.

16. The method according to claim 15, wherein the at least one price per shipping unit is based on a location of the user.

17. The method according to claim 15, further comprising hiding, by the at least one processor, a name of any of the plurality of commodity manufacturing entities that choses to maintain anonymity on the display of the list.

18. The method according to claim 15, further comprising sorting, by the at least one processor, the at least one price per shipping unit for the at least one commodity from any of the plurality of commodity manufacturing entities in the list, by price or location of the plurality of commodity manufacturing entities closest to a location of the user.

19. The method according to claim 12, further comprising transmitting, by the at least one processor, a purchase order notification to an entity server associated with the particular commodity manufacturing entity when the commodity purchase order is placed.

20. The method according to claim 12, further comprising enabling, by the at least one processor, the user to provide via the GUI a price offer to any of the plurality of commodity manufacturing entities.

* * * * *